United States Patent
Nagaoka

[11] Patent Number: 6,160,669
[45] Date of Patent: Dec. 12, 2000

[54] LENS SYSTEM

[75] Inventor: Toshiyuki Nagaoka, Akishima, Japan

[73] Assignee: Olympus Optical Co., Ltd., Tokyo, Japan

[21] Appl. No.: 09/372,113

[22] Filed: Aug. 11, 1999

Related U.S. Application Data

[62] Division of application No. 08/825,134, Mar. 19, 1997, Pat. No. 5,973,850.

[30] Foreign Application Priority Data

Apr. 15, 1996 [JP] Japan .................................. 8-115228

[51] Int. Cl.⁷ .............................. G02B 15/14; G02B 3/00
[52] U.S. Cl. ............................................. 359/686; 359/654
[58] Field of Search ...................... 359/654, 652, 359/676, 683, 686, 781, 770–771, 754, 758, 761, 763, 766

[56] References Cited

U.S. PATENT DOCUMENTS

| | | | |
|---|---|---|---|
| 5,046,833 | 9/1991 | Tsuchida | 359/654 |
| 5,117,308 | 5/1992 | Tsuchida et al. | 359/654 |
| 5,157,550 | 10/1992 | Tsuchida et al. | 359/686 |
| 5,268,791 | 12/1993 | Tsuchida | 359/654 |
| 5,268,792 | 12/1993 | Kreitzer et al. | 359/676 |
| 5,359,456 | 10/1994 | Kikuchi | 359/654 |
| 5,416,639 | 5/1995 | Yamanashi | 359/676 |
| 5,729,389 | 3/1998 | Nagaoka | 359/654 |

FOREIGN PATENT DOCUMENTS

| | | |
|---|---|---|
| 52-029238 | 3/1977 | Japan . |
| 4-097309 | 3/1992 | Japan . |
| 5-107471 | 4/1993 | Japan . |
| 5-134172 | 5/1993 | Japan . |
| 6-230273 | 8/1994 | Japan . |
| 7-159697 | 6/1995 | Japan . |
| 7-181376 | 7/1995 | Japan . |

*Primary Examiner*—Scott J. Sugarman
*Assistant Examiner*—Jordan M. Schwartz
*Attorney, Agent, or Firm*—Pillsbury Madison & Sutro LLP

[57] ABSTRACT

A lens system composed of a first lens unit, a second lens unit having a positive refractive power, a third lens unit having a negative refractive power, and a fourth lens unit having a positive refractive power. The lens system is composed of a small number of lens components and configured compact by disposing at least one radial type gradient index lens component in the second lens unit and selecting an adequate refractive index distribution for the radial type gradient index lens component.

36 Claims, 28 Drawing Sheets

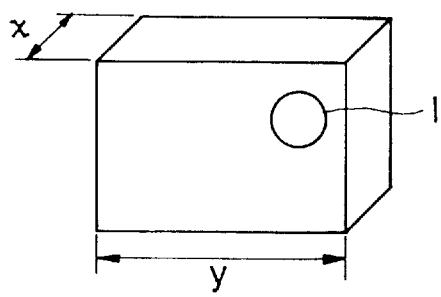
FIG. 51A
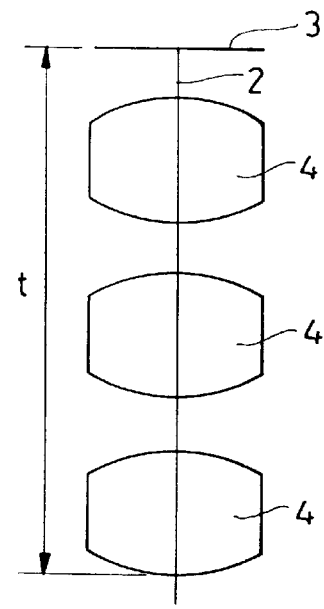
FIG. 51B
FIG. 51C
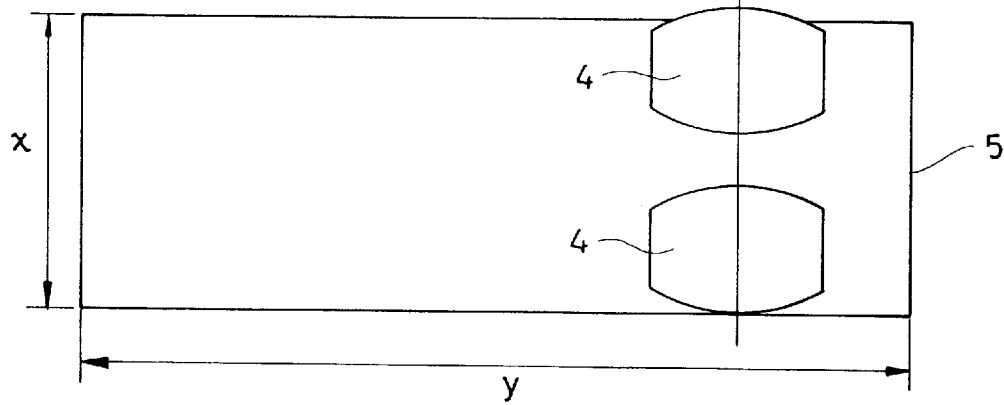
FIG. 51D
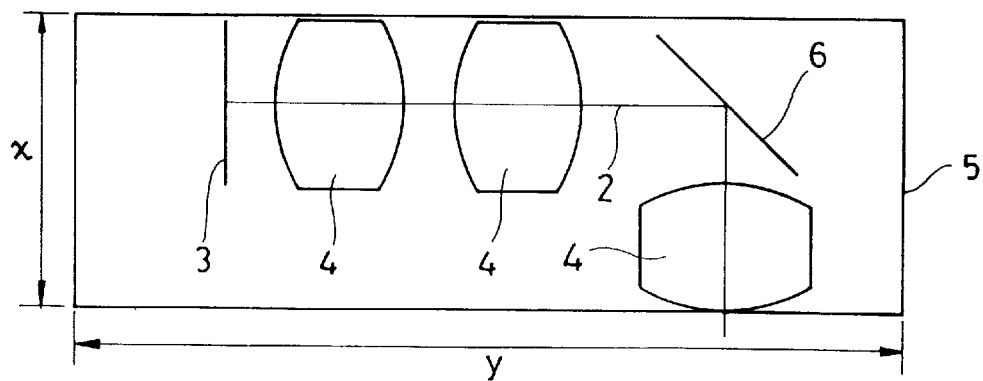

LENS SYSTEM

This is a division of application Ser. No. 08/825,134, filed Mar. 19, 1997 now U.S. Pat. No. 5,973,850.

BACKGROUND OF THE INVENTION a) Field of the Invention

The present invention relates to a lens system which is to be used in video cameras, TV telephones, etc. and uses a radial type gradient index lens component.

b) Description of the Prior Art

In the recent years where there are prevailing video cameras and TV telephones using solid-state image pickup devices such as CCDs, there is a demand to reduce the number of lens components disposed in a lens system which is to be used in these optical apparatuses for configuring the optical apparatuses compactor and lowering manufacturing costs thereof.

On the other hand, it is demanded to enhance optical performance of such a lens system as picture elements are arranged at higher densities on image pickup devices.

A lens system disclosed by Japanese Patent Kokai Publication No. Hei 7-181376, for example, is generally known as a lens system which has high optical performance and is usable in video cameras, TV telephones, etc. This conventional example is composed of ten to twelve lens elements so as to be a lens system having high optical performance.

Further, a lens system disclosed by Japanese Patent Kokai Publication No. Hei 5-134172 or Hei 6-230273 is known as another conventional example which uses a radial type gradient index lens component for reducing a number of lens components while maintaining high optical performance, and is composed of three lens components.

However, the conventional example mentioned above is configured for use in silver salt cameras and makes an amount of marginal rays insufficient when it is used in a lens system which uses a solid-state image pickup device since it has an exit pupil located extremely close to an image surface and does not allow nearly telecentric incidence of offaxial rays onto the image surface.

Further, a lens system disclosed by Japanese Patent Kokai Publication No. Hei 7-159697 is known as a conventional example of lens system which uses a gradient index lens component and is composed of three lens components. However, this conventional example is an objective lens system for microscopes using a radial type gradient index lens component and has a narrow field angle.

Furthermore, a lens system disclosed by Japanese Patent Kokai Publication No. Hei 4-97309 is known as a conventional example of lens system which has a relatively large field angle and is configured while taking telecentric incidence of offaxial rays into consideration. However, this conventional example has an extremely large difference in refractive index between an axial portion and a marginal portion of the gradient index lens component, whereby it is difficult to manufacture a material for the gradient index lens component.

Moreover, lens systems disclosed by Japanese Patent Kokai Publication No. Sho 52-29238 and No. Hei 5-107471 are known as conventional examples each of which is composed of two to five lens components. However, these conventional examples are objective lens systems for endoscopes which use radial type gradient index lens components and produce distortion in extremely large amounts.

SUMMARY OF THE INVENTION

A primary object of the present invention is to provide a compact lens system which is composed of lens components in a number on the order of two to five and has favorably corrected aberrations.

The lens system according to the present invention, which has a first composition, is composed of a first lens unit which comprises at least one positive lens element and at least one negative lens element, and a second lens unit which comprises at least one positive lens element, and one radial type gradient index lens component having a refractive index distribution which is axially symmetrical in a radial direction.

The lens system according to the present invention, which has a second composition, is composed of a plurality of lens components, and comprises an aperture stop disposed on the object side and a radial type gradient index lens component which has a refractive index distribution which is axially symmetrical in the radial direction.

The lens system according to the present invention, which has a third composition, is composed of a first lens unit consisting of a single lens component, an aperture stop and a second lens unit comprising at least one positive lens component and a radial type gradient index lens component having a refractive index distribution which is axially symmetrical in the radial direction.

Moreover, the lens system according to the present invention which has a fourth composition, is composed of a plurality of lens components, uses at least one reflecting surface disposed in the lens system and comprises at least one radial type gradient index lens component having a refractive index distribution which is axially symmetrical in the radial direction.

BRIEF DESCRIPTION OF THE DRAWINGS

FIGS. 51A, 51B, 51C and 51D show diagrams schematically illustrating a condition where the lens system according to the present invention is assembled in an electronic image pickup camera;

DETAILED DESCRIPTION OF THE PREFERRED EMBODIMENTS

Figure 1:
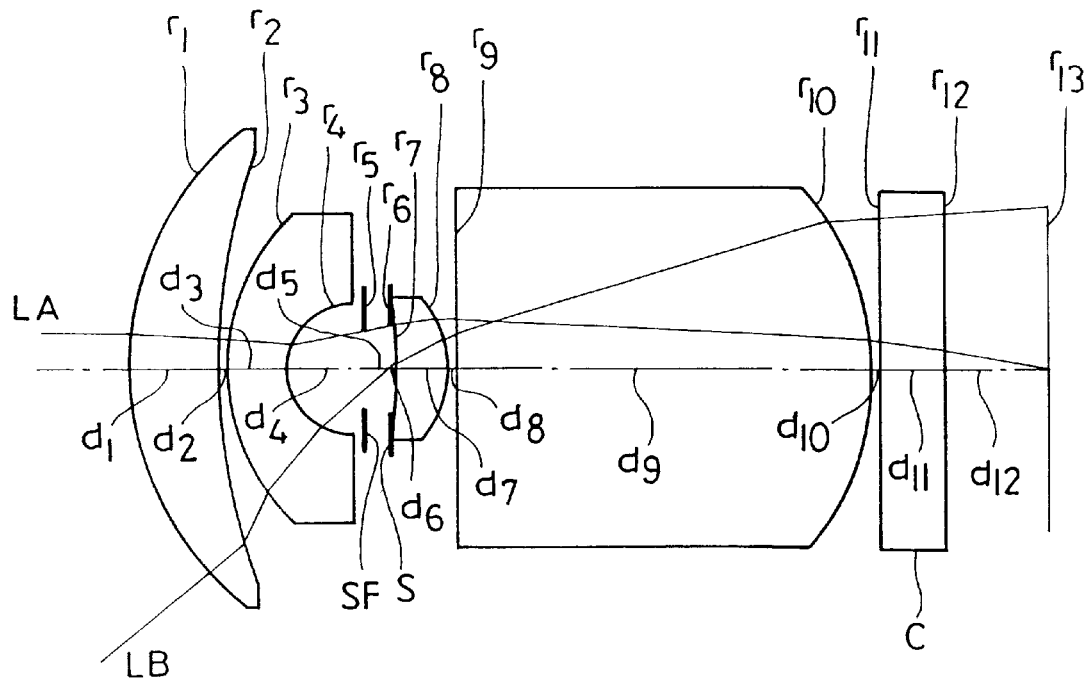
FIGS. 1 through 5 show sectional views illustrating first through fifth embodiments respectively of the lens system according to the present invention.

The lens system according to the present invention is characterized in that it is composed of a first lens unit which consists of at least one positive lens component and at least one negative lens component, and a second lens unit which consists of at least one positive lens component, and that the second lens unit comprises at least one radial type gradient index lens component having a refractive index distribution which is axially symmetrical in a radial direction expressed by a formula (a) shown below, and satisfying the following conditions (1) and (4):

$$N\lambda(r)=N_0\lambda+N_1\lambda r^2+N_2\lambda r^4+ \tag{a}$$

$$1/V1<1/VO \tag{1}$$

$$-0.5<N_1\times f^2<-0.01 \tag{4}$$

wherein the reference symbol r represents a distance as measured from an optical axis in the radial direction, the reference symbol $N\lambda(r)$ designates a refractive index for a wavelength $\lambda$ at a point located at the distance r, the reference symbol $N_i\lambda$ designates a refractive index distribution coefficient of 2i'th order at the wavelength A, the reference symbols $v_o$ and $v_i$ denote values expressed by formula (c) and (d) respectively shown below, and the reference symbol f represents a focal length of the lens system as a whole.

$$V_0=(N_{0d}-1)/(N_{0F}-N0C) \tag{c}$$

$$v_i=N_{id}/(N_{iF}-N_{iC}) \tag{d}$$

wherein the reference symbols $N_{od}$, $N_{oF}$ and $N_{oC}$ represent refractive indices on the optical axis for the d-line, F-line and C-line respectively, and the reference symbols $N_{id}$, $N_{iF}$ and $N_{iC}$ designate distribution coefficients of the 2i'th order for the d-line, F-line and C-line respectively.

In the specification of the present invention, the d-line is taken as a standard wavelength and the reference symbols such as $N_i$ represent values for the d-line unless wavelength are otherwise specified.

The lens system according to the present invention which has the first composition is composed of the first lens unit having a negative refractive power and the second lens unit having a positive refractive power as described above, or is configured as a retrofocus type lens system using at least one radial type gradient index lens component. A retrofocus type lens system is used for obtaining a lens system which uses a solid-state image pickup device such as a CCD and has a relatively wide field angle. Though the retrofocus type lens system is advantageous for widening the field angle and telecentric incidence, it has an asymmetrical refractive power distribution and has a defect that offaxial aberration can hardly be corrected in the lens system. When the lens system is composed of two to four lens components, in particular, lateral chromatic aberration is apt to be undercorrected, thereby making it difficult to obtain favorable imaging performance. For correcting the lateral chromatic aberration, it is desirable to use at least one radial type gradient index lens component in the second lens unit.

Since a radial type gradient index lens component has a refractive index distribution which is axially symmetrical in the radial direction, it is capable of refracting rays in a medium of the lens component and has a larger freedom for correction of aberrations. It is known that a radial type gradient index lens component has a characteristic that it is excellent in correction of chromatic aberration, in particular.

Lateral chromatic aberration LTC produced by a gradient index lens component which has a refractive index expressed by the above-mentioned formula (a) is expressed by the following formula (b):

$$LTC=K(\phi_s/V_0+(V_1) \tag{b}$$

wherein the reference symbol K represents a constant having a value which is determined dependently on heights of offaxial rays and an angle of a final axial ray, the reference symbol $\phi_s$ designates a refractive power of surface of the radial type gradient index lens component considered as a thin lens and the reference symbol $\phi_m$ denotes a refractive power of medium of the radial type gradient index lens component.

Further, it is known that the refractive power of medium $\phi_m$ is approximated by the following formula (e):

$$\phi_m \approx -2N_1 t_G \tag{e}$$

wherein the reference symbol $t_G$ represents thickness of the radial type gradient index lens component.

As one can understand from the formula (b), it is possible to control chromatic aberration produced to a desired amount by varying a value of VI in the second term. For configuring a radial type gradient index lens component so as to produce chromatic aberration in an amount smaller than that of chromatic aberration produced by a homogeneous lens component having a refractive power which is the same as that of the radial type gradient index lens component, it is required from the formula (b) to satisfy the following formula (m):

$$\phi_s/V_0+\phi_m/V_1<\phi_h/V_0 \tag{m}$$

The left side represents a radial type gradient index lens component, and the right side designates a homogeneous lens component, in which the reference symbol Oh denotes a refractive power of the homogeneous lens component and the homogeneous lens component has an Abbe's number which is the same as an Abbe's number of the radial type gradient index lens component on the optical axis. Since the radial type gradient index lens component and the homogeneous lens component have the same refractive power, there is established the following formula (n):

$$\phi_h=\phi_s+\phi_m \tag{n}$$

From the two formulae (m) and (n) mentioned above, we obtain the following formula (p):

$$\phi_s/V_0+\phi_m/V_1<\phi_s/V_0+\phi_m/V_0 \tag{p}$$

The condition (1) mentioned above is derived from this formula (p).

The condition (1) is required for configuring a radial type gradient index lens component so as to produce chromatic aberration in an amount smaller than that of chromatic aberration produced by a homogeneous lens component having a refractive power which is the same as that of the radial type gradient index lens component.

For correcting lateral chromatic aberration which poses a problem in the lens system according to the present invention, it is desirable to configure a radial type gradient index lens component so as to satisfy the condition (1) and have a positive refractive power, and dispose it in a second lens unit which has a positive refractive power. By selecting such a composition, it is possible to configure the second lens unit so as to produce lateral chromatic aberration in a smaller amount, thereby correcting lateral chromatic aberration favorably in the lens system as a whole.

If the condition (1) is not satisfied, lateral chromatic aberration will be undercorrected.

For correcting lateral chromatic aberration, it is conceivable to configure a radial gradient index lens component so as to have a negative refractive power and dispose this lens component in a first lens unit which has a negative refractive power. When a chromatic aberration produced by a negative lens component is reduced, however, longitudinal chromatic aberration will undesirably be undercorrected in the lens system as a whole.

As one can understand from the formula (b), it is necessary for favorable correction of chromatic aberration to strengthen the refractive power of medium $\phi_m$ to a certain degree. It is therefore necessary to enhance $N_1$ or enlarge the lens thickness $t_G$. However, a lens component is thickened and a total length of a lens system is prolonged by extremely enlarging a value of $t_G$. For this reason, it is desirable for the lens system according to the present invention that $N_1$ satisfied the following condition (2):

$$-2 < N_1 \times f^2 < -0.005 \qquad (2)$$

By configuring a gradient index lens component so as to satisfy the condition (2) mentioned above, it is possible to favorably correct lateral chromatic aberration by strengthening a refractive power of medium without extremely thickening the lens component. If the upper limit of −0.005 of the condition (2) is exceeded, lateral chromatic aberration will be undercorrected. If the lower limit of −2 of the condition (2) is not satisfied, in contrast, lateral chromatic aberration will be overcorrected.

When the lens system according to the present invention is to be used in a system which requires higher imaging performance, it is desirable to configure the lens system so as to satisfy the following condition (3):

$$-1 < N_1 \times f^2 < -0.01 \qquad (3)$$

Lateral chromatic aberration can be corrected favorably when the condition (3) is satisfied.

If the upper limit of −0.01 of the condition (3) is exceeded, lateral chromatic aberration will be undercorrected. If the lower limit of −1 of the condition (3) is not satisfied, in contrast, lateral chromatic aberration will be overcorrected, or correction of lateral chromatic aberration will be insufficient for use of the lens system in a system which requires high imaging performance.

When an attempt is made to configure the lens system according to the present invention which is composed of lens components in a small number on the order of two to four so as to have a wide field angle, a positive Petzval's sum is enlarged, thereby producing a tendency to tilt an image surface toward the object side. For correcting this tendency, we conceived to correct the positive Petzval's sum using a radial type gradient index lens component.

A Petzval's sum to be produced by a radial type gradient index lens component is approximated by the following formula (f):

$$PTZ = \phi_s/N_0 + \phi_m/N_0^2$$

Since the denominator of the second term is squared in the formula (f) mentioned above, it is possible to reduce a value of a Petzval's sum by using a radial type gradient index lens component in place of a homogeneous lens component having a refractive power which is the same as that of the radial type lens component. However, a sufficient effect to correct a Petzval's sum cannot be obtained when the radial type gradient index lens component has a weak refractive power of medium $\phi_m$. When the condition (2) mentioned above is satisfied, a radial type gradient index lens component has a sufficiently strong power of medium, thereby being capable of correcting a Petzval's sum in the lens system according to the present invention. That is to say, the condition (2) mentioned above is required for favorably correcting not only lateral chromatic aberration but also a Petzval's sum.

If the upper limit of −0.005 of the condition (2) is exceeded, a Petzval's sum will be undercorrected, thereby tilting an image surface toward the object side. If the lower limit of −2 of the condition (2) is not satisfied, in contrast a Petzval's sum will be overcorrected, thereby tilting the image surface in a direction away from an object.

For correcting a Petzval's sum more favorably, it is desirable to satisfy the above-mentioned condition (3).

If the upper limit of −0.01 of the condition (3) is exceeded, a Petzval's sum will be undercorrected, thereby tilting the image surface toward the object side. If the lower limit of −1 of the condition (3) is not satisfied, a Petzval's sum will be overcorrected, thereby undesirably tilting the image surface in the direction away from the object.

When the lens system according to the present invention is to be used in a system which has a wide field angle and requires high imaging performance, it is desirable to configure the lens system so as to satisfy the condition (3).

For favorably correcting lateral chromatic aberration, it is desirable to satisfy the following condition (4):

$$-0.5 < N_1 \times f^2 < -0.02 \qquad (4)$$

If the upper limit of −0.02 of the condition (4) is exceeded, lateral chromatic aberration or a Petzval's sum will undesirably be undercorrected. If the lower limit of −0.5 of the condition (4) is not satisfied, in contrast, a Petzval's sum or lateral chromatic aberration will be overcorrected, thereby undesirably tilting the image surface in the direction away from the object side.

For favorably correcting lateral chromatic aberration in particular in a retrofocus type lens system with a smaller number of lens components, it is desirable to compose a first lens unit of a positive lens component and a negative lens component. By composing a first lens unit as described above, it is possible to reduce lateral chromatic aberration to be produced in this first lens unit though it is composed only of the two lens components, thereby making it possible to obtain a lens system having high imaging performance.

For obtaining a retrofocus type lens system which is composed of an extremely small number of lens components and can be manufactured at an extremely low cost, it is desirable to compose a first lens unit of a single negative lens component. Further, by using a radial type gradient index lens component in a second lens unit, it is possible to correct aberrations favorably in a lens system even when the first lens unit is composed of the single negative lens component.

For correcting distortion, in particular in a retrofocus type lens system with a smaller number of lens components, it is desirable to compose a first lens unit of two negative lens components. By composing a first lens unit of two negative lens components, it is possible to share a negative refractive power of the first lens unit between the two negative lens components, thereby reducing barrel form distortion produced in the first lens unit.

For obtaining a retrofocus type lens system which is composed of an extremely small number of lens components and can be manufactured at an extremely low cost, it is desirable to compose a second lens unit of a single radial type gradient index lens component. By using a radial type gradient index lens component, it is possible to favorably correct aberrations even when the second lens unit is composed of a single lens component, thereby obtaining a lens system composed of a small number of lens components.

For obtaining an image pickup lens system by using an image pickup device which has picture elements arranged at a narrow pitch with the retrofocus type lens element according to the present invention, it is desirable to compose a second lens unit of two lens components at least one of which is a radial type gradient index lens component. Though it is possible to compose the second lens unit of a single radial type gradient index lens component, it is desirable to use an additional lens component for correcting aberrations more favorably, thereby obtaining a lens system which has higher imaging performance.

The lens system according to the present invention can be configured as a lens system which is other than the retrofocus type lens system having the first composition, or has a composition described below (the second composition). Speaking concretely, the lens system according to the present invention which has the second composition is copposed of a plurality of lens components including at least one radial type gradient index lens component and comprises a stop disposed on the object side.

In a case of an optical system which uses an image pickup device such as a CCD or an optical fiber bundle on an image pickup surface, it is desirable for preventing marginal rays from being attenuated to allow offaxial rays to be incident onto an image surface nearly telecentrically. When a stop is disposed on the object side as in a lens system as in the lens system according to the present invention which has the second composition, it is easy to allow offaxial rays nearly telecentrically. Disposition of a stop on the object side described above provides another merit to make it relatively easy to correct lateral chromatic aberration and distortion which are produced due to a lens arrangement which is asymmetric as compared with that in a retrofocus type lens system. However, the lens system according to the present invention which has the second composition can hardly have a wide field angle as compared with the retrofocus type lens system. Therefore, it is desirable to use the lens system according to the present invention which has the second composition as a lens system having a field angle 2(on the order of 500 to 650. Aberrations in particular can be corrected favorably in the lens system according to the present invention which has the second composition by using a radial type lens component that is excellent in correction of aberrations as described above.

As compared with a disposition of a stop in a lens system, the disposition of a stop on the object side provides a merit that optical performance of a lens system is influenced less due to eccentricities of lens components. Though an eccentricity of a lens barrel poses a problem when lens components are disposed before and after a stop, such an eccentricity of a lens barrel poses no problem when a stop is disposed on the object side.

Further, it is hard to correct lateral chromatic aberration produced by positive lens components in the lens system according to the present invention which has the second composition. For correcting lateral chromatic aberration favorably, it is desirable to configure the radial type gradient index lens component so as to satisfy the condition (1) mentioned above. When the condition (1) is satisfied, the radial type gradient index lens component produces chromatic aberration in a smaller amount, thereby making it possible to correct lateral chromatic aberration favorably in the lens system as a whole. If the condition (1) is not satisfied, lateral chromatic aberration will be undercorrected in the lens system as a whole.

Since the lens system according to the present invention which has the second composition comprises no lens component which has a strong negative refractive power unlike the first lens unit of the retrofocus type lens system, a Petzval's sum is apt to be remarkable in the former lens system as a whole.

Accordingly, it is desirable to configure the radial type gradient index lens component to be used in the lens system which has the second composition so as to satisfy the condition (2). So far as the condition (2) is satisfied, the radial type gradient index lens element has a sufficient refractive power of medium and is capable of favorably correcting a Petzval's sum. If the upper limit of –0.005 of the condition (2) is exceeded, a Petzval's sum will be undercorrected, thereby undesirably tilting an image surface toward the object side. If the lower limit of –2 of the condition (2) is not satisfied, in contrast, a Petzval's sum will be overcorrected, thereby undesirably tilting the image surface in a direction away from an object. Also for correcting lateral chromatic aberration, it is desirable to satisfy the condition (2) as described above.

The lens system according to the present invention which has the third composition is composed of a first lens unit which consists of a single positive lens component and a second lens unit which comprises at least one radial type gradient index lens component.

The third composition is relatively similar to the second composition described above, or different from the second composition mainly in that a positive lens component is disposed on the object side of a stop in the third composition.

The lens system according to the present invention is configured mainly for nearly telecentric incidence of offaxial rays onto an image surface and favorable correction of aberrations as described above. In correction of aberrations, it is important to correct offaxial aberrations which pose problems in a lens system which has a wide field angle in particular.

By disposing a positive lens component as in the lens system according to the present invention which has the third composition, asymmetry of a lens system composed of a small number of lens components as a whole is moderated, thereby making it possible to favorably correct offaxial aberrations such as lateral chromatic aberration and distortion. Further, the disposition of the positive lens component makes it easy to allow offaxial rays to be telecentrically incident onto the image surface since the stop is disposed on the image side of the first lens component, or relatively on the object side. Further, it is desirable to use a radial type gradient index lens component for favorably correcting aberrations.

As compared with a retrofocus type lens system, the lens system according to the present invention which has the third composition has a field angle which can be widened rather hardly. It is therefore desirable to use this lens system with a specification for a field angle narrower than $2\omega$ on the order of 50° to 65°.

For correcting lateral chromatic aberration in the radial type gradient index lens component disposed on the image side of the stop in the lens system according to the present invention which has the third composition, it is desirable to satisfy the condition (1). When the condition (1) is satisfied, lateral chromatic aberration can be corrected favorably as described above. If the condition (1) is not satisfied, lateral chromatic aberration will be undercorrected.

Further, a positive Petzval's sum is apt to be remarkable in the lens system according to the present invention which has the third composition since it comprises no lens component having a strong negative refractive power, unlike the first lens unit of the retrofocus type lens system. For correcting this Petzval's sum, it is desirable to configure the radial type gradient index lens component so as to satisfy the condition (2). When the condition (2) is satisfied, the radial type gradient index lens element has a sufficiently strong refractive power of medium, thereby being capable of favorably correcting the Petzval's sum. If the upper limit of −0.005 of the condition (2) is exceeded, the Petzval's sum will be undercorrected, thereby undesirably tilting the image surface toward the object side. If the lower limit of −2 of the condition (2) is not satisfied, in contrast, the Petzval's sum will be overcorrected, thereby undesirably tilting the image surface in a direction away from an object. Also for correction of lateral chromatic aberration, it is desirable to satisfy the condition (2) as described above.

For correcting distortion in particular in the lens system according to the present invention which has the second or third composition, it is desirable to dispose at least two positive lens components on the image side of the stop, thereby sharing a positive refractive power between these lens components. For correcting lateral chromatic aberration favorably in the lens system according to the present invention which has the second or third composition, it is desirable to disposed at least one positive lens component and at least one negative lens component on the image side of the stop.

The lens system according to the present invention which has a fourth composition crises at least one reflecting surface and at least one radial type gradient index lens component.

It is very difficult to configure a lens system so as to have a short total length and high imaging performance for satisfying the demands for compact cameras which have high optical performance. However, it is possible to obtain an extremely compact lens system while maintaining high imaging performance by using a reflecting surface as a portion of the lens system.

FIGS. 51A, 51B, 51C and 51D exemplify an electronic image pickup camera to which the lens system according to the present invention is applicable: FIG. 51A schematically showing the electronic image pickup camera, FIG. 51B showing a sectional view of the lens system, FIG. 51C showing a case where the lens system is applied without using a reflecting surface and FIG. 51D showing a case where the lens system is applied with a reflecting surface. In these drawings, a reference numeral 1 represents the lens system as seen from an object, a reference numeral 2 designates an optical axis of the lens system, a reference numeral 3 denotes an image surface, a reference numeral 4 represents a lens component, a reference numeral 5 designates a frame and a reference numeral 6 denotes a reflecting surface. Further, a reference symbol x represents a direction of the depth of the camera, a reference symbol y designates a direction of length of the camera and a reference symbol t denotes a total length of the camera.

In recent years, cameras having sizes that are compact enough to be put into pockets of jackets or shirts are in strong demand and it is desired to configure thin cameras or shorten lengths in the x direction. However, total lengths of lens systems tend to be prolonged for obtaining optical systems which have high imaging performance and it is very difficult to make compactness compatible with high optical performance. Accordingly, the fourth composition uses a reflecting surface so as to satisfy the demand for thin cameras by bending an optical axis. When a lens system which has a total length t, which is shown in FIG. 51B, is applied to a camera shown in FIG. 51A without using a reflecting surface, for example, the lens system cannot be accommodated in the x direction as shown in FIG. 51C and protrudes from a camera body. By bending the optical axis using a reflecting surface 6 as shown in FIG. 51D, it is possible to accomodate the lens system in the camera so as not to protrude in the x direction.

For correcting lateral chromatic aberration favorably in the lens system according to the present invention, which has the fourth composition, it is desirable to configure the radial type gradient index lens component so as to satisfy the condition (1). When the radial type gradient index lens component satisfies the condition (1), it is capable of favorably correcting lateral chromatic aberration. If the condition (1) is not satisfied, chromatic aberration will undesirably be undercorrected.

For correcting a Petzval's sum and lateral chromatic aberration in the lens system according to the present invention, which has the fourth composition, it is desirable to satisfy the condition (2). When the radial type gradient index lens component satisfies the condition (2), it has a sufficiently large value of refractive power of medium, and is capable of favorably correcting a Petzval's sum and lateral chromatic aberration. If the upper limit of −0.005 of the condition (2) is exceed, a Petzval's sum will be undercorrected, thereby undesirably tilting an image surface toward the object side or underecorrecting lateral chromatic aberration. If the lower limit of −2 of the condition (2) is exceeded, a Petzval's sum will be overcorrected, thereby undesirably tilting the image surface in a direction away from an object.

For correcting lateral chromatic aberration more favorably in the lens system according to the present invention which has any one of the first through fourth compositions, it is desirable to configure the radial type gradient index lens component so as to satisfy the following condition (5):

$$1/V_1 < 0.012 \tag{5}$$

Though a radial type gradient index lens component which is configured so as to satisfy the condition (1) produces chromatic aberration in an amount smaller than that of chromatic aberration produced by a homogeneous lens component having a refractive power which is the same as that of the radial type gradient index lens component, the radial type gradient index lens component exhibits a lower chromatic aberration correcting effect when $V_1$ has a value close to a value of $V_0$. It is therefore desirable that the radial type gradient index lens component satisfies the condition (5). If the condition (5) is not satisfied, lateral chromatic aberration will undesirably be undercorrected.

For obtaining a high performance image pickup lens system by using an image pickup device having picture elements arranged at a narrow pitch with the lens system according to the present invention which has any one of the compositions described above, it is desirable to configure the radial type gradient index lens component so as to satisfy the following condition (6):

$$-0.2 < 1/V_1 < 0.007 \tag{6}$$

If the upper limit of 0.007 of the condition (6) is exceeded, lateral chromatic aberration will undesirably be undercorrected in the lens system as a whole. If the lower limit of −0.2 of the condition (6) is not satisfied, lateral chromatic aberration will undesirably be overcorrected in the lens system as a whole.

When the above-mentioned condition (1) is satisfied by the radial type gradient index lens component used in the lens system according to the present invention which has any one of the compositions described above, the radial type gradient index lens component produces chromatic aberration in an amount smaller than that of chromatic aberration produced by a homogeneous lens component having a refractive power which is the same as that of the radial type gradient index lens component. When the lens system according to the present invention is to be configured so as to have a wide field angle, however, it is desirable for favorably correcting lateral chromatic aberration to slightly overcorrect chromatic aberration by a medium of the radial type gradient index lens component. For this purpose, it is desirable to satisfy the following condition (7):

$$-0.1 < 1/V_1 < 0 \qquad (7)$$

When the condition (7) mentioned above is satisfied, a medium of the radial type gradient index lens component produces slightly overcorrected lateral chromatic aberration, thereby making it possible to correct lateral chromatic aberration favorably in the lens system as a whole. If the upper limit of 0 of the condition (7) is exceeded, lateral chromatic aberration will undesirably be undercorrected in the lens system as a whole. If the lower limit of $-0.1$ of the condition (7) is not satisfied, in contrast, lateral chromatic aberration will undesirably be overcorrected in the lens system as a whole.

For correcting lateral chromatic aberration or a Petzval's sum favorably in the lens system according to the present invention which has any one of the compositions described above, it is desirable to satisfy the condition (2). When the lens system according to the present invention is to be used in a highly precise fine image system which uses an image pickup device having picture elements arranged at a narrow pitch, however, it is desirable to configure the radial type gradient index lens component so as to satisfy the following condition (8):

$$-0.4 < N_1 \times f^2 < -0.05 \qquad (8)$$

If the upper limit of $-0.05$ of the condition (8) is exceeded, lateral chromatic aberration and a Petzval's sum will undesirably be undercorrected. If the lower limit of $-0.4$ of the condition (8) is not satisfied, in contrast, lateral chromatic aberration will undesirably be overcorrected.

Flare may be produced and transmittance may be lowered when the radial type gradient index lens component is extremely thick in the lens system according to the present invention which has any one of the compositions described above. Therefore, it is desirable that the radial type gradient index lens component used in the lens system according to the present invention which has any one of the compositions satisfies the following condition (9):

$$0.5 < t_G/f < 10 \qquad (9)$$

wherein the reference symbol tG represents thickness of the radial type gradient index lens component.

If the lower limit of 0.5 of the condition (9) is not satisfied, the radial type gradient index lens component will have a weak refractive power of medium and undesirably undercorrect lateral chromatic aberration. If the upper limit of 10 of the condition (9) is exceeded, in contrast, the radial type gradient index lens component will be thick, thereby undesirably producing flare and lowering transmittance.

Further, it is possible to control production amounts of spherical aberration and coma by selecting an adequate value for the distribution coefficient of the fourth order $N_2$ of the radial type gradient index lens component to be used in the lens system according to the present invention which has any one of the compsitions. For favorably correcting coma posing a problem in the lens system according to the present invention which has any one of the compsitions and a wide field angle in particular, it is therefore desirable to configure the radial type gradient index lens component so as to satisfy the following condition (10):

$$-0.5 < N_2 \times f^4 < 0.5 \qquad (10)$$

If the lower limit of -0.5 of the condition (10) is not satisfied, coma will undesirably be undercorrected. If the upper limit of 0.5 of the condition (10) is exceeded, in contrast, coma will undesirably be overcorrected.

When the lens system according to the present invention which has any one of the compositions described above is to be applied to a system requiring higher imaging performance, it is desirable to satisfy, in place of the condition (10), the following condition (11):

$$-0.3 < N_2 \times f^4 < 0.3 \qquad (11)$$

If the lower limit of $-0.3$ of the condition (11) is not satisfied, coma will be undercorrected or if the upper limit of 0.3 of the condition (11) is exceeded, in contrast, coma will be overcorrected, thereby making it impossible to obtain high imaging performance in either case.

The lens system according to the present invention which has any one of the compositions described above is applicable not only to image pickup systems and various types of measuring apparatuses but also to objective lens systems for endoscopes.

Further, it is possible to obtain image pickup lens systems which are compact and can be manufactured at low cost by composing the homogeneous lens component or the radial type gradient index lens component of an optical element having an effect of a low pass filter or a band cut filter cutting off components having specific wavelengths.

When a CCD which has sensitivity within the infrared wavelength region, for example, is to be used as an image pickup device, it is necessary to dispose a cut filter which cuts off components having wavelengths within the infrared region in a lens system. When a radial type gradient index lens component, for example, has a function to cut off the components having wavelengths within the infrared region, it is unnecessary to use an additional infrared cut filter, thereby making it possible to configure the lens system to be more compact and lower the manufacturing cost thereof.

Furthermore, it is possible to correct aberrations more favorably in the lens system according to the present invention which has any one of the compositions by configuring at least one of the surfaces of the homogeneous lens component or the radial type gradient index lens component as an aspherical surface. When a surface of the gradient index lens component is to be configured as an aspherical surface, the aspherical surface can be formed by cementing or bringing a transparent material such as resin, glass or liquid to or into close contact. Further, an aspherical surface can be formed on a radial type gradient index lens component by precision grinding and polishing.

For correcting distortion and coma, in particular, favorably in the lens system according to the present invention which has any one of the compositions, it is desirable to configure the radial type gradient index lens component to be disposed on the object side of the stop so as to have a convex image side surface and a refractive index distribution in which refractive indices are lowered from the optical axis toward a margin. When the radial type gradient index lens component is configured as described above, it has a refractive power of surface which is weakened from the optical axis toward the margin, thereby making it possible to favorably correct distortion and coma produced by this surface.

For correcting offaxial aberrations in particular, favorably in the lens system according to the present invention which has any one of the compositions, it is desirable to use at least one meniscus lens component having a concave surface on the stop side. It is desirable to impart a negative refractive power to this meniscus lens component when it is to be disposed in the first lens unit located on the object side of the stop, or it is preferable to impart a positive refractive power to the meniscus lens component when it is to be disposed in the second lens unit located on the image side of the stop.

In the lens system according to the present invention which has a wide field angle, it is difficult to correct offaxial aberrations produced by the negative lens component on the object side of the stop and offaxial aberrations produced by the positive lens components on the image side of the stop. For correcting these offaxial aberrations, it is desirable to use a meniscus lens component as described above. A meniscus lens component, one which has radii of curvature of small absolute values on both surfaces in particular, may hardly be worked with high precision. However, a meniscus lens component, even if it has high curvature, can easily be manufactured by cementing or bringing into close contact planar surfaces of a concavo-planar lens element and a plano-convex lens element which can be worked relatively easily.

For correcting lateral chromatic aberration favorably in the lens system according to the present invention which has any one of the compositions described above, it is desirable to use at least one cemented lens component in the lens system. Lateral chromatic aberration can be corrected more favorably particularly by disposing a cemented lens component on the image side of the stop.

It is desirable to use a single radial type gradient index lens component so that the lens system can be manufactured at a low cost.

Further, the lens system can be configured to be compact by disposing a reflecting surface in the lens system.

For reducing the manufacturing cost of the lens system by lowering a cost required for polishing the lens components, it is desirable to configure at least one lens component so as to have at least one planar surface.

The lens system according to the present invention can be focused onto an extremely short object distance by moving some of the lens components or the lens system as a whole along the optical axis.

When the first lens unit which is disposed on the object side of the stop is to be composed of at least one positive lens element and at least one negative lens element in the lens system according to the present invention which has any one of the compositions described above, it is desirable for correcting lateral chromatic aberration produced by the first lens unit to satisfy the following condition (12):

$$\nu_p/\nu_n < 0.95 \qquad (12)$$

wherein the reference symbols $\nu_p$ and $\nu_n$ represent Abbe's numbers of the positive lens component and the negative lens component respectively disposed in the first lens unit.

If the condition (12) is not satisfied, lateral chromatic aberration will be overcorrected and cannot be corrected sufficiently in the lens system as a whole.

When the lens system according to the present invention which has any one of the compositions described above is to be applied to a system requiring higher imaging performance, it is desirable to satisfy not only the above-mentioned condition (10), but also the following condition (13):

$$\nu_p/\nu_n < 0.75 \qquad (13)$$

If the condition (13) is not satisfied, lateral chromatic aberration will be undercorrected in the lens system, or correction of lateral chromatic aberration will undesirably be insufficient for application to the system requiring the higher imaging performance. For correcting Petzval's sum in particular in the lens system according to the present invention which has any one of the compositions described above, it is desirable to use, in the lens system, at least one positive lens component and at least one negative lens component which satisfy the following condition (14):

$$1 < N_p/N_n \qquad (14)$$

wherein the reference symbol $N_p$ represents a refractive index of the positive lens component and the reference symbol $N_n$ designates a refractive index of the negative lens component.

When the condition (14) is satisfied, a positive Petzval's sum can be corrected favorably. If the condition (14) is not satisfied, a Petzval's sum will be undercorrected, thereby tilting the image surface toward the object side.

When the lens system according to the present invention which has any one of the compositions described above is to be configured so as to have a relatively wide field angle, it is desirable for favorable correction of a Petzval's sum to satisfy, in place of the condition (14), the following condition (15):

$$1.1 < N_p/N_n \qquad (15)$$

If the condition (15) is not satisfied, a Petzval's sum will be undercorrected.

When the first lens unit comprises at least one positive lens component in the lens system according to the present invention which has any one of the compositions described above, it is desirable for favorable correction of lateral chromatic aberration in the lens system as a whole to select, for the positive lens component comprised in the first lens unit, a material having a dispersing power relatively high enough to satisfy the following condition (16):

$$\nu_p < 50 \qquad (16)$$

wherein the reference symbol $\nu_p$ represents an Abbe's number of the positive lens component comprised in the first lens unit.

When the condition (16) is satisfied, lateral chromatic aberration can be corrected favorably in the lens system as a whole. If the condition (16) is not satisfied, lateral chromatic aberration will undesirably be undercorrected in the lens system as a whole.

For correcting lateral chromatic aberration more favorably, it is desirable to satisfy not only the condition (16) but also the following condition (17):

$$\nu_p < 42 \qquad (17)$$

If the condition (17) is not satisfied, lateral chromatic aberration will undesirably be undercorrected in the lens system as a whole.

The present invention adopts the square formula (a) for approximating refractive index variations of a medium of a gradient index material. Gradient index materials made of media whose refractive index variations are expressed by formulae other than the formula (a) are also applicable to the lens system according to the present invention by approximating the variations by the formula (a).

The lens system according to the present invention is not limited to those defined by the claims, but may have compositions which are substantially defined by the claims.

Now, the embodiments of the lens system according to the present invention will be described in detail below.

The embodiments of the lens system according to the present invention have compositions illustrated in FIGS. 1 through 50 and numerical data which is listed below:

Embodiment 1
f=2.27 mm, F-number=2.8, image height=1.85 mm, 2ω=79.00

$r_1 = 3.5530$
$d_1 = 1.0000$  $n_1 = 1.84666$  $\nu_1 = 23.78$
$r_2 = 7.2949$
$d_2 = 0.1000$
$r_3 = 2.5193$
$d_3 = 0.6844$  $n_2 = 1.88300$  $\nu_2 = 40.78$
$r_4 = 0.7524$
$d_4 = 0.8850$
$r_5 = \infty$
$d_5 = 0.3000$
$r_6 = \infty$ (stop)
$d_6 = 0.0500$
$r_7 = -6.6704$
$d_7 = 0.6000$  $n_3 = 1.49700$  $\nu_3 = 81.61$
$r_8 = -1.2025$
$d_8 = 0.1000$
$r_9 = \infty$
$d_9 = 4.7630$  $n_4$ (gradient index lens)
$r_{10} = -3.1659$
$d_{10} = 0.1000$
$r_{11} = \infty$
$d_{11} = 0.7500$  $n_5 = 1.48749$  $\nu_5 = 70.21$
$r_{12} = \infty$
$d_{12} = 1.1900$
$r_{13} = \infty$ (image)

Gradient index lens

|        | $N_0$   | $N_1$                   | $N_2$                  | $N_3$                  |
|--------|---------|-------------------------|------------------------|------------------------|
| d-line | 1.65000 | $-1.7533 \times 10^{-2}$ | $2.4961 \times 10^{-3}$ | $7.0121 \times 10^{-5}$ |
| C-line | 1.64567 | $-1.7575 \times 10^{-2}$ | $2.4961 \times 10^{-3}$ | $7.0121 \times 10^{-5}$ |
| F-line | 1.66011 | $-1.7436 \times 10^{-2}$ | $2.4961 \times 10^{-3}$ | $7.0121 \times 10^{-5}$ |

$1/V_0=2.22\times10^{-2}$, $1/V_1=-0.80\times10^{-2}$, $N_1\times f^2=-0.090$
$t_G/f2.10$, $N_2\times f^4=0.066$, $\nu_p/\nu_n=0.58$
$N_P/N_n=0.981$, $\nu_p=23.78$ Embodiment 2
f=2.86 mm, F-number=2.8, image height=1.85 mn, 2ω=68.50

$r_1 = 5.7537$
$d_1 = 0.8000$  $n_1 = 1.84666$  $\nu_1 = 23.78$
$r_2 = 26.0340$
$d_2 = 0.1000$
$r_3 = 1.8606$
$d_3 = 0.7795$  $n_2 = 1.76182$  $\nu_2 = 26.52$
$r_4 = 0.9682$
$d_4 = 0.5595$
$r_5 = -4.2257$
$d_5 = 4.1244$  $n_3$ (gradient index lens)
$r_6 = -2.7820$
$d_6 = 0.1000$
$r_7 = 5.4979$
$d_7 = 0.9000$  $n_4 = 1.61800$  $\nu_4 = 63.39$
$r_8 = -10.1657$
$d_8 = 0.7424$
$r_9 = \infty$
$d_9 = 0.7500$  $n_5 = 1.48749$  $\nu_5 = 70.21$
$r_{10} = \infty$
$d_{10} = 1.1900$
$r_{11} = \infty$ (image)

Gradient index lens

|        | $N_0$   | $N_1$                   | $N_2$                  | $N_3$                  |
|--------|---------|-------------------------|------------------------|------------------------|
| d-line | 1.65000 | $-1.5265 \times 10^{-2}$ | $2.0401 \times 10^{-4}$ | $1.3920 \times 10^{-4}$ |
| C-line | 1.64567 | $-1.5314 \times 10^{-2}$ | $2.0401 \times 10^{-4}$ | $1.3920 \times 10^{-4}$ |
| F-line | 1.66011 | $-1.5150 \times 10^{-2}$ | $2.0401 \times 10^{-4}$ | $1.3920 \times 10^{-4}$ |

(Focusing)

| | Object distance infinite | Object distance: 50 mm |
|---|---|---|
| $d_2$ | 0.1 | 0.9039 |

$1/V_0=2.22\times10^{-2}$, $1/V_1=-1.07\times10^{-2}$, $N_1\times f^2=-0.125$
$t_G/f=1.44$, $N_2\times f^4=0.014$, $\nu_p/\nu_n=0.90$
$N_p/N_n=1.048$, $\nu_p=23.78$ Embodiment 3
f=3.46 mm, F-number=2.8, image height=1.85 mm, 2ω=58.10

$r_1 = 6.6606$
$d_1 = 1.0000$  $n_1 = 1.84666$  $\nu_1 = 23.78$
$r_2 = -135.2532$
$d_2 = 0.1000$
$r_3 = 43.7393$
$d_3 = 0.7000$  $n_2 = 1.81600$  $\nu_2 = 46.62$
$r_4 = 2.0326$
$d_4 = 2.4197$
$r_5 = \infty$ (stop)
$d_5 = 1.3352$
$r_6 = \infty$
$d_6 = 4.4721$  $n_3$ = (gradient index lens)
$r_7 = -4.1696$
$d_7 = 1.0000$
$r_8 = \infty$
$d_8 = 1.6000$  $n_4 = 1.51633$  $\nu_4 = 64.15$
$r_9 = \infty$
$d_9 = 1.8180$  $n_5 = 1.51633$  $\nu_5 = 64.15$
$r_{10} = \infty$
$d_{10} = 1.6000$
$r_{11} = \infty$
$d_{11} = 0.7500$  $n_6 = 1.48749$  $\nu_6 = 70.21$
$r_{12} = \infty$
$d_{12} = 1.1887$
$r_{13} = \infty$ (image)

Gradient index lens

|        | $N_0$   | $N_1$                    | $N_2$                   | $N_3$                   |
|--------|---------|--------------------------|-------------------------|-------------------------|
| d-line | 1.70000 | $-1.0460 \times 10^{-2}$ | $2.9333 \times 10^{-4}$ | $1.6591 \times 10^{-5}$ |
| C-line | 1.69533 | $-1.0614 \times 10^{-2}$ | $2.9333 \times 10^{-4}$ | $1.6591 \times 10^{-5}$ |
| F-line | 1.71089 | $-1.0102 \times 10^{-2}$ | $2.9333 \times 10^{-4}$ | $1.6591 \times 10^{-5}$ |

$1/V_0 = 2.22 \times 1^{-2}$, $1/V_1 = -4.89 \times 10^2$, $N_1 \times f^2 = -0.125$
$t_G/f = 1.29$, $N_2 \times f^4 = 0.042$, $\nu_p/\nu_n = 0.51$
$N_p/N_n = 1.017$, $\nu_p = 23.78$ Embodiment 4
f=3.0 mm, F-number=2.8, image height=1.85 mm, 2ω=65.00

| $r_1 = 7.5983$       |                 |               |                |
|                      | $d_1 = 1.0000$  | $n_1 = 1.84666$ | $\nu_1 = 23.78$ |
| $r_2 = 164.7782$     |                 |               |                |
|                      | $d_2 = 0.1000$  |               |                |
| $r_3 = 17.0366$      |                 |               |                |
|                      | $d_3 = 0.7000$  | $n_2 = 1.78800$ | $\nu_2 = 47.38$ |
| $r_4 = 1.9781$       |                 |               |                |
|                      | $d_4 = 2.2073$  |               |                |
| $r_5 = \infty$ (stop)|                 |               |                |
|                      | $d_5 = 1.1207$  |               |                |
| $r_6 = \infty$       |                 |               |                |
|                      | $d_6 = 4.9793$  | $n_3$ (gradient index lens) | |
| $r_7 = -3.8179$      |                 |               |                |
|                      | $d_7 = 1.0000$  |               |                |
| $r_8 = \infty$       |                 |               |                |
|                      | $d_8 = 1.8180$  | $n_4 = 1.51633$ | $\nu_4 = 64.15$ |
| $r_9 = \infty$       |                 |               |                |
|                      | $d_9 = 1.6000$  |               |                |
| $r_{10} = \infty$    |                 |               |                |
|                      | $d_{10} = 0.7500$ | $n_5 = 1.48749$ | $\nu_5 = 70.21$ |
| $r_{11} = \infty$    |                 |               |                |
|                      | $d_{11} = 1.1906$ |             |                |
| $r_{12} = \infty$ (image) |            |               |                |

Gradient index lens

|        | $N_0$   | $N_1$                    | $N_2$                   | $N_3$                   |
|--------|---------|--------------------------|-------------------------|-------------------------|
| d-line | 1.70000 | $-1.1339 \times 10^{-2}$ | $4.8463 \times 10^{-4}$ | $3.7447 \times 10^{-5}$ |
| C-Line | 1.69533 | $-1.1490 \times 10^{-2}$ | $4.8463 \times 10^{-4}$ | $3.7447 \times 10^{-5}$ |
| F-Line | 1.71089 | $-1.0988 \times 10^{-2}$ | $4.8463 \times 10^{-4}$ | $3.7447 \times 10^{-5}$ |

$1/V_0 = 2.22 \times 10^{-2}$, $1/V_1 = -4.43 \times 10^{-2}$, $N_1 \times f^2 = -0.102$
$t_G/f = 1.66$, $N_2 \times f^4 = 0.039$, $\nu_p/\nu_f = 0.50$
$N_p/N_n = 1.032$, $\nu_p = 23.78$ Embodiment 5
f=2.39 mm, F-number=2.8, image height=1.85 mm, 2ω=77.6°

| $r_1 = 6.3059$       |                 |               |                |
|                      | $d_1 = 1.0000$  | $n_1 = 1.84666$ | $\nu_1 = 23.78$ |
| $r_2 = 18.6365$      |                 |               |                |
|                      | $d_2 = 0.1000$  |               |                |
| $r_3 = 6.1423$       |                 |               |                |
|                      | $d_3 = 0.7000$  | $n_2 = 1.72916$ | $\nu_2 = 54.68$ |
| $r_4 = 1.4183$       |                 |               |                |
|                      | $d_4 = 1.5721$  |               |                |
| $r_5 = \infty$ (stop)|                 |               |                |
|                      | $d_5 = 0.5021$  |               |                |
| $r_6 = \infty$       |                 |               |                |
|                      | $d_6 = 4.1834$  | $n_3$ (gradient index lens) | |

-continued

| $r_7 = -2.8211$      |                 |               |                |
|                      | $d_7 = 2.0376$  |               |                |
| $r_8 = \infty$       |                 |               |                |
|                      | $d_8 = 0.7500$  | $n_4 = 1.48749$ | $\nu_4 = 70.21$ |
| $r_9 = \infty$       |                 |               |                |
|                      | $d_9 = 1.1933$  |               |                |
| $r_{10} = \infty$ (image) |            |               |                |

Gradient index lens

|        | $N_0$   | $N_1$                    | $N_2$                   | $N_3$                   |
|--------|---------|--------------------------|-------------------------|-------------------------|
| d-line | 1.70000 | $-2.0804 \times 10^{-2}$ | $1.5598 \times 10^{-3}$ | $2.7535 \times 10^{-4}$ |
| C-line | 1.69533 | $-2.1050 \times 10^{-2}$ | $1.5598 \times 10^{-3}$ | $2.7535 \times 10^{-4}$ |
| F-line | 1.71089 | $-2.0229 \times 10^{-2}$ | $1.5598 \times 10^{-3}$ | $2.7535 \times 10^{-4}$ |

(Focusing)

|       | Object distance infinite | Object distance: 50 mm |
|-------|--------------------------|------------------------|
| $d_4$ | 1.5721                   | 1.9210                 |

$1/V_0 = 2.22 \times 10^{-2}$, $1/V_1 = -3.95 \times 10^{-2}$, $N_1 \times f^2 = -0.119$
$t_G/f = 1.75$, $N_2 \times f^4 = 0.051$, $\nu_p/\nu_n = 0.43$
$N_p/N_n = 1.068$, $\nu_p = 23.78$ Embodiment 6
f=2.64 mm, F-image=2.8, image height=1.85 min, 2=68.1°

| $r_1 = 4.9123$       |                 |               |                |
|                      | $d_1 = 1.0000$  | $n_1 = 1.84666$ | $\nu_1 = 23.78$ |
| $r_2 = 18.2873$      |                 |               |                |
|                      | $d_2 = 0.1000$  |               |                |
| $r_3 = 4.6913$       |                 |               |                |
|                      | $d_3 = 0.7000$  | $n_2 = 1.77250$ | $\nu_2 = 49.60$ |
| $r_4 = 1.4914$       |                 |               |                |
|                      | $d_4 = 0.6000$  |               |                |
| $r_5 = \infty$       |                 |               |                |
|                      | $d_5 = 0.1000$  |               |                |
| $r_6 = -4.4328$      |                 |               |                |
|                      | $d_6 = 7.4209$  | $n_3$ (gradient index lens) | |
| $r_7 = -2.7924$      |                 |               |                |
|                      | $d_7 = 1.9062$  |               |                |
| $r_8 = \infty$       |                 |               |                |
|                      | $d_8 = 0.7500$  | $n_4 = 1.48749$ | $\nu_4 = 70.21$ |
| $r_9 = \infty$       |                 |               |                |
|                      | $d_9 = 1.1902$  |               |                |
| $r_{10} = \infty$ (image) |            |               |                |

(Gradient index lens)

|        | $N_0$   | $N_1$                    | $N_2$                   | $N_3$                   |
|--------|---------|--------------------------|-------------------------|-------------------------|
| d-line | 1.65000 | $-1.7286 \times 10^{-2}$ | $1.5861 \times 10^{-3}$ | $2.5037 \times 10^{-4}$ |
| C-line | 1.64567 | $-1.7331 \times 10^{-2}$ | $1.5861 \times 10^{-3}$ | $2.5037 \times 10^{-4}$ |
| F-line | 1.66011 | $-1.7181 \times 10^{-2}$ | $1.5861 \times 10^{-3}$ | $2.5037 \times 10^{-4}$ |

$1/V_0 = 2.22 \times 10^{-2}$, $1/V_1 = -0.89 \times 10^{-2}$, $N_1 \times f^2 = -0.120$
$t_g/f = 2.81$, $N_2 \times f^4 = 0.077$, $\nu_p/\nu_n = 0.48$
$N_p/N_n = 1.042$, $\nu_p = 23.78$ Embodiment 7
f=296 mm, F-number=2.8, image height=1.85 mm, 2ω=66.7°

| | | | |
|---|---|---|---|
| $r_1 = 6.4539$ | | | |
| | $d_1 = 0.6000$ | $n_1 = 1.84666$ | $\nu_1 = 23.78$ |
| $r_2 = \infty$ | | | |
| | $d_2 = 0.0500$ | | |
| $r_3 = 1.5195$ | | | |
| | $d_3 = 0.4000$ | $n_2 = 1.69680$ | $\nu_2 = 55.53$ |
| $r_4 = 1.0326$ | | | |
| | $d_4 = 0.4303$ | | |
| $r_5 = \infty$ | | | |
| | $d_5 = 0.0200$ | | |
| $r_6 = -2.8717$ | | | |
| | $d_6 = 4.8255$ | $n_3$ (gradient index lens) | |
| $r_7 = -3.2719$ | | | |
| | $d_7 = 0.8283$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1901$ | | |
| $r_{10} = \infty$ (image) | | | |

Gradient index lens

| | $N_0$ | $N_1$ | $N_2$ | $N_3$ |
|---|---|---|---|---|
| d-line | 1.70000 | $-3.8291 \times 10^{-2}$ | $-8.1824 \times 10^{-5}$ | $-1.5300 \times 10^{-5}$ |
| C-line | 1.69533 | $-3.8331 \times 10^{-2}$ | $-8.1824 \times 10^{-5}$ | $-1.5300 \times 10^{-5}$ |
| F-line | 1.71089 | $-3.8198 \times 10^{-2}$ | $-8.1824 \times 10^{-5}$ | $-1.5300 \times 10^{-5}$ |

$1/V_0 = 22.22 \times 10^{-2}$, $1/V_1 = 0.35 \times 10^{-2}$, $N_1 \times f^2 = -0.335$
$t_G/f = 1.63$, $N_2 \times f^4 = -0.006$, $\nu_p/\nu_n = 0.43$
$N_p/N_n = 1.088$, $\nu_p = 23.78$ Embodiment 8
$f = 3.14$ mm, F-number=2.0, image height=1.85 mm, $2\omega = 62.1°$

| | | | |
|---|---|---|---|
| $r_1 = -19.6459$ (aspherical surface) | | | |
| | $d_1 = 0.9000$ | $n_1 = 1.83400$ | $\nu_1 = 37.17$ |
| $r_2 = -6.7757$ | | | |
| | $d_2 = 0.0500$ | | |
| $r_3 = 3.4584$ | | | |
| | $d_3 = 0.8000$ | $n_2 = 1.56907$ | $\nu_2 = 71.30$ |
| $r_4 = 1.6265$ | | | |
| | $d_4 = 1.2384$ | | |
| $r_5 = \infty$ (stop) | | | |
| | $d_5 = 1.2368$ | | |
| $r_6 = \infty$ | | | |
| | $d_6 = 2.2372$ | $n_3$ (gradient index lens) | |
| $r_7 = -2.9732$ | | | |
| | $d_7 = 1.6179$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1903$ | | |
| $r_{10} = \infty$ (image) | | | |

Aspherical surface coefficient
$A_4 = -3.3410 \times 10^{-3}$, $A_6 = 1.7516 \times 10^{-4}$, $A_6 = -8.3062 \times 10^{-6}$
Gradient index lens

| | $N_0$ | $N_1$ | $N_2$ | $N_3$ |
|---|---|---|---|---|
| d-line | 1.80000 | $-2.0124 \times 10^{-2}$ | $1.1965 \times 10^{-3}$ | $3.4283 \times 10^{-4}$ |
| C-line | 1.79520 | $-2.0628 \times 10^{-2}$ | $1.1965 \times 10^{-3}$ | $3.4283 \times 10^{-4}$ |
| F-line | 1.81120 | $-1.8950 \times 10^{-2}$ | $1.1965 \times 10^{-3}$ | $3.4283 \times 10^{-4}$ |

$1/V_0 = 2.0 \times 10^{-2}$, $1/V_1 = -8.33 \times 10^{-2}$, $N_1 \times f^2 = -0.198$
$t_G/f = 0.71$, $N_2 \times f^4 = 0.116$, $\nu_p/\nu_n = 0.52$
$N_p/N_n = 1.169$, $\nu_p = 37.17$ Embodiment 9
$f = 3.02$ mm, F-number=2.8, image height=1.85 mm, $2\omega = 61.0°$

| | | | |
|---|---|---|---|
| $r_1 = 4.2701$ | | | |
| | $d_1 = 0.8000$ | $n_1 = 1.78470$ | $\nu_1 = 26.22$ |
| $r_2 = 9.9483$ | | | |
| | $d_2 = 0.0500$ | | |
| $r_3 = 2.5823$ | | | |
| | $d_3 = 0.6000$ | $n_2 = 1.72600$ | $\nu_2 = 53.57$ |
| $r_4 = 1.4322$ | | | |
| | $d_4 = 0.7000$ | | |
| $r_5 = -22.0130$ | | | |
| | $d_5 = 5.4365$ | $n_3$ (gradient index lens) | |
| $r_6 = -2.3784$ | | | |
| | $d_6 = 0.1200$ | $n_4 = 1.51742$ | $\nu_4 = 52.42$ |
| $r_7 = -2.3784$ (aspherical surface) | | | |
| | $d_7 = 0.4964$ | | |
| $r_8 = \infty$ | | | |
| | $d_8 = 0.7500$ | $n_5 = 1.48749$ | $\nu_5 = 70.21$ |
| $r_9 = \infty$ | | | |
| | $d_9 = 1.1894$ | | |
| $r_{10} = \infty$ (image) | | | |

Aspherical surface coefficient
$A_4 = 2.4484 \times 10^{-2}$, $A_6 = -5.5068 \times 10^{-3}$, $A_8 = 2.1303 \times 10^{-3}$
$A_{10} = -2.4346 \times 10^{-4}$
Gradient index lens

| | $N_0$ | $N_1$ | $N_2$ |
|---|---|---|---|
| d-line | 1.76000 | $-1.7605 \times 10^{-2}$ | $-5.0256 \times 10^{-5}$ |
| C-line | 1.75562 | $-1.7605 \times 10^{-2}$ | $-5.0256 \times 10^{-5}$ |
| F-line | 1.77023 | $-1.7606 \times 10^{-2}$ | $-5.0256 \times 10^{-5}$ |

(Focusing)

| | object distance infinite | object distance 50 mm |
|---|---|---|
| $d_8$ | 0.4964 | 0.6684 |

$1/V_0 = 1.92 \times 10^{-2}$, $1/V_1 = -0.64 \times 10^{-4}$, $N_1 \times f^2 = -0.161$
$t_G/f = 1.80$, $N_2 \times f^4 = -0.004$, $\nu_p/\nu_n = 0.49$
$N_p/N_n = 1.034$, $\nu_p = 26.22$ Embodiment 10
$f = 3.07$ mm, F-number=2.8, image height=1.85 mm, $2\omega = 65.0°$

| | | | |
|---|---|---|---|
| $r_1 = -4.2073$ | | | |
| | $d_1 = 0.6000$ | $n_1 = 1.59551$ | $\nu_1 = 39.21$ |
| $r_2 = 1.8362$ | | | |
| | $d_2 = 0.3513$ | | |
| $r_3 = 2.9430$ | | | |
| | $d_3 = 0.7000$ | $n_2 = 1.88300$ | $\nu_2 = 40.78$ |
| $r_4 = -3.4180$ | | | |
| | $d_4 = 0.5383$ | | |
| $r_5 = \infty$ (stop) | | | |
| | $d_5 = 0.6832$ | | |
| $r_6 = -2.5795$ | | | |
| | $d_6 = 5.0077$ | $n_3$ (gradient index lens) | |
| $r_7 = -8.1779$ | | | |
| | $d_7 = 0.1000$ | | |
| $r_8 = 8.8570$ | | | |
| | $d_8 = 0.8000$ | $n_4 = 1.69680$ | $\nu_4 = 55.53$ |

-continued $r_9 = \infty$
$\quad d_9 = 0.7500 \quad n_5 = 1.48749 \quad \nu_5 = 70.21$
$r_{10} = \infty$
$\quad d_{10} = 1.1867$
$r_{11} = \infty$ (image)

Gradient index lens

|        | $N_0$   | $N_1$                    | $N_2$                   | $N_3$                   |
|--------|---------|--------------------------|-------------------------|-------------------------|
| d-line | 1.65000 | $-2.7276 \times 10^{-2}$ | $4.8438 \times 10^{-4}$ | $1.9531 \times 10^{-4}$ |
| C-line | 1.64567 | $-2.7317 \times 10^{-2}$ | $4.8438 \times 10^{-4}$ | $1.9531 \times 10^{-4}$ |
| F-line | 1.66011 | $-2.7183 \times 10^{-2}$ | $4.8438 \times 10^{-4}$ | $1.9531 \times 10^{-4}$ |

(Focusing)

|       | object distance infinite | object distance 50 mm |
|-------|--------------------------|------------------------|
| $d_2$ | 0.3513                   | 0.4332                 |

$1/V_0 = 2.22 \times 10^{-2}$, $1/V_1 = 0.49 \times 10^{-2}$, $N_1 \times f^2 = -0.069$
$t_G/f = 1.63$, $N_2 \times f^4 = 0.043$, $\nu_p/\nu_n \times 1.04$
$N_p/N_n = 1.180$, $\nu_p = 40.78$ Embodiment 11 f=3.07 mm, F-number=2.8, image height=1.85 mm, 2=64.8°

$r_1 = -52.6988$
$\quad d_1 = 0.6000 \quad n_1 = 1.69680 \quad \nu_1 = 55.53$
$r_2 = 2.0260$
$\quad d_2 = 1.2468$
$r_3 = 4.6995$
$\quad d_3 = 0.6000 \quad n_2 = 1.88300 \quad \nu_2 = 40.78$
$r_4 = -3.9734$
$\quad d_4 = 0.2442$
$r_5 = \infty$ (stop)
$\quad d_5 = 0.3406$
$r_6 = -3.3187$
$\quad d_6 = 7.9754 \quad n_3$ (gradient index lens)
$r_7 = -11.9444$
$\quad d_7 = 0.1000$
$r_8 = \infty$
$\quad d_8 = 0.7500 \quad n_4 = 1.48749 \quad \nu_4 = 70.21$
$r_9 = \infty$
$\quad d_9 = 1.1902$
$r_{10} = \infty$ (image)

Gradient index lens

|        | $N_0$   | $N_1$                    | $N_2$                   | $N_3$                   |
|--------|---------|--------------------------|-------------------------|-------------------------|
| d-line | 1.65000 | $-1.8001 \times 10^{-2}$ | $8.0872 \times 10^{-4}$ | $6.8852 \times 10^{-5}$ |
| C-line | 1.64567 | $-1.8047 \times 10^{-2}$ | $8.0872 \times 10^{-4}$ | $6.8852 \times 10^{-5}$ |
| F-line | 1.66011 | $-1.7892 \times 10^{-2}$ | $8.0872 \times 10^{-4}$ | $7.8852 \times 10^{-5}$ |

$1/V_0 = 2.22 \times 10^{-2}$, $1/V_1 = -0.86 \times 10^{-2}$, $N_1 \times f^2 = -0.170$
$t_G/f = 2.60$, $N_2 \times f^4 = 0.072$, $\nu_p/\nu_n = 0.73$
$N_p/N_n = 1.110$, $\nu_p = 40.78$ Embodiment 12 f=2.59 mm, F-number=2.8, image height=1.85 mm, 2=75.8°

$r_1 = 4.9859$
$\quad d_1 = 1.3500 \quad n_1 = 1.77250 \quad \nu_1 = 49.60$
$r_2 = 2.7950$
$\quad d_2 = 0.4000$
$r_3 = 2.6177$
$\quad d_3 = 1.1000 \quad n_2 = 1.77250 \quad \nu_2 = 49.60$
$r_4 = 1.2810$
$\quad d_4 = 0.9427$
$r_5 = \infty$ (stop)
$\quad d_5 = 0.2000$
$r_6 = 6.0933$
$\quad d_6 = 5.7745 \quad n_3$ (gradient index lens)
$r_7 = -2.8842$
$\quad d_7 = 1.8214$
$r_8 = \infty$
$\quad d_8 = 0.7500 \quad n_4 = 1.48749 \quad \nu_4 = 70.21$
$r_9 = \infty$
$\quad d_9 = 1.1901$
$r_{10} = \infty$ (image)

Gradient index lens

|        | $N_0$   | $N_1$                    | $N_2$                   | $N_3$                   |
|--------|---------|--------------------------|-------------------------|-------------------------|
| d-line | 1.70000 | $-1.4948 \times 10^{-2}$ | $1.5592 \times 10^{-3}$ | $4.2190 \times 10^{-4}$ |
| C-line | 1.69533 | $-1.5195 \times 10^{-2}$ | $1.5592 \times 10^{-3}$ | $4.2190 \times 10^{-4}$ |
| F-line | 1.71089 | $-1.4371 \times 10^{-2}$ | $1.5592 \times 10^{-3}$ | $4.2190 \times 10^{-4}$ |

$1/V_0 = 2.22 \times 10^{-2}$, $1/V_1 = -5.51 \times 10^{-2}$, $N_1 \times f^2 = -0.100$
$t_G/f = 2.23$, $N_2 \times f = 0.070$ Embodiment 13 f=3.64 mm, F-number=2.8, image height=1.85 mmn, 2ω=57.6°

$r_1 = 2.0342$
$\quad d_1 = 0.8500 \quad n_1 = 1.80518 \quad \nu_1 = 25.43$
$r_2 = 1.3259$ (aspherical surface)
$\quad d_2 = 0.4500$
$r_3 = \infty$ (stop)
$\quad d_3 = 0.2000$
$r_4 = -10.0164$
$\quad d_4 = 6.3071 \quad n_2$ (gradient index lens)
$r_5 = -3.6346$
$\quad d_5 = 0.1000$
$r_6 = -27.3485$
$\quad d_6 = 1.0000 \quad n_3 = 1.74100 \quad \nu_3 = 52.65$
$r_7 = -9.9029$
$\quad d_7 = 2.3402$
$r_8 = \infty$
$\quad d_8 = 0.7500 \quad n_4 = 1.48749 \quad \nu_4 = 70.21$
$r_9 = \infty$
$\quad d_9 = 1.1901$
$r_{10} = \infty$ (image)

Aspherical surface coefficient
$A_4 = -6.9685 \times 10^{-2}$, $A2.7911 \times 10^{-1}$, $A-3.3381 \times 10^{-1}$ Gradient index lens

|        | $N_0$   | $N_1$                    | $N_2$                   | $N_3$                   |
|--------|---------|--------------------------|-------------------------|-------------------------|
| d-line | 1.75000 | $-9.5571 \times 10^{-3}$ | $5.7265 \times 10^{-4}$ | $1.6340 \times 10^{-5}$ |
| C-line | 1.74550 | $-9.7013 \times 10^{-3}$ | $5.7265 \times 10^{-4}$ | $1.6340 \times 10^{-5}$ |
| F-line | 1.76050 | $-9.2207 \times 10^{-3}$ | $5.7265 \times 10^{-4}$ | $1.6340 \times 10^{-5}$ |

$1/V_0 = 2.0 \times 10^{-2}$, $1/V_1 = -5.03 \times 10^{-2}$, $N_1 \times f^2 = -0.127$
$t_G/f = 1.73$, $N_2 \times f^4 = 0.100$, $N_p/N_n = 0.964$ Embodiment 14
f=3.82 mm, F-number=2.8, image height=1.85 mn, 2ω=55°

| | | | |
|---|---|---|---|
| $r_1 = 2.2577$ | | | |
| | $d_1 = 0.7500$ | $n_1 = 1.83400$ | $v_1 = 37.17$ |
| $r_2 = 1.5259$ | | | |
| | $d_2 = 0.4000$ | | |
| $r_3 = \infty$ (stop) | | | |
| | $d_3 = 0.2525$ | | |
| $r_4 = -11.0756$ | | | |
| | $d_4 = 5.8515$ | $n_2$ (gradient index lens) | |
| $r_5 = -3.1807$ | | | |
| | $d_5 = 0.1000$ | | |
| $r_6 = 5.8102$ | | | |
| | $d_6 = 1.4245$ | $n_3 = 1.83481$ | $v_3 = 42.72$ |
| $r_7 = 4.2325$ | | | |
| | $d_7 = 1.3322$ | | |
| $r_8 = \infty$ | | | |
| | $d_8 = 0.7500$ | $n_4 = 1.48749$ | $v_4 = 70.21$ |
| $r_9 = \infty$ | | | |
| | $d_9 = 1.1903$ | | |
| $r_{10} = \infty$ (image) | | | |

Gradient index lens

| | $N_0$ | $N_1$ | $N_2$ | $N_3$ |
|---|---|---|---|---|
| d-line | 1.65000 | $-1.3647 \times 10^{-2}$ | $3.7226 \times 10^{-4}$ | $8.7315 \times 10^{-5}$ |
| C-line | 1.64567 | $-1.3790 \times 10^{-2}$ | $3.7226 \times 10^{-4}$ | $8.7315 \times 10^{-5}$ |
| F-line | 1.66011 | $-1.3314 \times 10^{-2}$ | $3.7226 \times 10^{-4}$ | $8.7315 \times 10^{-5}$ |

$1/V_0 = 2.22 \times 10^{-2}$, $1/V_1 = 3.49 \times 10^{-2}$, $N_1 \times f^2 = 10.99$
$t_G/f = 1.53$, $N_2 \times f^4 = 0.079$ Embodiment 15
f=3.57 mm, F-number=2.8, image height=1.85 mn, 2ω=58.3°

| | | | |
|---|---|---|---|
| $r_1 = 2.4980$ | | | |
| | $d_1 = 0.7800$ | $n_1 = 1.88300$ | $v_1 = 40.78$ |
| $r_2 = 1.5033$ | | | |
| | $d_2 = 0.7500$ | | |
| $r_3 = \infty$ (stop) | | | |
| | $d_3 = 0.2000$ | | |
| $r_4 = 3.2307$ | | | |
| | $d_4 = 0.6000$ | $n_2 = 1.76182$ | $v_2 = 26.55$ |
| $r_5 = 2.6645$ | | | |
| | $d_5 = 0.3000$ | | |
| $r_6 = -38.9333$ | | | |
| | $d_6 = 4.4475$ | $n_3$ (gradient index lens) | |
| $r_7 = -3.0418$ | | | |
| | $d_7 = 3.0516$ | | |
| $r_8 = \infty$ | | | |
| | $d_8 = 0.7500$ | $n_4 = 1.48749$ | $v_4 = 70.21$ |
| $r_9 = \infty$ | | | |
| | $d_9 = 1.1900$ | | |
| $r_{10} = \infty$ (image) | | | |

Gradient index lens

| | $N_0$ | $N_1$ | $N_2$ | $N_3$ |
|---|---|---|---|---|
| d-line | 1.68000 | $-1.7550 \times 10^{-2}$ | $2.1285 \times 10^{-4}$ | $3.5758 \times 10^{-5}$ |
| C-line | 1.67514 | $-1.7719 \times 10^{-2}$ | $2.1285 \times 10^{-4}$ | $3.5758 \times 10^{-5}$ |
| F-line | 1.69133 | $-1.7157 \times 10^{-2}$ | $2.1285 \times 10^{-4}$ | $3.5758 \times 10^{-5}$ |

$1/V_0 = 2.38 \times 10^{-2}$, $1/V_1 = -3.20 \times 10^{-2}$, $N_1 \times f^2 = -0.224$
$t_G/f = 1.25$, $N_2 \times f_4 = 0.035$ Embodiment 16
f=3.41 mm, F-number=2.8, image height=1.85 mm, 2ω=60.5°

| | | | |
|---|---|---|---|
| $r_1 = 1.7346$ | | | |
| | $d_1 = 0.7342$ | $n_1 = 1.81600$ | $v_1 = 46.62$ |
| $r_2 = 0.9887$ | | | |
| | $d_2 = 0.4000$ | | |
| $r_3 = \infty$ (stop) | | | |
| | $d_3 = 0.2000$ | | |
| $r_4 = -39.6075$ | | | |
| | $d_4 = 2.0388$ | $n_2 = 1.72916$ | $v_2 = 54.68$ |
| $r_5 = -1.8409$ | | | |
| | $d_5 = 0.3202$ | | |
| $r_6 = -2.6460$ | | | |
| | $d_6 = 3.6440$ | $n_3$ (gradient index lens) | |
| $r_7 = -3.7659$ | | | |
| | $d_7 = 1.7547$ | | |
| $r_8 = \infty$ | | | |
| | $d_8 = 0.7500$ | $n_4 = 1.48749$ | $v_4 = 70.21$ |
| $r_9 = \infty$ | | | |
| | $d_9 = 1.1926$ | | |
| $r_{10} = \infty$ (image) | | | |

Gradient index lens

| | $N_0$ | $N_1$ | $N_2$ | $N_3$ |
|---|---|---|---|---|
| d-line | 1.68000 | $-1.7780 \times 10^{-2}$ | $6.1714 \times 10^{-4}$ | $9.9867 \times 10^{-5}$ |
| C-line | 1.67514 | $-1.7942 \times 10^{-2}$ | $6.1714 \times 10^{-4}$ | $9.9867 \times 10^{-5}$ |
| F-line | 1.69133 | $-1.7403 \times 10^{-2}$ | $6.1714 \times 10^{-4}$ | $9.9867 \times 10^{-5}$ |

Embodiment 17
f=3.81 mm, F-number=2.8, image height=1.85 mm, 2ω=55.5°

| | | | |
|---|---|---|---|
| $r_1 = 10.6141$ | | | |
| | $d_1 = 0.8000$ | $n_1 = 1.56907$ | $v_1 = 71.30$ |
| $r_2 = 2.7054$ | | | |
| | $d_2 = 1.7762$ | | |
| $r_3 = \infty$ (stop) | | | |
| | $d_3 = 1.3145$ | | |
| $r_4 = \infty$ | | | |
| | $d_4 = 8.1554$ | $n_2$ (gradient index lens) | |
| $r_5 = -5.5218$ | | | |
| | $d_5 = 1.0000$ | | |
| $r_6 = \infty$ | | | |
| | $d_6 = 1.6000$ | $n_3 = 1.51633$ | $v_3 = 64.15$ |
| $r_7 = \infty$ | | | |
| | $d_7 = 2.0200$ | $n_4 = 1.51633$ | $v_4 = 64.15$ |
| $r_8 = \infty$ | | | |
| | $d_8 = 1.6000$ | | |
| $r_9 = \infty$ | | | |
| | $d_9 = 0.7500$ | $n_5 = 1.48749$ | $v_5 = 70.21$ |
| $r_{10} = \infty$ | | | |
| | $d_{10} = 1.0009$ | | |
| $r_{11} = \infty$ (image) | | | |

Gradient index lens

| | $N_0$ | $N_1$ | $N_2$ | $N_3$ |
|---|---|---|---|---|
| d-line | 1.70000 | $-7.3313 \times 10^{-3}$ | $1.0613 \times 10^{-4}$ | $2.9899 \times 10^{-6}$ |
| C-line | 1.69533 | $-7.4031 \times 10^{-3}$ | $1.0613 \times 10^{-4}$ | $2.9899 \times 10^{-6}$ |
| F-line | 1.71089 | $-7.1636 \times 10^{-3}$ | $1.0613 \times 10^{-4}$ | $2.9899 \times 10^{-6}$ |

$1/V_0 = 2.22 \times 10^{-2}$, $1/V_1 = -3.27 \times 10^{-2}$, $N_1 \times f^2 = -0.106$
$t_G/f = 2.14$, $N_2 \times f^4 = 0.022$ Embodimnent 18 f=3.51 mm, f-number=2.8, Image height=1.85 mm, $2\omega=57.0°$

| | | | |
|---|---|---|---|
| $r_1 = \infty$ (stop) | | | |
| | $d_1 = 0.1500$ | | |
| $r_2 = -4.2775$ | | | |
| | $d_2 = 0.5000$ | $n_1 = 1.88300$ | $\nu_1 = 40.78$ |
| $r_3 = -2.2363$ | | | |
| | $d_3 = 0.3000$ | | |
| $r_4 = -1.6050$ | | | |
| | $d_4 = 0.4000$ | $n_2 = 1.62004$ | $\nu_2 = 36.26$ |
| $r_5 = 2.5841$ | | | |
| | $d_5 = 1.0000$ | $n_3 = 1.88300$ | $\nu_3 = 40.78$ |
| $r_6 = -2.9650$ | | | |
| | $d_6 = 0.2500$ | | |
| $r_7 = -2.2178$ | | | |
| | $d_7 = 3.9757$ | $n_4$ (gradient index lens) | |
| $r_8 = -3.5973$ | | | |
| | $d_8 = 1.5185$ | | |
| $r_9 = \infty$ | | | |
| | $d_9 = 0.7500$ | $n_5 = 1.48749$ | $\nu_5 = 70.21$ |
| $r_{10} = \infty$ | | | |
| | $d_{10} = 1.1900$ | | |
| $r_{11} = \infty$ (image) | | | |

Gradient index lens

| | $N_0$ | $N_1$ | $N_2$ | $N_3$ |
|---|---|---|---|---|
| d-line | 1.65000 | $-2.0714 \times 10^{-2}$ | $9.1885 \times 10^{-4}$ | $1.6164 \times 10^{-4}$ |
| C-line | 1.64536 | $-2.0838 \times 10^{-2}$ | $9.1885 \times 10^{-4}$ | $1.6164 \times 10^{-4}$ |
| F-line | 1.66083 | $-2.0424 \times 10^{-2}$ | $9.1885 \times 10^{-4}$ | $1.6164 \times 10^{-4}$ |

$1/V_0=2.38\times10^{-2}$, $1/V_1=-2.0\times10^{-2}$, $N_1\times f^2=-0.255$ $t_G/f=1.13$, $N_2\times f^4=0.139$, $N_p/N_n=1.162$ Embodiment 19 f=3.34 mm, F-number=2.8, image height=1.85 m, $2\omega=59.2°$

| | | | |
|---|---|---|---|
| $r_1 = \infty$ (stop) | | | |
| | $d_1 = 0.0500$ | | |
| $r_2 = 8.3724$ | | | |
| | $d_2 = 0.6000$ | $n_1 = 1.77250$ | $\nu_1 = 49.60$ |
| $r_3 = -6.4998$ (aspherical surface) | | | |
| | $d_3 = 0.6004$ | | |
| $r_4 = -1.3705$ | | | |
| | $d_4 = 3.0666$ | $n_2$ (gradient index lens) | |
| $r_5 = -2.6175$ | | | |
| | $d_5 = 0.0500$ | | |
| $r_6 = 4.5221$ | | | |
| | $d_6 = 0.4000$ | $n_3 = 1.84666$ | $\nu_3 = 23.78$ |
| $r_7 = 2.4448$ | | | |
| | $d_7 = 1.7896$ | $n_4 = 1.74100$ | $\nu_4 = 52.65$ |
| $r_8 = 8.1154$ | | | |
| | $d_8 = 0.5251$ | | |
| $r_9 = \infty$ | | | |
| | $d_9 = 0.7500$ | $n_5 = 1.48749$ | $\nu_5 = 70.21$ |
| $r_{10} = \infty$ | | | |
| | $d_{10} = 1.1901$ | | |
| $r_{11} = \infty$ (image) | | | |

Aspherical surface coefficient $A_4=-3.5905\times10^{-2}$, $A_6=1.6008\times10^{-1}$, $A_4=4.3928\times10^{-1}$ $A_{10}=4.0592\times10^{-1}$ Gradient index lens

| | $N_0$ | $N_1$ | $N_2$ | $N_3$ |
|---|---|---|---|---|
| d-line | 1.68000 | $-1.8152 \times 10^{-2}$ | $6.6614 \times 10^{-4}$ | $3.9599 \times 10^{-4}$ |
| C-line | 1.67566 | $-1.8152 \times 10^{-2}$ | $6.6614 \times 10^{-4}$ | $3.9599 \times 10^{-4}$ |
| F-line | 1.69013 | $-1.8152 \times 10^{-2}$ | $6.6614 \times 10^{-4}$ | $3.9599 \times 10^{-4}$ |

$1/V_0=2.13\times10^{-2}$, $1/V_1=0$, $N_1\times f^2=-0.202$ $t_G/f=0.92$, $N_2\times f^4=0.083$, $N_p/N_n=0.960$ Embodiment 20 f=3.38 mm, f-number=2.8, image height=1.85 mm, $2\omega=60.4°$

| | | | |
|---|---|---|---|
| $r_1 = \infty$ (stop) | | | |
| | $d_1 = 0.0500$ | | |
| $r_2 = 36.0547$ | | | |
| | $d_2 = 0.6000$ | $n_1 = 1.88300$ | $\nu_1 = 40.78$ |
| $r_3 = -6.9767$ | | | |
| | $d_3 = 0.7937$ | | |
| $r_4 = -1.6638$ | | | |
| | $d_4 = 2.7522$ | $n_2$ (gradient index lens) | |
| $r_5 = -2.5548$ | | | |
| | $d_5 = 0.0500$ | | |
| $r_6 = 4.7748$ | | | |
| | $d_6 = 2.1000$ | $n_3 = 1.77250$ | $\nu_3 = 49.60$ |
| $r_7 = -2.9710$ | | | |
| | $d_7 = 0.5000$ | $n_4 = 1.80518$ | $\nu_4 = 25.43$ |
| $r_9 = 7.8073$ | | | |
| | $d_8 = 0.3000$ | | |
| $r_9 = \infty$ | | | |
| | $d_9 = 0.7500$ | $n_5 = 1.48749$ | $\nu_5 = 70.21$ |
| $r_{10} = \infty$ | | | |
| | $d_{10} = 1.1909$ | | |
| $r_{11} = \infty$ (image) | | | |

Gradient index lens

| | $N_0$ | $N_1$ | $N_2$ | $N_3$ |
|---|---|---|---|---|
| d-line | 1.66000 | $-1.5683 \times 10^{-2}$ | $1.9657 \times 10^{-4}$ | $3.4070 \times 10^{-4}$ |
| C-line | 1.65479 | $-1.5699 \times 10^{-2}$ | $1.9657 \times 10^{-4}$ | $3.4070 \times 10^{-4}$ |
| F-line | 1.67216 | $-1.5647 \times 10^{-2}$ | $1.9657 \times 10^{-4}$ | $3.4070 \times 10^{-4}$ |

(Focusing)

| | Object distance infinite | Object distance 50 mm |
|---|---|---|
| $d_8$ | 0.3 | 0.5322 |

$1/V_0=2.63\times10^{-2}$, $1/V_1=3.33\times10^{-2}$, $N_1\times f^2=-0.179$ $t_G/f=0.81$, $N_2\times f^4=0.026$, $N_p/N_n=1.043$ Embodiment 21 f=3.84 mm, F-number=2.8, image height=1.85 mm, $2\omega=53.4°$

| | | | |
|---|---|---|---|
| $r_1 = \infty$ (stop) | | | |
| | $d_1 = 0.2000$ | | |
| $r_2 = 30.5251$ | | | |
| | $d_2 = 1.000$ | $n_1 = 1.88300$ | $\nu_1 = 40.78$ |
| $r_3 = -4.4735$ | | | |
| | $d_3 = 0.4950$ | | |

-continued

| | | | |
|---|---|---|---|
| $r_4 = -2.4236$ | | | |
| | $d_4 = 4.7639$ | $n_2 = 1.88300$ | $v_2 = 40.78$ |
| $r_5 = -4.0027$ | | | |
| | $d_5 = 0.1500$ | | |
| $r_6 = 6.5997$ | | | |
| | $d_6 = 2.4181$ | $n_3$ (gradient index lens) | |
| $r_7 = 5.8898$ | | | |
| | $d_7 = 0.8000$ | | |
| $r_8 = \infty$ | | | |
| | $d_8 = 0.7500$ | $n_4 = 1.48749$ | $v_4 = 70.21$ |
| $r_9 = \infty$ | | | |
| | $d_9 = 1.1897$ | | |
| $r_{10} = \infty$ (image) | | | |

Gradient index lens

| | $N_0$ | $N_1$ | $N_2$ | $N_3$ |
|---|---|---|---|---|
| d-line | 1.58000 | $-1.8284 \times 10^{-2}$ | $2.1401 \times 10^{-5}$ | $6.3733 \times 10^{-5}$ |
| C-line | 1.57665 | $-1.8520 \times 10^{-2}$ | $2.1401 \times 10^{-5}$ | $6.3733 \times 10^{-5}$ |
| F-line | 1.58781 | $-1.7735 \times 10^{-2}$ | $2.1401 \times 10^{-5}$ | $6.3733 \times 10^{-5}$ |

$1/V_0 = 1.92 \times 10^{-2}$, $1/V_1 = 4.29 \times 10^{-2}$, $N_1 \times f^2 = -0.270$ $t_G/f = 0.63$, $N_2 \times f^4 = 0.005$ Embodiment 22 f=3.52 rmm, f-number=2.8, image height=1.85 mm, $2\omega = 56.5°$

| | | | |
|---|---|---|---|
| $r_1 = \infty$ (stop) | | | |
| | $d_1 = 0.1000$ | | |
| $r_2 = -6.5217$ | | | |
| | $d_2 = 0.5000$ | $n_1 = 1.88300$ | $v_1 = 40.78$ |
| $r_3 = -3.3361$ | | | |
| | $d_3 = 0.9532$ | | |
| $r_4 = -1.2433$ | | | |
| | $d_4 = 1.3987$ | $n_2 = 1.69895$ | $v_2 = 30.12$ |
| $r_5 = -1.9908$ | | | |
| | $d_5 = 0.1000$ | | |
| $r_6 = -24.6308$ | | | |
| | $d_6 = 3.6086$ | $n_3$ (gradient index lens) | |
| $r_7 = -4.6261$ | | | |
| | $d_7 = 1.8870$ | | |
| $r_8 = \infty$ | | | |
| | $d_8 = 0.7500$ | $n_4 = 1.48749$ | $v_4 = 70.21$ |
| $r_9 = \infty$ | | | |
| | $d_9 = 1.1902$ | | |
| $r_{10} = \infty$ (image) | | | |

Gradient index lens

| | $N_0$ | $N_1$ | $N_2$ | $N_3$ |
|---|---|---|---|---|
| d-line | 1.65000 | $-1.4474 \times 10^{-2}$ | $3.6204 \times 10^{-4}$ | $2.8814 \times 10^{-5}$ |
| C-line | 1.64536 | $-1.4691 \times 10^{-2}$ | $3.6204 \times 10^{-4}$ | $2.8814 \times 10^{-5}$ |
| F-line | 1.66083 | $-3.3967 \times 10^{-2}$ | $3.6204 \times 10^{-4}$ | $2.8814 \times 10^{-5}$ |

$1/V_0 = 2.38 \times 10^{-2}$, $1/V_1 = -5.0 \times 10^{-2}$, $N_1 \times f^2 = -0.179$ $t_G/f = 1.03$, $N_2 \times f^4 = 0.056$, $N_p/N_n = 1.108$ Embodiment 23 f=3.94 mm, F-number=2.8, image height=1.85 min, $2\omega = 50.5°$

| | | | |
|---|---|---|---|
| $r_1 = \infty$ (stop) | | | |
| | $d_1 = 0.1000$ | | |
| $r_2 = 55.2262$ | | | |
| | $d_2 = 0.8000$ | $n_1 = 1.88300$ | $v_1 = 40.78$ |
| $r_3 = -2.2743$ | | | |
| | $d_3 = 0.3000$ | $n_2 = 1.48749$ | $v_2 = 70.21$ |
| $r_4 = -27.3072$ | | | |
| | $d_4 = 0.4000$ | | |
| $r_5 = -1.6944$ | | | |
| | $d_5 = 4.4306$ | $n_3$ (gradient index lens) | |
| $r_6 = -3.0741$ | | | |
| | $d_6 = 2.2066$ | | |
| $r_7 = \infty$ | | | |
| | $d_7 = 0.7500$ | $n_4 = 1.48749$ | $v_4 = 70.21$ |
| $r_8 = \infty$ | | | |
| | $d_8 = 1.1900$ | | |
| $r_9 = \infty$ (image) | | | |

Gradient index lens

| | $N_0$ | $N_1$ | $N_2$ | $N_3$ |
|---|---|---|---|---|
| d-line | 1.65000 | $-2.0172 \times 10^{-2}$ | $6.9356 \times 10^{-4}$ | $1.4292 \times 10^{-4}$ |
| C-line | 1.64536 | $-2.0414 \times 10^{-2}$ | $6.9356 \times 10^{-4}$ | $1.4292 \times 10^{-4}$ |
| F-line | 1.66083 | $-1.9607 \times 10^{-2}$ | $6.9356 \times 10^{-4}$ | $1.4292 \times 10^{-4}$ |

$1/V_0 = 2.38 \times 10^{-2}$, $1/V_1 = 4.0 \times 10^{-2}$, $N_1 \times f^2 = -0.313$ $t_G/f = 1.12$, $N_2 \times f^4 = 0.167$, $N_p/N_n = 1.266$ Embodimnet 24 f=3.54 mm, F-number=2.8, image height=1.85 mm, $2\omega = 58.5°$

| | | | |
|---|---|---|---|
| $r_1 = \infty$ (stop) | | | |
| | $d_1 = 0.2500$ | | |
| $r_2 = 21.7410$ | | | |
| | $d_2 = 1.1000$ | $n_1 = 1.72916$ | $v_1 = 54.68$ |
| $r_3 = -5.6428$ | | | |
| | $d_3 = 0.5703$ | | |
| $r_4 = -1.7834$ | | | |
| | $d_4 = 4.2486$ | $n_2$ (gradient index lens) | |
| $r_5 = -3.5184$ | | | |
| | $d_5 = 0.2000$ | | |
| $r_6 = 5.0043$ | | | |
| | $d_6 = 3.0412$ | $n_3 = 1.61800$ | $v_3 = 63.39$ |
| $r_7 = 8.7136$ | | | |
| | $d_7 = 0.7000$ | | |
| $r_8 = \infty$ | | | |
| | $d_8 = 0.7500$ | $n_4 = 1.48749$ | $v_4 = 70.21$ |
| $r_9 = \infty$ | | | |
| | $d_9 = 1.1899$ | | |
| $r_{10} = \infty$ (image) | | | |

Gradient index lens

| | $N_0$ | $N_1$ | $N_2$ | $N_3$ |
|---|---|---|---|---|
| d-line | 1.80000 | $-1.0965 \times 10^{-2}$ | $1.2297 \times 10^{-4}$ | $6.2864 \times 10^{-5}$ |
| C-line | 1.79538 | $-1.1070 \times 10^{-2}$ | $1.2297 \times 10^{-4}$ | $6.2864 \times 10^{-5}$ |
| F-line | 1.81077 | $-1.0721 \times 10^{-2}$ | $1.2297 \times 10^{-4}$ | $6.2864 \times 10^{-5}$ |

$1/V_0 = 1.92 \times 10^{-2}$, $1/V_1 = 3.18 \times 10^{-2}$, $N_1 \times f^2 = -0.137$ $t_G/f = 1.20$, $N_2 \times f^4 = 0.019$ Embodiment 25 f=3.58 mm, F-number=2.8, image height=1.85 mm, $2\omega = 55.5°$

| | | | |
|---|---|---|---|
| $r_1 = \infty$ (stop) | | | |
| | $d_1 = 0.2000$ | | |
| $r_2 = \infty$ | | | |
| | $d_2 = 0.7500$ | $n_1 = 1.81600$ | $\nu_1 = 46.62$ |
| $r_3 = -3.9540$ | | | |
| | $d_3 = 0.4958$ | | |
| $r_4 = -1.8736$ | | | |
| | $d_4 = 5.5165$ | $n_2$ (gradient index lens) | |
| $r_5 = -3.6810$ | | | |
| | $d_5 = 0.1000$ | | |
| $r_6 = 8.7934$ | | | |
| | $d_6 = 2.3198$ | $n_3 = 1.88300$ | $\nu_3 = 40.78$ |
| $r_7 = 5.9738$ | | | |
| | $d_7 = 0.7000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1892$ | | |
| $r_{10} = \infty$ (image) | | | |

Gradient index lens

| | $N_0$ | $N_1$ | $N_2$ | $N_3$ |
|---|---|---|---|---|
| d-line | 1.80000 | $-1.5871 \times 10^{-2}$ | $5.5386 \times 10^{-4}$ | $6.2203 \times 10^{-5}$ |
| C-line | 1.79400 | $-1.6027 \times 10^{-2}$ | $5.5386 \times 10^{-4}$ | $6.2203 \times 10^{-5}$ |
| F-line | 1.81400 | $-1.5506 \times 10^{-2}$ | $5.5386 \times 10^{-4}$ | $6.2203 \times 10^{-5}$ |

$1/V_0 = 2.5 \times 10^{-2}$, $1/V_1 = -3.28 \times 10^{-2}$, $N_1 \times f^2 = -0.203$
$t_G/f = 1.54$, $N_2 \times f^4 = 0.091$, $N_p/N_n = 0.964$
Embodiment 26
f=3.79 mm, F-number=2.8, image height=1.85 mm, 2m=53.3°

| | | | |
|---|---|---|---|
| $r_1 = \infty$ (stop) | | | |
| | $d_1 = 0.2693$ | | |
| $r_2 = -3.5315$ | | | |
| | $d_2 = 0.3500$ | $n_1 = 1.54814$ | $\nu_1 = 45.78$ |
| $r_3 = 2.3618$ | | | |
| | $d_3 = 0.8000$ | $n_2 = 1.88300$ | $\nu_2 = 40.78$ |
| $r_4 = -2.7122$ | | | |
| | $d_4 = 0.4000$ | | |
| $r_5 = -1.6259$ | | | |
| | $d_5 = 5.2179$ | $n_3$ (gradient index lens) | |
| $r_6 = -3.6461$ | | | |
| | $d_6 = 1.1191$ | | |
| $r_7 = \infty$ | | | |
| | $d_7 = 0.7500$ | $n_4 = 1.48749$ | $\nu_4 = 70.21$ |
| $r_8 = \infty$ | | | |
| | $d_8 = 1.1901$ | | |
| $r_9 = \infty$ (image) | | | |

Gradient index lens

| | $N_0$ | $N_1$ | $N_2$ | $N_3$ |
|---|---|---|---|---|
| d-line | 1.65000 | $-1.8137 \times 10^{-2}$ | $8.6479 \times 10^{-4}$ | $6.6686 \times 10^{-5}$ |
| C-line | 1.64536 | $-1.8273 \times 10^{-2}$ | $8.6479 \times 10^{-4}$ | $6.6686 \times 10^{-5}$ |
| F-line | 1.66083 | $-1.7820 \times 10^{-2}$ | $8.6479 \times 10^{-4}$ | $6.6686 \times 10^{-5}$ |

$1/V_0 = 2.38 \times 10^2$, $1/V_1 = 2.5 \times 10^{-2}$, $N_1 \times f^2 = -0.261$
$t_G/f = 1.38$, $N_2 \times f^4 = 0.178$, $N_p/N_n = 1.216$
Embodiment 27
f=4.0 mm, F-number=2.8, image height=1.85 mm, 2ω=53.9°

| | | | |
|---|---|---|---|
| $r_1 = \infty$ (stop) | | | |
| | $d_1 = 0.2000$ | | |
| $r_2 = 3.4310$ | | | |
| | $d_2 = 0.7000$ | $n_1 = 1.56732$ | $\nu_1 = 42.83$ |
| $r_3 = 2.5037$ | | | |
| | $d_3 = 1.0000$ | | |
| $r_4 = -1.8741$ | | | |
| | $d_4 = 0.9000$ | $n_2 = 1.83481$ | $\nu_2 = 42.72$ |
| $r_5 = -2.5404$ | | | |
| | $d_5 = 0.1000$ | | |
| $r_6 = 17.9021$ | | | |
| | $d_6 = 5.7189$ | $n_3$ (gradient index lens) | |
| $r_7 = -5.2222$ | | | |
| | $d_7 = 2.5960$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1878$ | | |
| $r_{10} = \infty$ (image) | | | |

Gradient index lens

| | $N_0$ | $N_1$ | $N_2$ | $N_3$ |
|---|---|---|---|---|
| d-line | 1.70000 | $-1.0383 \times 10^{-2}$ | $6.8263 \times 10^{-5}$ | $4.6667 \times 10^{-6}$ |
| C-line | 1.69562 | $-1.0475 \times 10^{-2}$ | $6.8263 \times 10^{-5}$ | $4.7678 \times 10^{-6}$ |
| F-line | 1.71021 | $-1.0170 \times 10^{-2}$ | $6.8263 \times 10^{-5}$ | $4.7678 \times 10^{-6}$ |

$1/V_0 = 2.08 \times 10^{-2}$, $1/V_1 = -2.93 \times 10^{-2}$, $N_1 \times f^2 = -0.166$
$t_G/f = 1.43$, $N^2 \times f_4 = 0.017$
Embodiment 28
f=4.02 mm, F-number=2.8, image height=1.85 mm, 2=52.9°

| | | | |
|---|---|---|---|
| $r_1 = \infty$ (stop) | | | |
| | $d_1 = 0.2000$ | | |
| $r_2 = 3.0004$ | | | |
| | $d_2 = 1.1000$ | $n_1 = 1.84666$ | $\nu_1 = 23.78$ |
| $r_3 = 1.9583$ | | | |
| | $d_3 = 0.5500$ | | |
| $r_4 = -11.0859$ | | | |
| | $d_4 = 6.0725$ | $n_2$ (gradient index lens) | |
| $r_5 = -4.3117$ | | | |
| | $d_5 = 0.2000$ | | |
| $r_6 = 14.8211$ | | | |
| | $d_6 = 1.0000$ | $n_3 = 1.77250$ | $\nu_3 = 49.60$ |
| $r_7 = \infty$ | | | |
| | $d_7 = 2.1885$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1904$ | | |
| $r_{10} = \infty$ (image) | | | |

Gradient index lens

| | $N_0$ | $N_1$ | $N_2$ | $N_3$ |
|---|---|---|---|---|
| d-line | 1.77000 | $-9.8448 \times 10^{-3}$ | $-5.8562 \times 10^{-5}$ | $-1.4079 \times 10^{-5}$ |
| C-line | 1.76422 | $-9.9688 \times 10^{-3}$ | $-5.8562 \times 10^{-5}$ | $-1.4079 \times 10^{-5}$ |
| F-line | 1.78347 | $-9.5555 \times 10^{-3}$ | $-5.8562 \times 10^{-5}$ | $-1.4079 \times 10^{-5}$ |

$1/V_0 = 2.5 \times 10^{-2}$, $1/V_1 = -4.20 \times 10^{-2}$, $N_1 \times f^2 = -0.159$
$t_G/f = 1.51$, $N_2 \times f^4 = -0.015$, $N_p/N_n = 0.960$
Embodiment 29
f=3.67 mm, F-number=2.8, image height=1.85 mm, 2ω=57.2°

| | | | |
|---|---|---|---|
| $r_1 = \infty$ (stop) | | | |
| | $d_1 = 1.3500$ | | |
| $r_2 = -1.6203$ | | | |
| | $d_2 = 1.0000$ | $n_1 = 1.60311$ | $\nu_1 = 60.68$ |
| $r_3 = -2.5622$ | | | |
| | $d_3 = 0.1000$ | | |
| $r_4 = 17.5919$ | | | |
| | $d_4 = 5.7571$ | $n_2$ (gradient index lens) | |
| $r_5 = -4.7537$ | | | |
| | $d_5 = 0.1000$ | | |
| $r_6 = 11.3407$ | | | |
| | $d_6 = 2.0606$ | $n_3 = 1.80610$ | $\nu_3 = 40.95$ |
| $r_7 = 7.3687$ | | | |
| | $d_7 = 0.8000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1887$ | | |
| $r_{10} = \infty$ (image) | | | |

Gradient index lens

| | $N_0$ | $N_1$ | $N_2$ | $N_3$ |
|---|---|---|---|---|
| d-line | 1.68000 | $-1.0518 \times 10^{-2}$ | $2.1212 \times 10^{-4}$ | $1.6881 \times 10^{-5}$ |
| C-line | 1.67490 | $-1.0643 \times 10^{-2}$ | $2.1212 \times 10^{-4}$ | $1.6881 \times 10^{-5}$ |
| F-line | 1.69190 | $-1.0225 \times 10^{-2}$ | $2.1212 \times 10^{-4}$ | $1.6881 \times 10^{-5}$ |

$1/V_0 = 2.5 \times 10^{-2}$, $1/V_1 = 3.98 \times 10^{-2}$, $N_1 \times f^2 = -0.142$
$t_G/f = 1.57$, $N_2 \times f^4 = 0.038$
Embodiment 30
$f = 4.13$ mm, F-number $= 2.8$, image height $= 1.85$ mm, $2\omega = 52.3°$

| | | | |
|---|---|---|---|
| $r_1 = \infty$ (stop) | | | |
| | $d_1 = 1.8438$ | | |
| $r_2 = -2.9770$ | | | |
| | $d_2 = 4.4968$ | $n_1$ (gradient index lens) | |
| $r_3 = -3.9560$ | | | |
| | $d_3 = 0.1000$ | | |
| $r_4 = 4.1810$ | | | |
| | $d_4 = 2.4922$ | $n_2 = 1.61800$ | $\nu_2 = 63.39$ |
| $r_5 = 4.3737$ | | | |
| | $d_5 = 0.7000$ | | |
| $r_6 = 7.5621$ | | | |
| | $d_6 = 1.0000$ | $n_3 = 1.65160$ | $\nu_3 = 58.52$ |
| $r_7 = 9.3836$ | | | |
| | $d_7 = 0.5500$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1884$ | | |
| $r_{10} = \infty$ (image) | | | |

Gradient index lens

| | $N_0$ | $N_1$ | $N_2$ | $N_3$ |
|---|---|---|---|---|
| d-line | 1.60000 | $-1.1209 \times 10^{-2}$ | $-1.1748 \times 10^{-4}$ | $2.4238 \times 10^{-5}$ |
| C-line | 1.59538 | $-1.1344 \times 10^{-2}$ | $-1.1748 \times 10^{-4}$ | $2.4238 \times 10^{-5}$ |
| F-line | 1.61077 | $-1.0895 \times 10^{-2}$ | $-1.1748 \times 10^{-4}$ | $2.4238 \times 10^{-5}$ |

$1/V_0 = 2.56 \times 10^{-2}$, $1/V_1 = 4.0 \times 10^{-2}$, $N_1 \times f^2 = 0.191$
$t_G/f = 1.09$, $N_2 \times f^4 = -0.034$
Embodiment 31
$f = 3.87$ mm, F-number $= 2.8$, image height $= 1.85$ mm, $2\omega = 54.5°$

| | | | |
|---|---|---|---|
| $r_1 = \infty$ (stop) | | | |
| | $d_1 = 1.0815$ | | |
| $r_2 = -28.3102$ | | | |
| | $d_2 = 5.2277$ | $n_1$ (gradient index lens) | |
| $r_3 = -3.5433$ | | | |
| | $d_3 = 6.0500$ | | |
| $r_4 = -22.6176$ | | | |
| | $d_4 = 0.9500$ | $n_2 = 1.88300$ | $\nu_2 = 40.78$ |
| $r_5 = -4.0675$ | | | |
| | $d_5 = 0.5000$ | $n_3 = 1.62588$ | $\nu_3 = 35.70$ |
| $r_6 = 5.4289$ | | | |
| | $d_6 = 0.5000$ | | |
| $r_7 = \infty$ | | | |
| | $d_7 = 0.7500$ | $n_4 = 1.48749$ | $\nu_4 = 70.21$ |
| $r_8 = \infty$ | | | |
| | $d_8 = 1.1942$ | | |
| $r_9 = \infty$ (image) | | | |

Gradient index lens

| | $N_0$ | $N_1$ | $N_2$ | $N_3$ |
|---|---|---|---|---|
| d-line | 1.75000 | $-1.6544 \times 10^{-2}$ | $1.1161 \times 10^{-3}$ | $8.7929 \times 10^{-5}$ |
| C-line | 1.74392 | $-1.6742 \times 10^{-2}$ | $1.1161 \times 10^{-3}$ | $8.7929 \times 10^{-5}$ |
| F-line | 1.76419 | $-1.6081 \times 10^{-2}$ | $1.1161 \times 10^{-3}$ | $8.7929 \times 10^{-5}$ |

$1/V_0 = 2 \times 10^{-2}$, $1/V_1 = -4.0 \times 10^{-2}$, $N_1 \times f^2 = -0.248$
$t_G/f = 1.35$, $N_2 \times f^4 = 0.250$, $N_p/N_n = 1.158$
Embodiment 32
$f = 53.88$ mm, F-number $= 2.8$, image height $= 1.85$ mm, $2\omega = 52.8°$

| | | | |
|---|---|---|---|
| $r_1 = \infty$ (stop) | | | |
| | $d_1 = 1.3240$ | | |
| $r_2 = -34.3162$ | | | |
| | $d_2 = 5.1194$ | $n_1$ (gradient index lens) | |
| $r_3 = -3.3533$ | | | |
| | $d_3 = 0.0500$ | | |
| $r_4 = -15.7193$ | | | |
| | $d_4 = 0.4000$ | $n_2 = 1.53172$ | $\nu_2 = 48.91$ |
| $r_5 = 3.0343$ | | | |
| | $d_5 = 1.0000$ | $n_3 = 1.88300$ | $\nu_3 = 40.78$ |
| $r_6 = 4.4906$ (aspherical surface) | | | |
| | $d_6 = 0.5000$ | | |
| $r_7 = \infty$ | | | |
| | $d_7 = 0.7500$ | $n_4 = 1.48749$ | $\nu_4 = 70.21$ |
| $r_8 = \infty$ | | | |
| | $d_8 = 1.1823$ | | |
| $r_9 = \infty$ (image) | | | |

Aspherical surface coefficient
$A_4 = 1.0615 \times 10^{-2}$, $A_6 = -4.7062 \times 10^{-3}$, $A_6 = 1.3538 \times 10^{-3}$
$A_{10} = -1.7029 \times 10^{-4}$ Gradient index lens

| | $N_0$ | $N_1$ | $N_2$ | $N_3$ |
|---|---|---|---|---|
| d-line | 1.74000 | $-1.4577 \times 10^{-2}$ | $4.4708 \times 10^{-4}$ | $2.1341 \times 10^{-4}$ |
| C-line | 1.73366 | $-1.4796 \times 10^{-2}$ | $4.4708 \times 10^{-4}$ | $2.1341 \times 10^{-4}$ |
| F-line | 1.75480 | $-1.4067 \times 10^{-2}$ | $4.4708 \times 10^{-4}$ | $2.1341 \times 10^{-4}$ |

$1/V_0 = 2.86 \times 10^{-2}$, $1/V_1 = 5.0 \times 10^{-2}$, $N_1 \times f^2 = -0.219$
$t_g/f = 1.32$, $N_2 \times f^4 = 0.101$, $N_p/N_n = 1.229$
Embodiment 33
$f = 4.24$ mm, f-number $= 2.8$, image height $= 1.85$ mm, $2\omega = 49.5°$

| | | | |
|---|---|---|---|
| $r_1 = \infty$ (stop) | | | |
| | $d_1 = 0.2000$ | | |
| $r_2 = -6.1182$ | | | |
| | $d_2 = 8.0353$ | $n_1$ (gradient index lens) | |
| $r_3 = -3.9652$ | | | |
| | $d_3 = 0.1000$ | | |
| $r_4 = 7.9186$ | | | |
| | $d_4 = 1.0000$ | $n_2 = 1.84666$ | $\nu_2 = 23.78$ |
| $r_5 = 5.6744$ | | | |
| | $d_5 = 0.3000$ | | |
| $r_6 = 6.7751$ | | | |
| | $d_6 = 0.9000$ | $n_3 = 1.88300$ | $\nu_3 = 40.78$ |
| $r_7 = 5.0200$ | | | |
| | $d_7 = 0.6000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1827$ | | |
| $r_{10} = \infty$ (image) | | | |

Gradient index lens

| | $N_0$ | $N_1$ | $N_2$ | $N_3$ |
|---|---|---|---|---|
| d-line | 1.60000 | $-1.1573 \times 10^{-2}$ | $2.1870 \times 10^{-4}$ | $4.1983 \times 10^{-5}$ |
| C-line | 1.59625 | $-1.1560 \times 10^{-2}$ | $2.1870 \times 10^{-4}$ | $4.1983 \times 10^{-5}$ |
| F-line | 1.60875 | $-1.1605 \times 10^{-2}$ | $2.1870 \times 10^{-4}$ | $4.1983 \times 10^{-5}$ |

$1/V_0 = 2.08 \times 10^{-2}$, $1/V_1 = 0.39 \times 10^{-2}$, $N_1 \times f^2 = -0.208$
$t_G/f = 1.90$, $N_2 \times f^4 = 0.071$
Embodiment 34
f=4.41 mm, f-number=2.8, image height=1.85 mm, $2\omega = 48.3°$

| | | | |
|---|---|---|---|
| $r_1 = \infty$ (stop) | | | |
| | $d_1 = 0.1000$ | | |
| $r_2 = 2.5363$ | | | |
| | $d_2 = 0.6000$ | $n_1 = 1.88300$ | $\nu_1 = 40.78$ |
| $r_3 = 1.7360$ | | | |
| | $d_3 = 0.5000$ | | |
| $r_4 = -9.9470$ | | | |
| | $d_4 = 6.2667$ | $n_2$ (gradient index lens) | |
| $r_5 = -3.7009$ | | | |
| | $d_5 = 3.8629$ | | |
| $r_6 = \infty$ | | | |
| | $d_6 = 0.7500$ | $n_3 = 1.48749$ | $\nu_3 = 70.21$ |
| $r_7 = \infty$ | | | |
| | $d_7 = 1.1897$ | | |
| $r_8 = \infty$ (image) | | | |

Gradient index lens

| | $N_0$ | $N_1$ | $N_2$ | $N_3$ |
|---|---|---|---|---|
| d-line | 1.65000 | $-1.1811 \times 10^{-2}$ | $4.3851 \times 10^{-5}$ | $5.0237 \times 10^{-6}$ |
| C-line | 1.64536 | $-1.1919 \times 10^{-2}$ | $4.3851 \times 10^{-5}$ | $5.0237 \times 10^{-6}$ |
| F-line | 1.66083 | $-1.1558 \times 10^{-2}$ | $4.3851 \times 10^{-5}$ | $5.0237 \times 10^{-6}$ |

$1/V_0 = 2.38 \times 10^{-2}$, $1/V_1 = -3.06 \times 10^{-2}$, $N_1 \times f^2 = -0.230$
$t_G/f = 1.42$, $N_2 \times f^4 = 0.017$
Embodiment 35
f=4.11 mm, F-nuumer=2.8, image height=1.85 mm, $2\omega = 52.1°$

| | | | |
|---|---|---|---|
| $r_1 = \infty$ (stop) | | | |
| | $d_1 = 0.0500$ | | |
| $r_2 = -10.4215$ | | | |
| | $d_2 = 0.7000$ | $n_1 = 1.71999$ | $\nu_1 = 50.25$ |
| $r_3 = -3.8884$ | | | |
| | $d_3 = 0.6652$ | | |
| $r_4 = -2.3624$ | | | |
| | $d_4 = 10.2352$ | $n_2$ (gradient index lens) | |
| $r_5 = 17.3389$ | | | |
| | $d_5 = 0.5000$ | | |
| $r_6 = \infty$ | | | |
| | $d_6 = 0.7500$ | $n_3 = 1.48749$ | $\nu_3 = 70.21$ |
| $r_7 = \infty$ | | | |
| | $d_7 = 1.1901$ | | |
| $r_8 = \infty$ (image) | | | |

Gradient index lens

| | $N_0$ | $N_1$ | $N_2$ | $N_3$ |
|---|---|---|---|---|
| d-line | 1.70000 | $-2.1513 \times 10^{-2}$ | $1.8930 \times 10^{-4}$ | $5.9305 \times 10^{-7}$ |
| C-line | 1.69500 | $-2.1465 \times 10^{-2}$ | $1.8930 \times 10^{-4}$ | $5.9305 \times 10^{-7}$ |
| F-line | 1.71167 | $-2.1625 \times 10^{-2}$ | $1.8930 \times 10^{-4}$ | $5.9305 \times 10^{-7}$ |

$1/V_0 = 2.38 \times 10^{-2}$, $1/V_1 = 0.74 \times 10^{-2}$, $N_1 \times f^2 = -0.363$
$t_g/f = 2.50$, $N_2 \times f^4 = 0.054$
Embodiment 36
f=4.01 mm, F-number=2.8, image height=1.85 mm, $2\omega = 53.1°$

| | | | |
|---|---|---|---|
| $r_1 = \infty$ (stop) | | | |
| | $d_1 = 0.2500$ | | |
| $r_2 = -5.9959$ | | | |
| | $d_2 = 8.4514$ | $n_1$ (gradient index lens) | |
| $r_3 = -4.0188$ | | | |
| | $d_3 = 0.1000$ | | |
| $r_4 = -37.6735$ | | | |
| | $d_4 = 0.8000$ | $n_2 = 1.63980$ | $\nu_2 = 34.48$ |
| $r_5 = 4.4714$ | | | |
| | $d_5 = 0.7000$ | | |
| $r_6 = \infty$ | | | |
| | $d_6 = 0.7500$ | $n_3 = 1.48749$ | $\nu_3 = 70.21$ |
| $r_7 = \infty$ | | | |
| | $d_7 = 1.1885$ | | |
| $r_8 = \infty$ (image) | | | |

Gradient index lens

| | $N_0$ | $N_1$ | $N_2$ | $N_3$ |
|---|---|---|---|---|
| d-line | 1.75000 | $-1.8608 \times 10^{-2}$ | $5.6704 \times 10^{-4}$ | $4.6884 \times 10^{-5}$ |
| C-line | 1.74550 | $-1.8607 \times 10^{-2}$ | $5.6704 \times 10^{-4}$ | $4.6884 \times 10^{-5}$ |
| F-line | 1.76050 | $-1.8611 \times 10^{-2}$ | $5.6704 \times 10^{-4}$ | $4.6884 \times 10^{-5}$ |

$1/V_0 = 2.0 \times 10^{-2}$, $1/V_1 = 0.002 \times 10^{-2}$, $N_1 \times f^2 = -0.299$
$t_g/f = 2.11$, $N_2 \times f^4 = 0.145$
Embodiment 37
f=4.37 mm, F-number=2.8, image height=1.85 mm, $2\omega = 49.7°$

| | | | |
|---|---|---|---|
| $r_1 = \infty$ (stop) | | | |
| | $d_1 = 0.2000$ | | |
| $r_2 = -4.1250$ | | | |
| | $d_2 = 4.8867$ | $n_1$ (gradient index lens) | |

-continued

| | | | |
|---|---|---|---|
| $r_3 = -8.7362$ | | | |
| | $d_3 = 0.6500$ | | |
| $r_4 = -5.4661$ | | | |
| | $d_4 = 1.0000$ | $n_2 = 1.81600$ | $\nu_2 = 46.62$ |
| $r_5 = -3.5559$ | | | |
| | $d_5 = 3.3703$ | | |
| $r_6 = \infty$ | | | |
| | $d_6 = 0.7500$ | $n_3 = 1.48749$ | $\nu_3 = 70.21$ |
| $r_7 = \infty$ | | | |
| | $d_7 = 1.1884$ | | |
| $r_8 = \infty$ (image) | | | |

Gradient index lens

| | $N_0$ | $N_1$ | $N_2$ | $N_3$ |
|---|---|---|---|---|
| d-line | 1.75000 | $-1.8462 \times 10^{-2}$ | $9.1003 \times 10^{-4}$ | $1.5212 \times 10^{-4}$ |
| C-line | 1.74550 | $-1.8545 \times 10^{-2}$ | $9.1003 \times 10^{-4}$ | $1.5212 \times 10^{-4}$ |
| F-line | 1.76050 | $-1.8269 \times 10^{-2}$ | $9.1003 \times 10^{-4}$ | $1.5212 \times 10^{-4}$ |

$1/V_0 = 2.0 \times 10^{-2}$, $1/V_1 = 1.50 \times 10^{-2}$, $N_1 \times f^2 = -0.353$
$t_G/f = 1.12$, $N_2 \times f^4 = 0.332$ Embodiment 38
f=3.48 mm, f-number=2.8, image height=1.85 mm, $2\omega = 57.7°$

| | | | |
|---|---|---|---|
| $r_1 = \infty$ | | | |
| | $d_1 = 0.6000$ | $n_1 = 1.88300$ | $\nu_1 = 40.78$ |
| $r_2 = -7.3094$ | | | |
| | $d_2 = 0.0500$ | | |
| $r_3 = \infty$ (stop) | | | |
| | $d_3 = 1.2030$ | | |
| $r_4 = -1.5102$ | | | |
| | $d_4 = 2.6779$ | n2 (gradient index lens) | |
| $r_5 = -2.4601$ | | | |
| | $d_5 = 0.0500$ | | |
| $r_6 = 4.3486$ | | | |
| | $d_6 = 2.3000$ | $n_3 = 1.73400$ | $\nu_3 = 51.49$ |
| $r_7 = -2.9908$ | | | |
| | $d_7 = 0.5000$ | $n_4 = 1.78470$ | $\nu_4 = 26.22$ |
| $r_8 = 7.9176$ | | | |
| | $d_8 = 0.4000$ | | |
| $r_9 = \infty$ | | | |
| | $d_9 = 0.7500$ | $n_5 = 1.48749$ | $\nu_5 = 70.21$ |
| $r_{10} = \infty$ | | | |
| | $d_{10} = 1.1833$ | | |
| $r_{11} = \infty$ (image) | | | |

Gradient index lens

| | $N_0$ | $N_1$ | $N_2$ | $N_3$ |
|---|---|---|---|---|
| d-line | 1.66000 | $-1.7096 \times 10^{-2}$ | $5.9455 \times 10^{-5}$ | $3.4671 \times 10^{-4}$ |
| C-line | 1.65479 | $-1.7113 \times 10^{-2}$ | $5.9455 \times 10^{-5}$ | $3.4671 \times 10^{-4}$ |
| F-line | 1.67216 | $-1.7056 \times 10^{-2}$ | $5.9455 \times 10^{-5}$ | $3.4571 \times 10^{-4}$ |

(Focusing)

| | Object distance infinite | Object distance 200 mm |
|---|---|---|
| $d_2$ | 0.05 | 0.4068 |

$1/V_0 = 2.63 \times 10^{-2}$, $1/V_1 = 0.33 \times 10^{-2}$, $N_1 \times f^2 = -0.207$
$t_G/f = 0.77$, $N_2 \times f^4 = 0.009$, $N_p/N_n = 1.055$, $\nu_p = 40.78$ Embodiment 39
f=3.15 mm, F-number=2.8, image height=1.85 mm, $2\omega = 62.9°$

| | | | |
|---|---|---|---|
| $r_1 = 9.0969$ | | | |
| | $d_1 = 0.7000$ | $n_1 = 1.84666$ | $\nu_1 = 23.78$ |
| $r_2 = -30.0731$ | | | |
| | $d_2 = 1.0005$ | | |
| $r_3 = \infty$ (stop) | | | |
| | $d_3 = 0.5934$ | | |
| $r_4 = -1.4531$ | | | |
| | $d_4 = 2.4469$ | $n_2$ (gradient index lens) | |
| $r_5 = -2.3769$ | | | |
| | $d_5 = 0.0500$ | | |
| $r_6 = 3.1021$ (aspherical surface) | | | |
| | $d_6 = 1.5652$ | $n_3 = 1.69680$ | $\nu_3 = 55.53$ |
| $r_7 = 8.8986$ | | | |
| | $d_7 = 0.5000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1901$ | | |
| $r_{10} = \infty$ (image) | | | |

Aspherical surface coefficient
$A_4 = 1.0406 \times 10^3$, $A_6 = 1.1767 \times 10^{-3}$, $A_6 = 1.6092 \times 10^{-4}$
$A_{10} = -1.2601 \times 10^{-5}$ Gradient index lens

| | $N_0$ | $N_1$ | $N_2$ | $N_3$ |
|---|---|---|---|---|
| d-line | 1.64000 | $-1.7068 \times 10^{-2}$ | $-8.2755 \times 10^{-5}$ | $-2.6214 \times 10^{-5}$ |
| C-line | 1.63543 | $-1.7273 \times 10^{-2}$ | $-8.2755 \times 10^{-5}$ | $-2.6214 \times 10^{-5}$ |
| F-line | 1.65067 | $-1.6590 \times 10^{-2}$ | $-8.2755 \times 10^{-5}$ | $-2.6214 \times 10^{-5}$ |

$1/V_0 = 2.38 \times 10^{-2}$, $1/V_1 = -4.0 \times 10^{-2}$, $N_1 \times f^2 = -0.169$
$t_G/f = 0.78$, $N_2 \times f^4 = -0.008$, $\nu_p = 23.78$ Embodiment 40
f=3.5 mm, F-number=2.8, image height=1.85 mm, $2\omega = 53.8°$

| | | | |
|---|---|---|---|
| $r_1 = -21.4456$ | | | |
| | $d_1 = 0.8000$ | $n_1 = 1.84666$ | $\nu_1 = 23.78$ |
| $r_2 = -4.9066$ | | | |
| | $d_2 = 0.5000$ | | |
| $r_3 = \infty$ (stop) | | | |
| | $d_3 = 0.5199$ | | |
| $r_4 = -1.7092$ | | | |
| | $d_4 = 5.2494$ | $n_2$ (gradient index lens) | |
| $r_5 = -3.0713$ | | | |
| | $d_5 = 0.0500$ | | |
| $r_6 = 7.3000$ | | | |
| | $d_6 = 2.3809$ | $n_3 = 1.88300$ | $\nu_3 = 40.78$ |
| $r_7 = 4.9758$ | | | |
| | $d_7 = 0.6000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1897$ | | |
| $r_{10} = \infty$ (image) | | | |

Gradient index lens

| | $N_0$ | $N_1$ | $N_2$ | $N_3$ |
|---|---|---|---|---|
| d-line | 1.64000 | $-1.8357 \times 10^{-2}$ | $5.0858 \times 10^{-4}$ | $1.7243 \times 10^{-4}$ |
| C-line | 1.63543 | $-1.8578 \times 10^{-2}$ | $5.0858 \times 10^{-4}$ | $1.7243 \times 10^{-4}$ |
| F-line | 1.65067 | $-1.7843 \times 10^{-2}$ | $5.0858 \times 10^{-4}$ | $1.7243 \times 10^{-4}$ |

$1/V_0=2.38\times10^{-2}$, $1/V_1=-4.0\times10^{-2}$, $N_1\times f^2=-0.225$
$t_G/f=1.50$, $N_2\times f^4=-0.706$, $N_p/N_n=0.981$, $\nu_p=23.78$ Embodiment 41
f=3.48 mm, F-number=2.8, image height=1.85 mm, $2\omega=59.3°$

| | | | |
|---|---|---|---|
| $r_1 = -5.9937$ | | | |
| | $d_1 = 0.6000$ | $n_1 = 1.84666$ | $\nu_1 = 23.78$ |
| $r_2 = -3.4547$ | | | |
| | $d_2 = 0.2000$ | | |
| $r_3 = \infty$ (stop) | | | |
| | $d_3 = 0.3000$ | | |
| $r_4 = -2.1601$ | | | |
| | $d_4 = 0.4000$ | $n_2 = 1.45600$ | $\nu_2 = 90.31$ |
| $r_5 = 6.4339$ | | | |
| | $d_5 = 0.2000$ | | |
| $r_6 = 5.3428$ | | | |
| | $d_6 = 4.5554$ | $n_3$ (gradient index lens) | |
| $r_7 = -3.0070$ | | | |
| | $d_7 = 1.7836$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1900$ | | |
| $r_{10} = \infty$ (image) | | | |

Gradient index lens

| | $N_0$ | $N_1$ | $N_2$ | $N_3$ |
|---|---|---|---|---|
| d-line | 1.64000 | $-1.1984\times10^{-2}$ | $8.5081\times10^{-4}$ | $3.1225\times10^{-4}$ |
| C-line | 1.63543 | $-1.2356\times10^{-2}$ | $8.5081\times10^{-4}$ | $3.1225\times10^{-4}$ |
| F-line | 1.65067 | $-1.1117\times10^{-2}$ | $8.5081\times10^{-4}$ | $3.1225\times10^{-4}$ |

$1/V_0=2.38\times10^{-2}$, $1/V_1=10.03\times10^{-2}$, $N_1\times f^2=-0.145$
$t_G/f=1.31$, $N_2\times f^4=0.125$, $N_p/N_n=1.268$, $\nu=23.78$ Embodiment 42
f=3.2 mm, F-number=2.8, image height=1.85 mm, $2\omega=63.8°$

| | | | |
|---|---|---|---|
| $r_1 = 25.4222$ | | | |
| | $d_1 = 0.8000$ | $n_1 = 1.78470$ | $\nu_1 = 26.30$ |
| $r_2 = -14.6679$ | | | |
| | $d_2 = 1.4043$ | | |
| $r_3 = \infty$ (stop) | | | |
| | $d_3 = 0.3674$ | | |
| $r_4 = -1.9719$ | | | |
| | $d_4 = 3.5687$ | $n_2 = 1.83481$ | $\nu_2 = 42.72$ |
| $r_5 = -3.0383$ | | | |
| | $d_5 = 0.1500$ | | |
| $r_6 = 3.6203$ | | | |
| | $d_6 = 2.4626$ | $n_3$ (gradient index lens) | |
| $r_7 = 4.9906$ | | | |
| | $d_7 = 0.8000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1901$ | | |
| $r_{10} = \infty$ (image) | | | |

Gradient index lens

| | $N_0$ | $N_1$ | $N_2$ | $N_3$ |
|---|---|---|---|---|
| d-line | 1.58000 | $-1.5694\times10^{-2}$ | $-3.3988\times10^{-4}$ | $4.2259\times10^{-5}$ |
| C-line | 1.57665 | $-1.5882\times10^{-2}$ | $-3.3988\times10^{-4}$ | $4.2259\times10^{-5}$ |
| F-line | 1.58781 | $-1.5257\times10^{-2}$ | $-3.3988\times10^{-4}$ | $4.2259\times10^{-5}$ |

$1/V_0=1.92\times10^{-2}$, $1/V_1=-3.98\times10^{-2}$, $N_1\times f^2=-0.161$
$t_G/f=0.77$, $N_2\times f^4=-0.036$, $\nu_p=26.3$ Embodiment 43
f=3.85 mm, F-number=2.8, image height=1.85 mm, $2\omega=50.5°$

| | | | |
|---|---|---|---|
| $r_1 = -7.9783$ | | | |
| | $d_1 = 0.8000$ | $n_1 = 1.74100$ | $\nu_1 = 52.65$ |
| $r_2 = -3.5855$ | | | |
| | $d_2 = 0.4932$ | | |
| $r_3 = \infty$ (stop) | | | |
| | $d_3 = 0.4000$ | | |
| $r_4 = -1.7848$ | | | |
| | $d_4 = 7.7391$ | $n_2$ (gradient index lens) | |
| $r_5 = -3.9369$ | | | |
| | $d_5 = 3.1567$ | | |
| $r_6 = \infty$ | | | |
| | $d_6 = 0.7500$ | $n_3 = 1.48749$ | $\nu_3 = 70.21$ |
| $r_7 = \infty$ | | | |
| | $d_7 = 1.1906$ | | |
| $r_8 = \infty$ (image) | | | |

Gradient index lens

| | $N_0$ | $N_1$ | $N_2$ | $N_3$ |
|---|---|---|---|---|
| d-line | 1.60000 | $-1.3899\times10^{-2}$ | $2.1744\times10^{-4}$ | $3.2896\times10^{-5}$ |
| C-line | 1.59617 | $-1.3959\times10^{-2}$ | $2.1744\times10^{-4}$ | $3.2896\times10^{-5}$ |
| F-line | 1.60894 | $-1.3760\times10^{-2}$ | $2.1744\times10^{-4}$ | $3.2896\times10^{-5}$ |

$1/V_0=2.13\times10^{-2}$, $1/V_1=-1343\times10^2$, $N_1\times f^2=-0.206$
$t_G/f=2.01$, $N_2\times f^4=0.048$, $\nu_p=52.65$ Embodiment 44
f=3.61 mm, F-number=2.8, image height=1.85 mm, $2\omega=58.0°$

| | | | |
|---|---|---|---|
| $r_1 = -3.4861$ | | | |
| | $d_1 = 0.8000$ | $n_1 = 1.77250$ | $\nu_1 = 49.60$ |
| $r_2 = -3.3510$ | | | |
| | $d_2 = 0.1500$ | | |
| $r_3 = 58.9888$ | | | |
| | $d_3 = 0.7000$ | $n_2 = 1.88300$ | $\nu_2 = 40.78$ |
| $r_4 = -9.9727$ | | | |
| | $d_4 = 0.4195$ | | |
| $r_5 = \infty$ (stop) | | | |
| | $d_5 = 0.4000$ | | |
| $r_6 = -2.0492$ | | | |
| | $d_6 = 8.7675$ | $n_3$ (gradient index lens) | |
| $r_7 = \infty$ | | | |
| | $d_7 = 0.7500$ | $n_4 = 1.48749$ | $\nu_4 = 70.21$ |
| $r_8 = \infty$ | | | |
| | $d_8 = 1.1918$ | | |
| $r_9 = \infty$ (image) | | | |

Gradient index lens

| | $N_0$ | $N_1$ | $N_2$ | $N_3$ |
|---|---|---|---|---|
| d-line | 1.60000 | $-2.5898\times10^{-2}$ | $2.4990\times10^{-4}$ | $1.5312\times10^{-5}$ |
| C-line | 1.59640 | $-2.5862\times10^{-2}$ | $2.4990\times10^{-4}$ | $1.5312\times10^{-5}$ |
| F-line | 1.60840 | $-2.5981\times10^{-2}$ | $2.4990\times10^{-4}$ | $1.5312\times10^{-5}$ |

$1/V_0 32\ 2.0\times10^{-2}$, $1/V_1\_0.46\times10^{-2}$, $N_1\times f^2=-0.338$
$t_G/f=2.43$, $N_2\times f^4=0.042$, $\nu_p=40.78$ Embodiment 45
f=3.5 mm, F-number=2.8, image height=1.85 mm, $2\omega=59.6°$

| | | | |
|---|---|---|---|
| $r_1 = 6.4658$ | | | |
| | $d_1 = 0.9000$ | $n_1 = 1.72916$ | $\nu_1 = 54.68$ |
| $r_2 = 1.9642$ | | | |
| | $d_2 = 1.0000$ | | |
| $r_3 = \infty$ | | | |
| | $d_3 = 1.8004$ | $n_2 = 1.52542$ | $\nu_2 = 55.78$ |
| $r_4 = \infty$ (reflecting surface) | | | |
| | $d_4 = 2.4999$ | $n_3 = 1.52542$ | $\nu_3 = 55.78$ |
| $r_5 = 3.2080$ | | | |
| | $d_5 = 1.2553$ | | |
| $r_6 = \infty$ (stop) | | | |
| | $d_6 = 1.5226$ | | |
| $r_7 = \infty$ | | | |
| | $d_7 = 10.1277$ | $n_4$ (gradient index lens) | |
| $r_8 = \infty$ | | | |
| | $d_8 = 0.7500$ | $n_5 = 1.48749$ | $\nu_5 = 70.21$ |
| $r_9 = \infty$ | | | |
| | $d_9 = 1.1900$ | | |
| $r_{10} = \infty$ (image) | | | |

Gradient index lens

| | $N_0$ | $N_1$ | $N_2$ |
|---|---|---|---|
| d-line | 1.67000 | $-9.1652 \times 10^{-3}$ | $6.7452 \times 10^{-5}$ |
| C-line | 1.66553 | $-9.2010 \times 10^{-3}$ | $6.7452 \times 10^{-5}$ |
| F-line | 1.68042 | $-9.0817 \times 10^{-3}$ | $6.7452 \times 10^{-5}$ |

(Focusing)

| | Object distance infinite | Object distance 100 mm |
|---|---|---|
| $d_2$ | 1.0 | 1.1694 |

$1/V_0=2.22\times10^{-2}$, $1/V_1=-1.30\times10^{-2}$, $N_1 \times f^2=-0.112$
$t_G/f=2.89$, $N_2 \times f^4=0.010$, $\nu_p/\nu_n=1.02$
$N_p/N_n=0.882$, $\nu_p=55.78$ Embodiment 46
$f=3.0$ mm, F-number=2.8, image height=1.85 mm, $2\omega=64.2°$

| | | | |
|---|---|---|---|
| $r_1 = 15.6924$ | | | |
| | $d_1 = 0.7000$ | $n_1 = 1.77250$ | $\nu_1 = 49.60$ |
| $r_2 = 2.6149$ (aspherical surface) | | | |
| | $d_2 = 2.8443$ | | |
| $r_3 = \infty$ (reflecting surface) | | | |
| | $d_3 = 2.5448$ | | |
| $r_4 = -8.8540$ | | | |
| | $d_4 = 0.8000$ | $n_2 = 1.84666$ | $\nu_2 = 23.78$ |
| $r_5 = 84.7224$ | | | |
| | $d_5 = 0.8027$ | | |
| $r_6 = \infty$ (stop) | | | |
| | $d_6 = 1.0477$ | | |
| $r_7 = -15.7620$ | | | |
| | $d_7 = 16.8990$ | $n_3$ (gradient index lens) | |
| $r_8 = -141.4639$ | | | |
| | $d_8 = 1.0000$ | | |
| $r_9 = \infty$ | | | |
| | $d_9 = 0.7500$ | $n_4 = 1.48749$ | $\nu_4 = 70.21$ |
| $r_{10} = \infty$ | | | |
| | $d_{10} = 1.1900$ | | |
| $r_{11} = \infty$ (image) | | | |

Aspherical surface coefficient
$A_4=-6.6412\times10^{-3}$, $A_6=4.1496\times10^{-3}$, $A_8=-2.0583\times10^{-4}$ Gradient index lens

| | $N_0$ | $N_1$ | $N_2$ |
|---|---|---|---|
| d-line | 1.70000 | $-6.4846 \times 10^{-3}$ | $6.6853 \times 10^{-5}$ |
| C-line | 1.69400 | $-6.5041 \times 10^{-3}$ | $6.6853 \times 10^{-5}$ |
| F-line | 1.71400 | $-6.4392 \times 10^{-3}$ | $6.6853 \times 10^{-5}$ |

$1/V_0=2.86\times10^{-2}$, $1/V_1=-0.02\times10^{-2}$, $N_1 \times f^2=-0.058$
$t_G/f=5.63$, $N_2 \times f^4=0.005$, $\nu_p/\nu_n=0.45$
$N_p/N_n=1.042$, $\nu_p=23.78$ Embodiment 47
$f=5.18$ mm, F-number=2.8, image height=1.85 mm, $2\omega=44.4°$

| | | | |
|---|---|---|---|
| $r_1 = -6.0804$ | | | |
| | $d_1 = 2.5000$ | $n_1 = 1.52542$ | $\nu_1 = 55.78$ |
| $r_2 = \infty$ (reflecting surface) | | | |
| | $d_2 = 2.5000$ | $n_2 = 1.52542$ | $\nu_2 = 55.78$ |
| $r_3 = -5.9753$ | | | |
| | $d_3 = 1.2000$ | | |
| $r_4 = \infty$ (stop) | | | |
| | $d_4 = 1.0000$ | | |
| $r_5 = \infty$ | | | |
| | $d_5 = 18.3846$ | $n_3$ (gradient index lens) | |
| $r_6 = \infty$ | | | |
| | $d_6 = 4.0000$ | | |
| $r_7 = \infty$ (reflecting surface) | | | |
| | $d_7 = 3.5000$ | | |
| $r_8 = \infty$ | | | |
| | $d_8 = 0.7500$ | $n_4 = 1.48749$ | $\nu_4 = 70.21$ |
| $r_9 = \infty$ | | | |
| | $d_9 = 1.1489$ | | |
| $r_{10} = \infty$ (image) | | | |

Gradient index lens

| | $N_0$ | $N_1$ | $N_2$ |
|---|---|---|---|
| d-line | 1.60000 | $-5.0000 \times 10^{-3}$ | $1.2259 \times 10^{-6}$ |
| C-line | 1.59710 | $-4.9964 \times 10^{-3}$ | $2.2259 \times 10^{-6}$ |
| F-line | 1.60677 | $-5.0083 \times 10^{-3}$ | $1.2259 \times 10^{-6}$ |

$^1/V_0=1.61\times10^{-2}{}_1$, $1/Vi=0.24\times10^{-2}$, $N_1 \times f^2=-0.134$
$t_G/f=3.55$, $N_2 \times f^4=0.0009$ Embodiment 48
$f=5.0$ mm, F-number=2.8, image height=1.85 mm, $2\omega=42.6°$

| | | | |
|---|---|---|---|
| $r_1 = \infty$ (stop) | | | |
| | $d_1 = 0.5000$ | | |
| $r_2 = 33.5152$ | | | |
| | $d_2 = 3.2126$ | $n_1 = 1.74100$ | $\nu_1 = 52.65$ |
| $r_3 = \infty$ (reflecting surface) | | | |
| | $d_3 = 3.5126$ | $n_2 = 1.74100$ | $\nu_2 = 52.65$ |
| $r_4 = 9.2424$ | | | |
| | $d_4 = 0.4000$ | | |
| $r_5 = \infty$ | | | |
| | $d_5 = 5.1185$ | $n_3$ (gradient index lens) | |
| $r_6 = \infty$ | | | |
| | $d_6 = 0.3287$ | | |
| $r_7 = \infty$ | | | |
| | $d_7 = 0.7500$ | $n_4 = 1.48749$ | $\nu_4 = 70.21$ |
| $r_8 = \infty$ | | | |
| | $d_8 = 1.1931$ | | |
| $r_9 = \infty$ (image) | | | |

Gradient index lens

|   | $N_0$ | $N_1$ | $N_2$ |
|---|---|---|---|
| d-line | 1.67000 | $-1.5280 \times 10^{-2}$ | $2.8237 \times 10^{-5}$ |
| C-line | 1.66553 | $-1.5346 \times 10^{-2}$ | $2.8237 \times 10^{-5}$ |
| F-line | 1.68042 | $-1.5126 \times 10^{-2}$ | $2.8237 \times 10^{-5}$ |

$1/V_0 = 2.22 \times 10^{-2}$, $1/V_1 = 1.44 \times 10^{-2}$, $N_1 \times f^2 = -0.382$
$t_G/f = 1.02$, $N_2 \times f^4 = 0.018$ Embodiment 49
$f = 3.25$ mm, F-number=2.8, image height=1.85 mm, $2\omega = 62.8°$
In case the first lens unit is consisting of the reflecting surfaces
$f = 6.31$ mm, F-number=2.8, image height=1.85 mm, $2\omega = 34°$ $r_1 = 9.9669$
    $d_1 = 1.0000$    $n_1 = 1.69680$    $\nu_1 = 55.53$
$r_2 = 2.4193$ (aspherical surface)
    $d_2 = 1.2000$
$r_3 = -67.8885$
    $d_3 = 2.8884$    $n_2 = 1.52542$    $\nu_2 = 55.78$
$r_4 = \infty$ (reflecting surface)
    $d_4 = 3.8741$    $n_3 = 1.52542$    $\nu_3 = 55.78$
$r_5 = 5.6750$ (aspherical surface)
    $d_5 = 1.9707$
$r_6 = \infty$ (stop)
    $d_6 = 1.3980$
$r_7 = \infty$
    $d_7 = 13.1793$    $n_4$ (gradient index lens)
$r_8 = \infty$
    $d_8 = 0.7500$    $n_5 = 1.48749$    $\nu_5 = 70.21$
$r_9 = \infty$
    $d_9 = 1.1887$
$r_{10} = \infty$ (image)

Aspherical coefficient
(second surface)
$A_4 = -3.3290 \times 10^{-3}$, $A_6 = -8.0505 \times 10^{-4}$, $A_6 = -2.8153 \times 10^{-4}$
(fifth surface)
$A_4 = -2.6838 \times 10^{-4}$, $A_6 = 3.7978 \times 10^{-4}$, $A_6 = 0$ Gradient index lens

|   | $N_0$ | $N_1$ | $N_2$ |
|---|---|---|---|
| d-line | 1.67000 | $-8.1099 \times 10^{-3}$ | $1.0747 \times 10^{-5}$ |
| C-line | 1.66553 | $-8.1110 \times 10^{-3}$ | $1.0747 \times 10^{-5}$ |
| F-line | 1.68042 | $-8.1073 \times 10^{-3}$ | $1.0747 \times 10^{-5}$ |

$1/V_0 = 2.22 \times 10^{-2}$, $1/V_1 = -0.05 \times 10^{-2}$, $N_1 \times f^2 = -0.086$
$t_G/f = 4.06$, $N_2 \times f^4 = 0.012$, $\nu_p/\nu_f = -1.00$
$N_p/N_n = 0.899$, $\nu_p = 55.78$ Embodiment 50
$f = 6.56 \sim 4.71 \sim 18.91$ mm, F-number=$3.6 \sim 4.7 \sim 6.2$,
image height=3.5 mm, $2\omega = 60.4° \sim 36.0° \sim 20.0°$ $r_1 = \infty$
    $d_1 = 0.8000$    $n_1 = 1.81600$    $\nu_1 = 46.62$
$r_2 = 5.6195$
    $d_2 = 0.4788$
$r_3 = 6.1296$
    $d_3 = 0.9983$    $n_2 = 1.84666$    $\nu_2 = 23.78$
$r_4 = 11.5281$
    $d_4 = D_1$ (variable)
$r_5 = \infty$ (stop)
    $d_5 = 0.5000$
$r_6 = \infty$
    $d_6 = 5.9864$    $n_3$ = (gradient index lens)
$r_7 = \infty$
    $d_7 = D_2$ (variable)
$r_8 = 11.6948$
    $d_8 = 0.8000$    $n_4 = 1.74077$    $\nu_4 = 27.79$
$r_9 = 5.7435$
    $d_9 = D_3$ (variable)
$r_{10} = 15.2627$
    $d_{10} = 1.4009$    $n_5 = 1.88300$    $\nu_5 = 40.76$
$r_{11} = -26.2228$
    $d_{11} = 0.1993$
$r_{12} = \infty$
    $d_{12} = 1.6000$    $n_6 = 1.51633$    $\nu_6 = 64.14$
$r_{13} = \infty$
    $d_{13} = 1.6000$    $n_7 = 1.51633$    $\nu_7 = 64.14$
$r_{14} = \infty$
    $d_{14} = 0.4000$
$r_{15} = \infty$
    $d_{15} = 0.7500$    $n_8 = 1.51633$    $\nu_6 = 64.14$
$r_{16} = \infty$
    $d_{16} = 1.1255$
$r_{17} = \infty$ (image)

| f | 6.56 | 4.71 | 18.91 |
|---|---|---|---|
| $D_1$ | 11.06493 | 5.95704 | 0.50000 |
| $D_2$ | 5.81906 | 6.47619 | 11.96499 |
| $D_3$ | 1.82166 | 6.33050 | 6.36121 |

Gradient index lens

|   | $N_0$ | $N_1$ |
|---|---|---|
| d-line | 1.65000 | $-9.2600 \times 10^{-3}$ |
| C-line | 1.64512 | $-9.2557 \times 10^{-3}$ |
| F-line | 1.66138 | $-9.2700 \times 10^{-3}$ |

$1/V_0 = 2.5 \times 10^{-2}$, $1/V_1 = 1.5 \times 10^{-3}$, $N_1 \times f^2 = -0.398$
$t_G/f = 0.913$, $N_2 \times f^4 = 0$, wherein the reference symbols $r_1, r_2, \ldots$ represent radii of curvature on surfaces of respective lens components, the reference symbols $d_1, d_2, \ldots$ designate thicknesses of the respective lens components and airspaces reserved therebetween, the reference symbols $n_1, n_2, \ldots$ denote refractive indices of the respective lens components for the d-line, and the reference symbols $\nu_1, \nu_2 \ldots$, represent Abbe's numbers of the respective lens components.

The first through seventeenth embodiments of the present invention have the first composition, or are composed as described in detail below:

The first embodiment has a composition illustrated in FIG. 1, or is composed, in order from the object side, of a positive lens component, a negative lens component, a positive lens component and a positive lens component. Speaking more concretely, the first embodiment is composed, in order from the object side, of a first lens unit which consists of a positive meniscus lens component having a concave surface on the image side and a negative meniscus lens component having a concave surface on the image side, an aperture stop S, and a second lens unit which consists of a positive meniscus lens component having a concave surface on the object side and a positive plano-convex lens component. The first embodiment is a retrofocus type lens system in which the plano-convex lens component disposed on the image side is configured as a radial type gradient index lens component. In FIG. 1, the reference symbol LA represents a axial ray, the reference symbol LB designates an offaxial ray, the reference symbol C denotes a planer protective glass plate for an image pickup device such as a CCD or a CMD, the reference symbol S represents an aperture stop and the reference symbol SF designates a flare stop.

Though the first embodiment is composed of a small number of lens components, it favorably corrects lateral chromatic aberration by disposing the negative lens component and the positive lens component in the first lens unit, and using the radial type gradient index lens component in the second lens unit. Further, the first embodiment has realized nearly telecentric incidence of the offaxial ray onto an image surface relatively easily by configuring an image side surface as a convex surface.

By selecting the positive lens component as the object side lens component on which the offaxial ray is highest, or by composing the first lens unit of the positive lens component and the negative lens component, the first embodiment moderates asymmetry of the lens system, thereby favorably correcting lateral chromatic aberration and distortion with the small number of lens components. Further, amounts of aberrations are reduced by composing the second lens unit of the two positive lens components for sharing a positive refractive power between these two lens components. Offaxial aberrations are corrected favorably by adopting the radial type gradient index lens component as the image side lens component of the second lens unit on which the offaxial ray is high. The flare stop SF for cutting off offaxial flare components is disposed on the object side of the aperture stop S.

The first embodiment is an example wherein the manufacturing cost of the lens system is reduced by configuring one surface of the radial type gradient index lens component as a planar surface which can easily be polished. In the retrofocus type lens system preferred as the first embodiment, longitudinal chromatic aberration and spherical aberration produced in the lens system as a whole are corrected by the concave lens component disposed in the first lens unit.

Though the lens system preferred as the first embodiment is composed only of the four lens components, aberrations are corrected favorably in this lens system.

Figure 2:
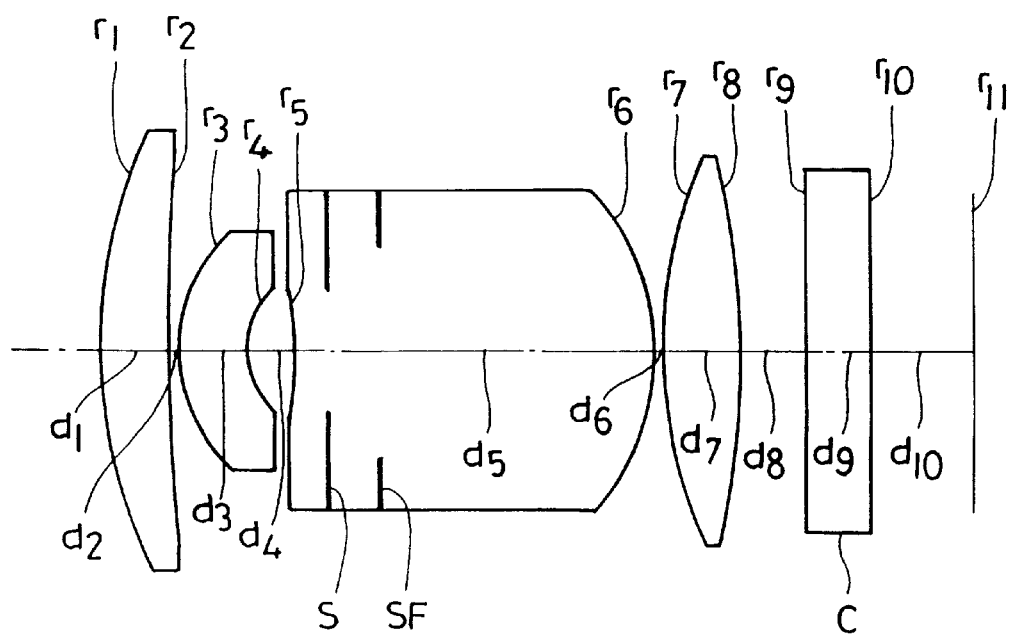

The second embodiment has a composition illustrated in FIG. 2, or is composed, in order from the object side, of a positive lens component, a negative lens component, a positive lens component and a positive lens component. Speaking more concretely, the second embodiment is composed, in order from the object side, of a first lens unit which consists of a positive meniscus lens component having a concave surface on the image side and a negative meniscus lens component having a concave surface on the image side, and a second lens unit which consists of a positive meniscus lens component having a concave surface on the object side and a positive biconvex lens component: the lens component disposed on the object side in the second lens unit being a radial type gradient index lens component. An aperture stop is disposed at a location 0.3648 mm as measured from the object side surface of the radial type gradient index lens component. Further, a flare stop SF for cutting off offaxial flare components is disposed at a location 0.96 mm as measured from the object side surface of the radial type gradient index lens component.

In the second embodiment, the radial type gradient index lens component has a shortened diameter and is disposed on the object side in the second lens unit for reducing the manufacturing cost of the lens system. By reducing the diameter of the gradient index lens component, it is possible to shorten the time required for imparting a refractive index distribution, thereby lowering a manufacturing cost of the lens system. The aperture stop is disposed in the radial type gradient index lens component for lowering offaxial rays passing through this lens component, thereby making it possible to reduce a diameter of this lens component. Furthermore, offaxial aberrations in particular are corrected favorably by configuring the lens component disposed on the image side as a biconvex lens component for sharing a positive refractive power between both surfaces of this lens component.

A retrofocus type lens system using a first lens unit which is composed, in order from the object side, of a positive lens component and a negative lens component like the second embodiment, is suited particularly to have a widened field angle.

The lens system preferred as the second embodiment is focused onto an object located at an extremely short distance by moving the first lens component toward the object side. However, this lens system can be focused onto the object located at the extremely short distance by moving the lens system as a whole toward the object side.

Though the lens system preferred as the second embodiment is composed only of the four lens components, aberrations are corrected favorably in this lens system.

Figure 3:
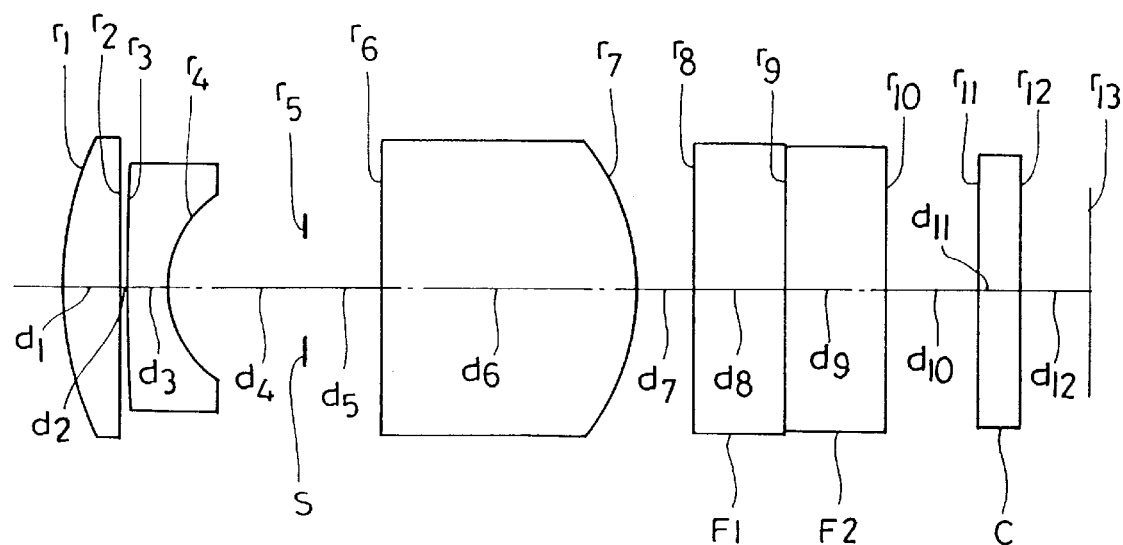

The third t is composed, in order from the object side, of a positive lens component, a negative lens component and a positive lens component as shown in FIG. 3. Speaking more concretely, the third embodiment is composed, in order from the object side, of a first lens unit which consists of a positive biconvex lens component and a negative meniscus lens component having a concave surface on the image side, a stop S, and a second lens unit which consists of a positive plano-convex lens component: the lens component disposed in the second lens unit being a radial type gradient index lens component. Further, plain parallel plates $F_1$ and $F_2$ are two kinds of filters for cutting off components having specific wave lengths. Out of these plain parallel plates, $F_1$ is an infrared cut filter and $F_2$ is a low pass filter.

The first lens unit of the third embodiment is composed, in order from the object side, of the positive lens component and the negative lens component for making it possible to favorably correct lateral chromatic aberration and distortion. The second lens unit which is composed of the single radial type gradient index lens component is configured so as to satisfy the conditions (1) and (2) for favorable correction of lateral chromatic aberration and a Petzval's sum in particular.

For nearly telecentric incidence of offaxial rays onto an image surface, the positive lens component disposed in the second lens unit is configured so as to have a convex surface on the image side. Though this surface tends to produce coma in a large amount, coma is corrected favorably by configuring this lens component as the radial type gradient index lens component and so as to satisfy the condition (2).

Further, the radial type gradient index lens component has a planar surface on one side for reducing the cost required for polishing.

Aberrations are corrected favorably in the lens system preferred as the third embodiment which is composed only of the three lens components.

Figure 4:
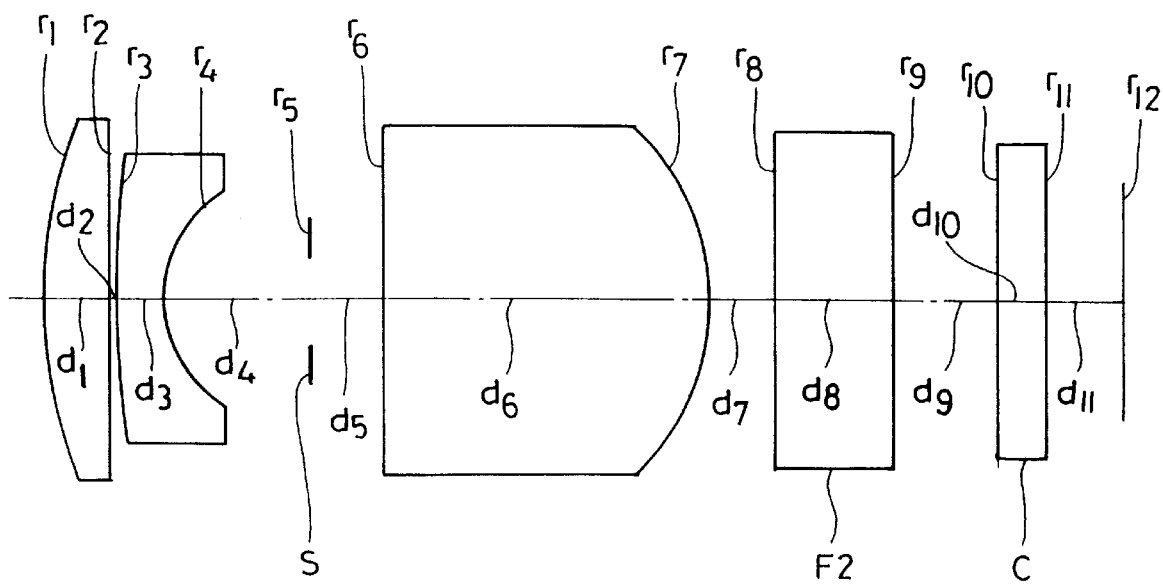

The fourth embodiment is composed, in order from the object side, of a positive lens component, a negative lens component and a positive lens component as shown in FIG. 4, or has a composition which is substantially the same as that of the third embodiment. Speaking more concretely, the fourth embodiment is composed, in order from the object side, of a first lens unit which consists of a positive meniscus lens component having a concave surface on the image side and a negative meniscus lens component having a concave surface on the image side, a stop S, and a second lens unit which consists of a positive plano-convex lens component: the lens component disposed in the second lens unit being a radial type gradient index lens component. Furthermore, a plane parallel plate $F_2$ functions as a cut filter which cuts off components having specific wavelengths.

The fourth embodiment is an example in which at least one lens component has a filter function for eliminating components having specific wavelengths, whereby filters are used in a number one smaller than that of the filters used in the third embodiment. In this embodiment, the radial type gradient index lens component, for example, has a function to cut off components having wavelengths within the infrared region for omitting the infrared cut filter in the third embodiment, thereby reducing a manufacturing cost of the lens system and shortening a total length thereof.

Figure 5:
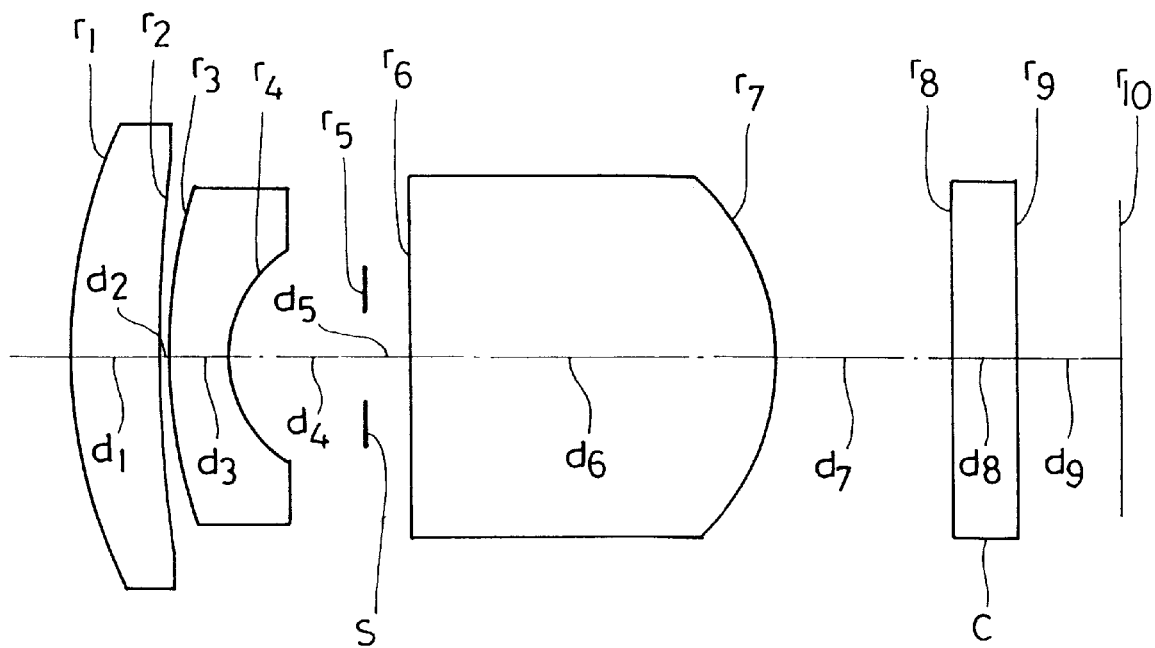

The fifth embodiment is composed, in order from the object side, of a positive lens component, a negative lens component and a positive lens component as shown in FIG. 5 or has a composition which is substantially the same as that of the third embodiment. Speaking more concretely, the fifth embodiment is composed, in order from the object side, of a first lens unit which consists of a positive meniscus lens component having a concave surface on the image side and a negative meniscus lens component having a concave surface on the image side, an aperture stop S, and a second lens unit which consists of a plano-convex lens component: the lens component disposed in the second lens unit being a radial type gradient index lens component.

The fifth embodiment is an example in which at least one lens component has filter functions for eliminating components having specific wavelength, whereby filters are used in a number two smaller than that of the filters used in the third embodiment for configuring the lens system to be more compact and reducing its manufacturing cost.

The fifth embodiment is focused onto an object located at an extremely short distance by moving toward the object side the first lens unit which is disposed on the object side of the aperture stop.

Figure 6A:
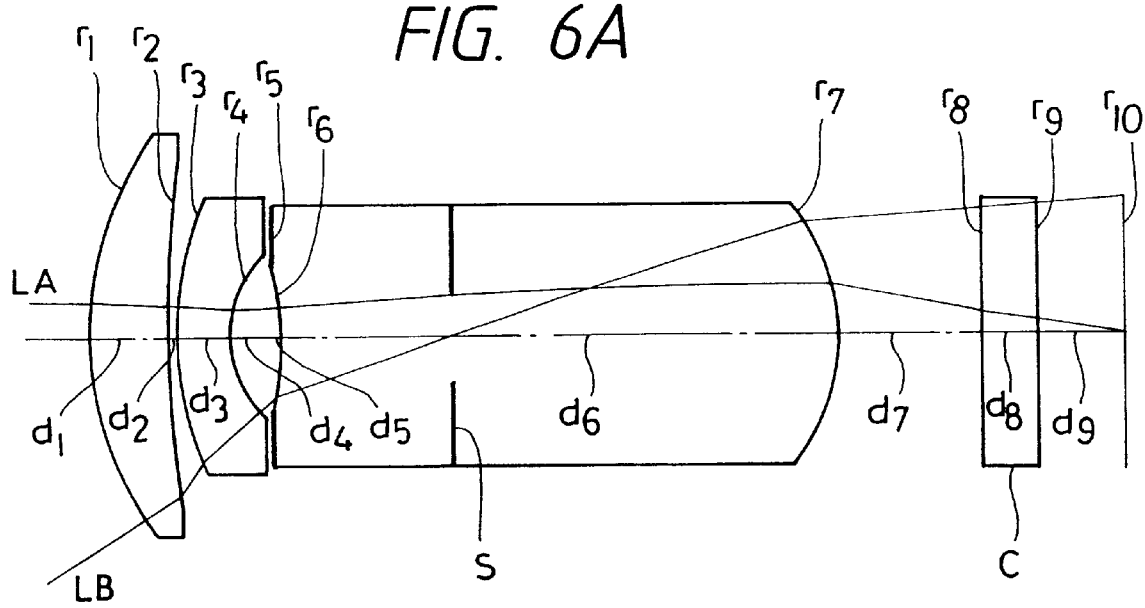
FIG. 6A shows a sectional view illustrating a sixth embodiment of the lens system according to the present invention.
Figure 6B:
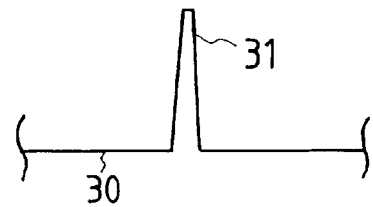
FIG. 6B shows an enlarged scale view of an aperture stop in the sixth embodiment of the present invention.

The sixth embodiment is composed, in order from the object side, of a positive lens component, a negative lens component and a positive lens component as shown in FIG. 6A. Speaking more concretely, the sixth embodiment is composed, in order from the object side, of a first lens unit which consists of a positive meniscus lens component having a concave surface on the image side and a negative meniscus lens component having a concave surface on the image side, and a second lens unit which consists of a plano-convex lens component: the lens component disposed in the second lens unit being a radial type gradient index lens component. An aperture stop is disposed at a location 2.1619 mm as measured from an object side surface of the radial type gradient index lens component.

In the sixth embodiment, the aperture stop is disposed in the radial type gradient index lens component, thereby reducing a diameter of the radial type gradient index lens component and lowering a manufacturing cost of the lens system. Further, the disposition of the aperture stop in the radial type gradient index lens component produces an effect to moderate asymmetry of the lens system, thereby facilitating correction of aberrations. When an aperture stop is to be disposed in a lens component as in the sixth embodiment, an aperture stop can actually be provided by forming a cut from an outer circumference 30 of the lens component toward the optical axis as shown on an enlarged scale in FIG. 6B. It is desirable to coat this cut with a black paint or finish the cut surfaces in satin-like surface so that the cut can shield rays. Further, an aperture stop can be formed in a lens component by another method, or cutting a lens component into two pieces, disposing an aperture stop on a cut surface and cementing the two pieces to each other or bringing them into close contact with each other. This method is applicable also to formation of a flare stop.

When a radial type gradient index lens component is to be manufactured by the sol-gel method, for example, an aperture stop can be disposed at the manufacturing stage.

Figure 7A:
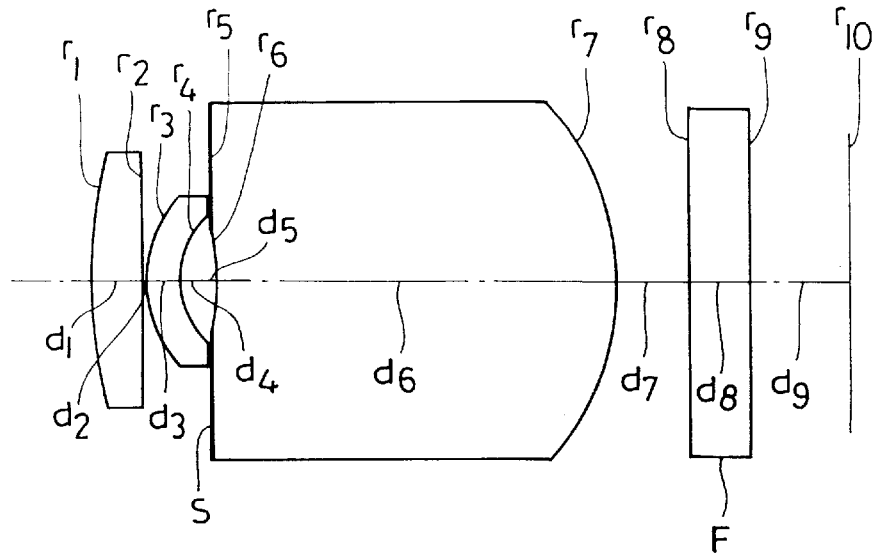
FIG. 7A shows a sectional view illustrating a seventh embodiment of the lens system according to the present invention.
Figure 7B:
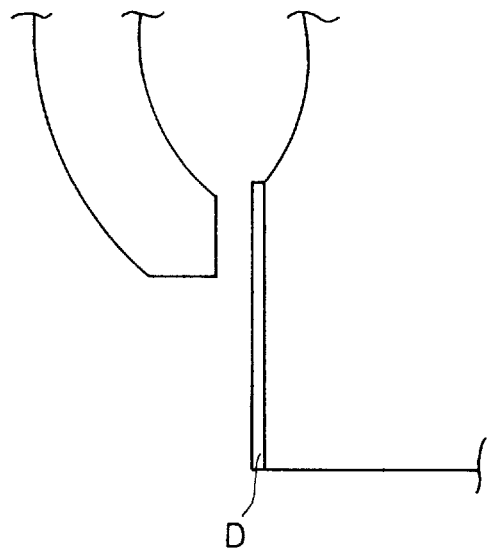
FIG. 7B shows an enlarged scale view of an aperture stop in the seventh embodiment of the present invention.

The seventh embodiment is composed, in order from the object side, of a positive lens component, a negative lens component and a positive lens component as shown in FIG. 7A. Speaking more concretely, the seventh embodiment is composed, in order from the object side, of a first lens unit which consists of a positive convexo-planar lens component and a positive meniscus lens component having a concave surface on the object side: the lens component disposed in the second lens unit being a radial type gradient index lens component. The seventh embodiment is an example of an attempt to configure the lens system to be compact by configuring the radial type gradient index lens component so as to have a large difference in refractive index between a portion on the optical axis and a marginal portion, and thinning this lens component. An aperture stop is disposed on an object side surface of the radial type gradient index lens component. For disposing an aperture stop on a lens surface as in the seventh embodiment, a thin sheet D is cemented to the surface or bringing the thin sheet D into close contact with the surface as shown in FIG. 7B. Further, an aperture stop can be formed by finishing a lens surface as a satin surface or coating it with a black paint.

Figure 8:
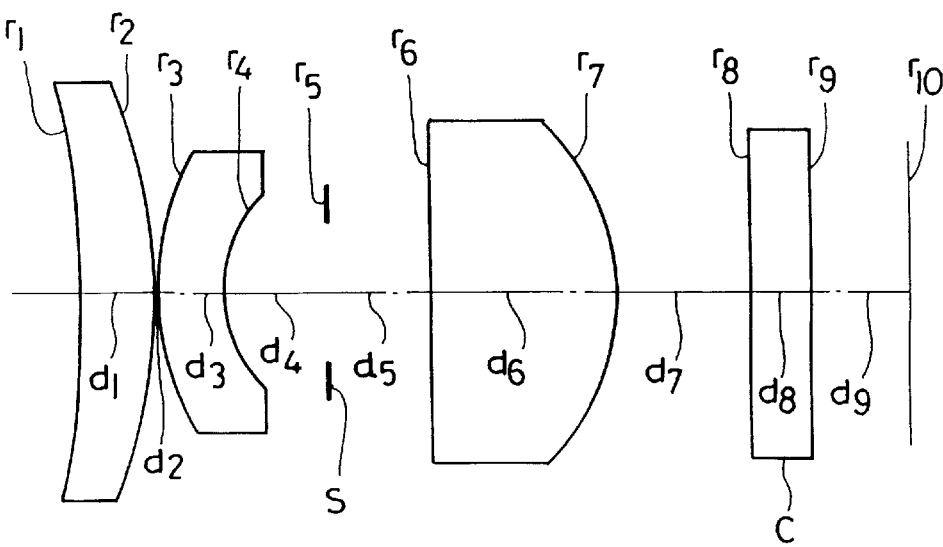
FIGS. 8 through 49 show sectional views illustrating eighth through forty-ninth embodiments respectively of the lens system according to the present invention.

The eighth embodiment is composed, in order from the object side, of a positive lens component, a negative lens component and a positive lens component as shown in FIG. 8. Speaking more concretely, the eighth embodiment is composed, in order from the object side, of a first lens unit which consists of a positive meniscus lens component having a concave surface on the object side and a negative meniscus lens component having a concave surface on the image side, an aperture stop S, and a second lens unit which consists of a positive piano-convex lens component: the lens disposed in the second lens unit being a radial type gradient index lens component.

Further, the eighth embodiment uses an aspherical surface as a first surface, thereby favorably correcting distortion in particular. A shape of this aspherical surface and those of aspherical surfaces used in the present invention are expressed by the following formula:

$$z = \frac{y^2/r}{1 + \sqrt{1-(y/r)^2}} + \sum_{i=1}^{n} A_{2i} y^{2i}$$

wherein a direction along the x axis is taken as the z axis, a direction perpendicular to the optical axis is taken as the y axis, the reference symbol r represents a radius of curvature on the optical axis and the reference symbol Ai designates an aspherical surface coefficient.

Figure 9:
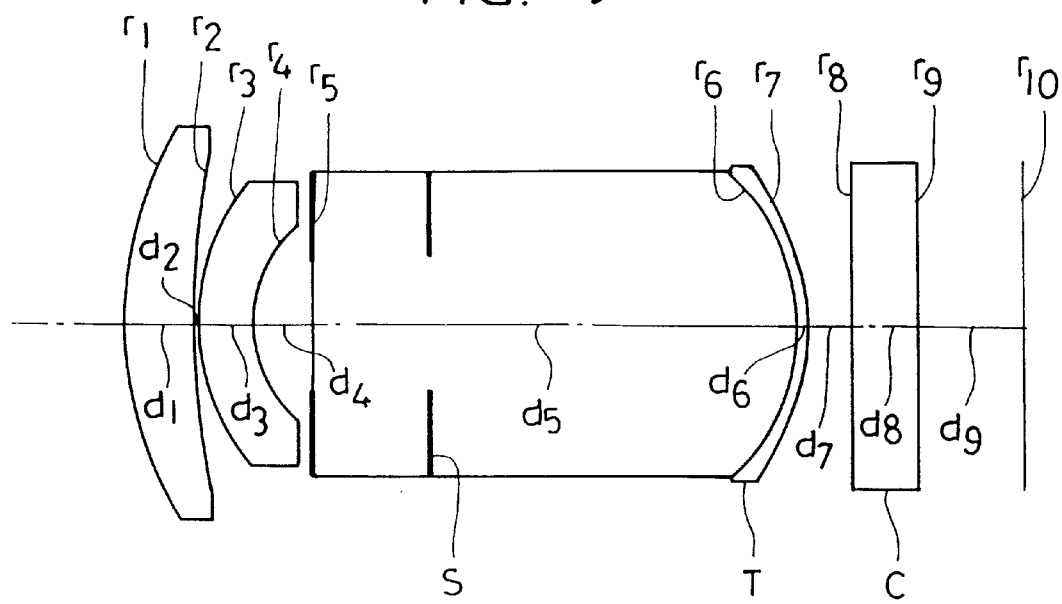

The ninth embodiment has a composition illustrated in FIG. 9, or is composed of a positive lens component, a negative lens component and a positive lens component in order from the object side. Speaking more concretely, the ninth embodiment is composed, in order from the object side, of a first lens unit which consists of a positive meniscus lens component having a concave surface on the image side and a negative meniscus lens component having a concave surface on the image side, and a second lens unit which consists of a positive meniscus lens component having a concave surface on the object side: the lens component disposed in the second lens unit being a radial type gradient index lens component. Further, an aperture stop is disposed at a location 1.2232 mm as measured from the object side surface of the radial type gradient index lens component.

The ninth embodiment is an example wherein an image side surface of the radial type gradient index lens component is configured as an aspherical surface which has such a shape as to weaken a positive refractive power as portions of the aspherical surface are farther from the optical axis in a radial direction, whereby coma and distortion produced by this surface are corrected favorably.

In the ninth embodiment, the effect of the aspherical surface is obtained by cementing an aspherical transparent member T to the radial type gradient index lens component or bringing the member T into close contact with the lens component. This transparent member T is made of a resin, a plastic material, a glass material, a crystal or a liquid. A similar effect can be obtained by forming an aspherical surface directly on the radial type gradient index lens component.

When coma or distortion in particular is to be corrected by using an aspherical surface on a lens component disposed on the object side of the aperture stop, it is desirable to configure the aspherical surface so as to have a shape which weakens a negative refractive power as portions of the aspherical surface are farther from the optical axis toward a margin. When an aspherical surface is to be used on a lens component disposed on the image side of the aperture stop, it is desirable to configure an aspherical surface so as to have a shape which weakens a positive refractive power as portions of the aspherical surface are farther from the optical axis toward the margin.

The lens system preferred as the ninth embodiment is focused onto an object located at an extremely short distance by moving the lens system as a whole toward the object side.

Figure 10:
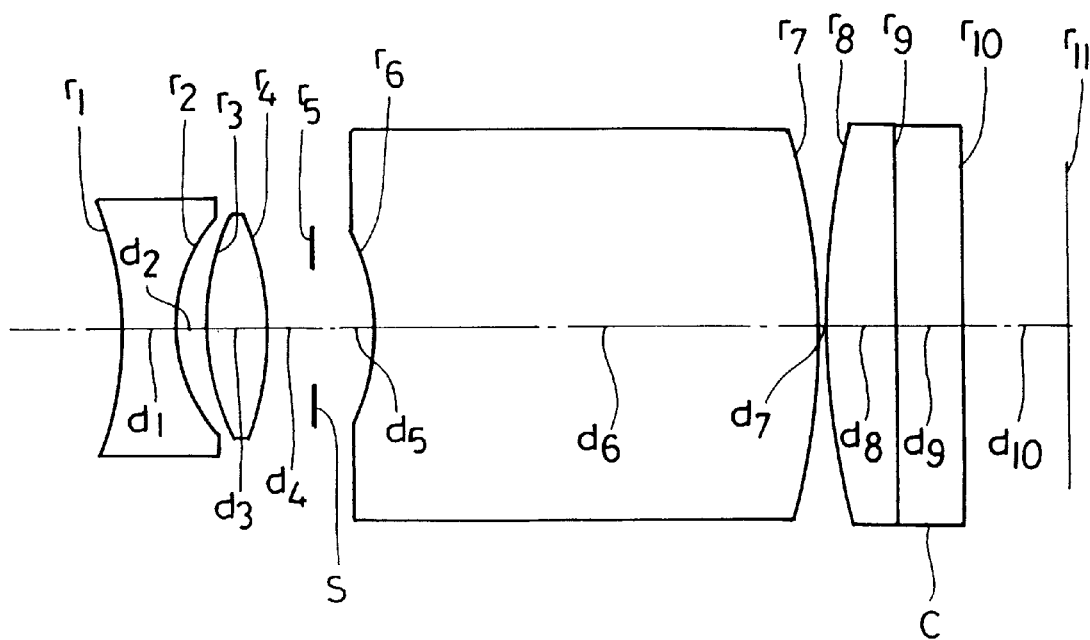

The tenth embodiment is composed, in order from the object side, of a negative lens component, a positive lens component, a positive lens component and a positive lens component as shown in FIG. 10. Speaking more concretely, the tenth embodiment is composed, in order from the object side, of a first lens unit which consists of a negative biconcave lens component and a positive biconvex lens component, an aperture stop S, and a second lens unit which consists of a positive meniscus lens component having a concave surface on the object side and a positive convexoplanar lens component: the lens component disposed on the object side in the second lens unit being a radial type gradient index lens component.

Though the tenth embodiment is composed of a small number of lens components, it is configured so as to favorably correct lateral chromatic aberration in particular by using the negative lens component and the positive lens component in the first lens unit, and the radial type gradient index lens component in the second lens unit. Further, a composition advantageous for widening a field angle of the lens system was obtained by comprising the first lens unit of the negative lens component and the positive lens component, in that order from the object side. Though the composition using the negative lens component as the first lens component on which offaxial rays are high makes it relatively hard to correct lateral chromatic aberration, lateral chromatic aberration is corrected favorably in this embodiment by configuring the radial type gradient index lens component so as to satisfy the condition (1).

Further, nearly telecentric incidence of the offaxial rays onto an image surface is made possible relatively easily by selecting the convex surface as the image side surface of the radial type gradient index lens component. In addition, coma and distortion are corrected favorably by configuring the radial type gradient index lens component so as to satisfy the condition (2). In other words, the radial type gradient index lens component has refractive indices which are lowered as the portions of the convex surface are farther from the optical axis toward the margin when it satisfies the condition (2), thereby making it possible to favorably correct coma and distortion produced by this surface. The tenth embodiment has a planar image side surface and allows a protective glass plate to be attached to this surface. Moreover, it is possible to omit the protective glass plate C by configuring the image side lens component as a protective glass plate.

The tenth embodiment is focused onto an object located at an extremely short distance by moving the object side negative lens component toward the object side.

Though the lens system preferred as the tenth embodiment is composed only of the lens component in a small number (four), aberrations are corrected favorably in this embodiment.

Figure 11:
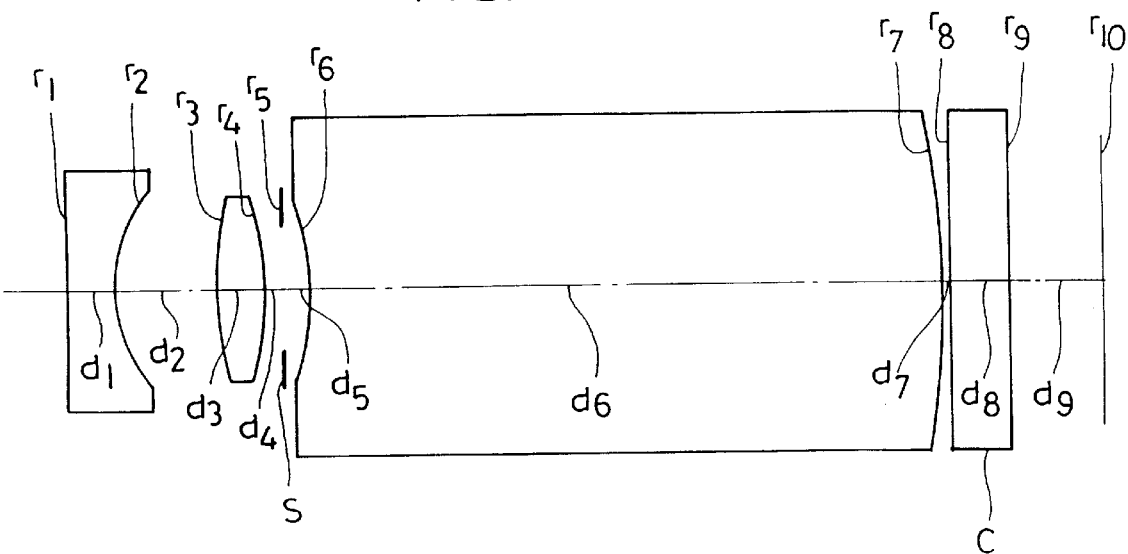

The eleventh embodiment has a composition illustrated in FIG. 11, or is composed of a negative lens component, a positive lens component and a positive lens component, in that order from the object side. Speaking more concretely, the eleventh embodiment is composed, in order from the object side, of a first lens unit which consists of a negative biconcave lens component and a positive biconvex lens component, an aperture stop, and a second lens unit which consists of a positive meniscus lens component having a concave surface on the object side: the lens component disposed in the second lens unit being a radial type gradient index lens component.

The eleventh embodiment in which the first lens unit is composed, in order from the object side, of the negative lens component and the positive lens component has a composition which is advantageous for widening a field angle of the lens system. Though the eleventh embodiment is composed only of the three lens components, aberrations are corrected favorably in this embodiment by configuring the radial type gradient index lens component so as to satisfy the conditions (1) and (2).

For configuring compactly the so-called retrofocus type lens system which uses at least one negative lens component in a first lens unit and a second lens unit having a positive refractive power, it is desirable to configure a radial type gradient index lens component so as to satisfy the following condition (18):

$$1 < t_G/f < 6 \tag{18}$$

If the lower limit of 1 of the condition (18) is not satisfied, the radial type gradient index lens component will have a weak refractive power of medium, thereby undesirable undercorrecting lateral chromatic aberration. If the upper limit of 6 of the condition (18) is exceeded, in contrast, the radial type gradient index lens component will be thick, thereby undesirably prolonging a total length of the lens system.

Aberrations are corrected favorably in the lens system preferred as the eleventh embodiment though it is composed only of the three lens components.

Figure 12:
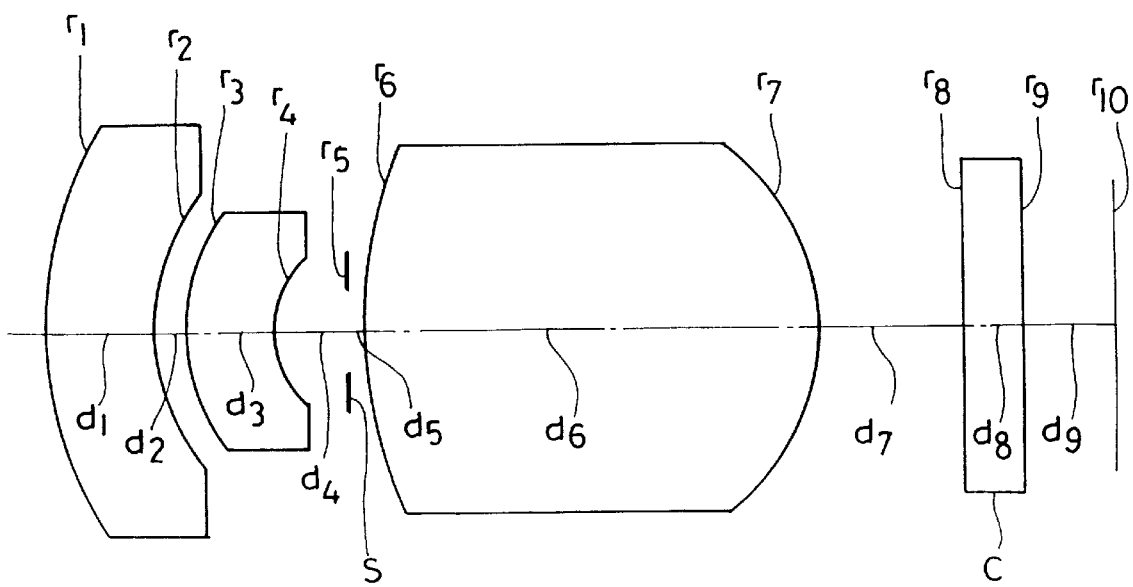

The twelfth t is composed, in order from the object side, of a negative lens component, a negative lens component and a positive lens component as shown in FIG. 12. Speaking more concretely, the twelfth embodiment is composed, in order from the object side, of a first lens unit which consists of a negative meniscus lens component having a concave surface on the image side and a negative meniscus lens component having a concave surface on the image side, an aperture stop S, and a second lens unit which consists of a positive biconvex lens component: the lens component disposed in the second lens unit being a radial type gradient index lens component.

The twelfth embodiment favorably corrects offaxial aberrations though it has a field angle which is widened by composing the first lens unit of the two negative lens components for sharing a negative refractive power between these lens components.

Figure 13:
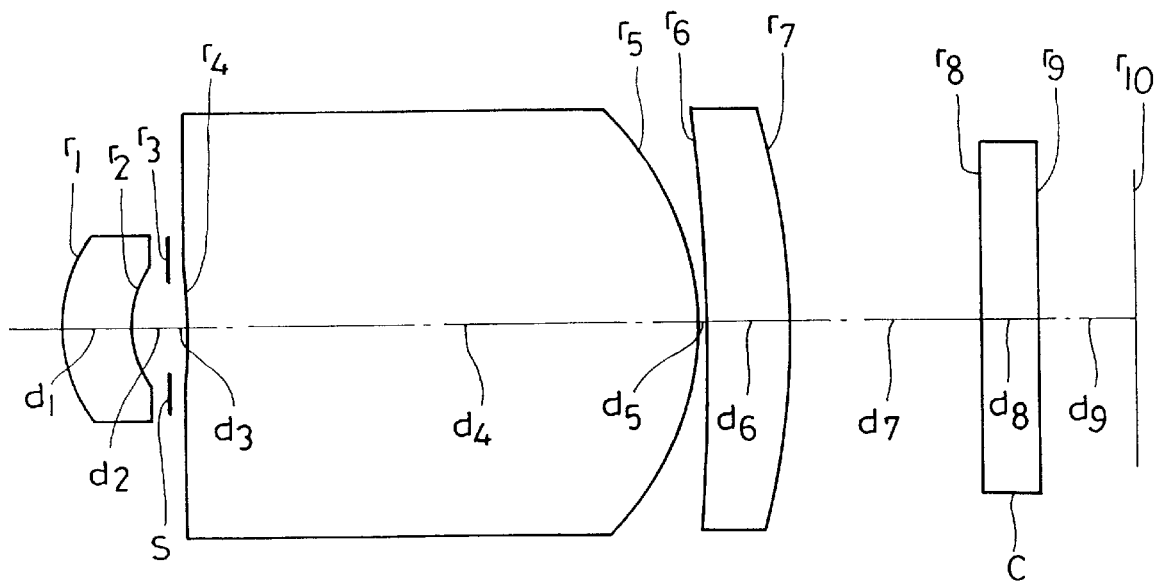

The thirteenth embodiment is composed, in order from the object side, of a negative lens component, a positive lens component and a positive lens component as shown in FIG. 13. Speaking more concretely, the thirteenth embodiment is composed, in order from the object side, of a first lens unit which consists of a negative meniscus lens component having a concave surface on the image side, an aperture stop, and a second lens unit which consists of a positive meniscus lens component having a concave surface on the object side and a positive meniscus lens component having a concave surface on the object side: the lens component disposed on the object side in the second lens unit being a radial type gradient index lens component. Further, the image side surface of the first lens component is configured as an aspherical surface which weakens a negative refractive power as portions of the aspherical surface are farther from the optical axis in the radial direction and serves for correcting distortion.

Though the thirteenth embodiment uses the first lens unit which is composed only of the negative lens component, it corrects aberrations favorably using the radial type gradient index lens component.

Figure 14:
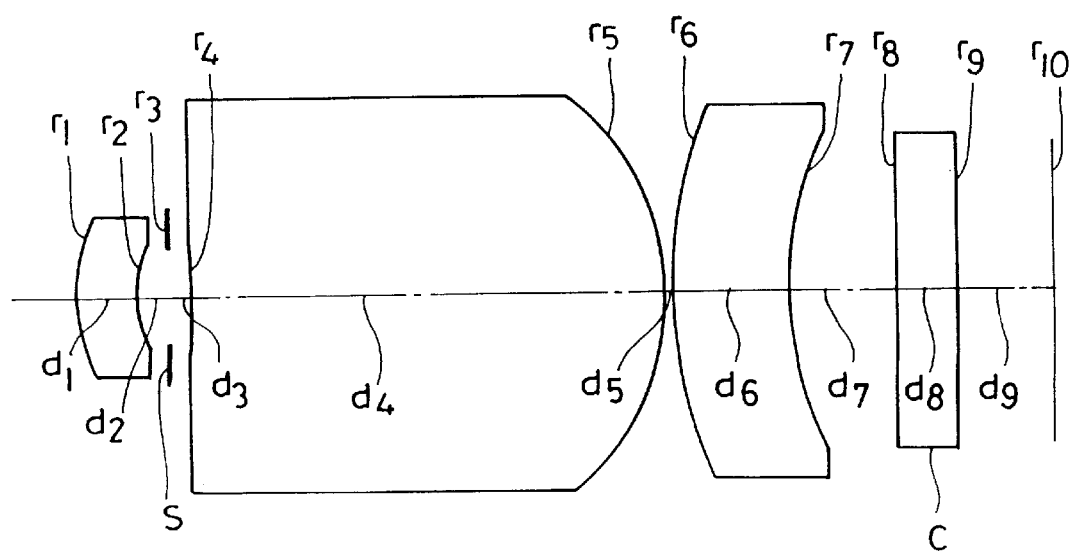

The fourteenth embodiment is composed, in order from the object side, of a negative lens component, a positive lens comment and a negative lens component as shown in FIG. 14. Speaking more concretely, the fourteenth embodiment is composed, in order from the object side, of a first lens unit which consists of a negative meniscus lens component having a concave surface on the image side, an aperture stop, and a second lens unit which consists of a positive meniscus lens component having a concave surface on the object side and a negative meniscus lens component having a concave surface on the image side: the lens component disposed on the object side in the second lens unit being a radial type gradient index lens component.

The fourteenth embodiment adopts a negative lens component as the image side lens component for moderating asymmetry of the lens system as a whole, thereby favorably correcting offaxial aberrations.

Figure 15:
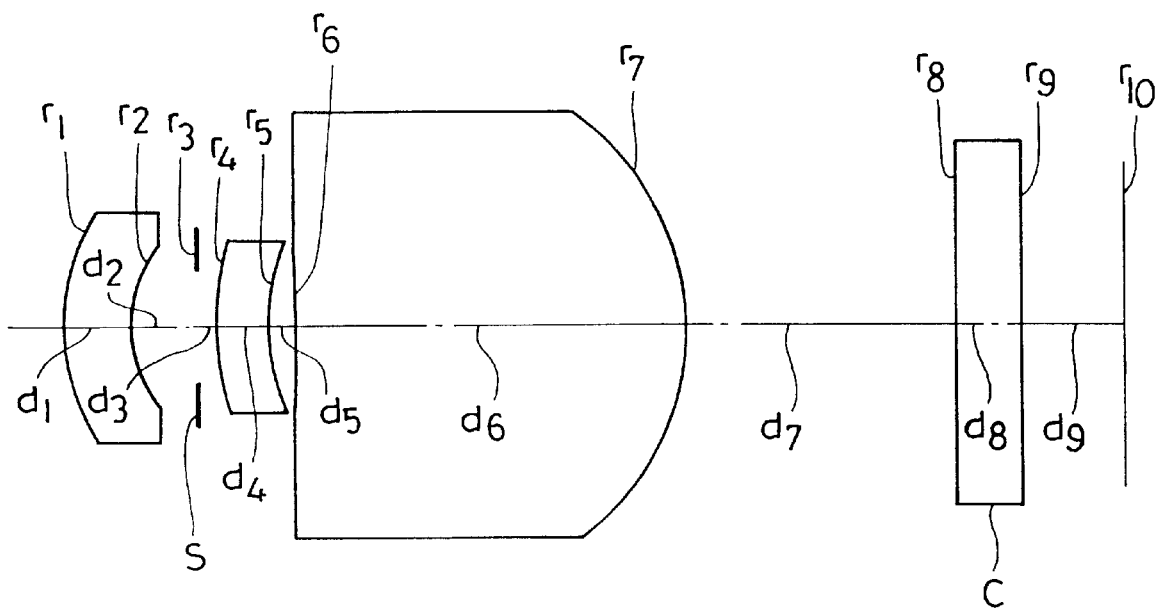

The fifteenth embodiment has a composition illustrated in FIG. 15, or is composed of a negative lens component, a negative lens component and a positive lens component in that order from the object side. Speaking more concretely, the fifteenth embodiment is composed, in order from the object side, of a first lens unit which consists of a negative meniscus lens component having a concave surface on the image side, an aperture stop, and a second lens unit which consists of a negative meniscus lens component having a concave surface on the image side and a positive meniscus lens component having a concave surface on the object side: the lens component disposed on the image side in the second lens unit being a radial type gradient index lens component. The fifteenth embodiment moderates asymmetry of the lens system as a whole by using the negative lens component in the second lens unit, thereby favorably correcting offaxial aberrations. Further, this embodiment favorably corrects lateral chromatic aberration and distortion by disposing the radial type gradient index lens component at the image side location.

Figure 16:
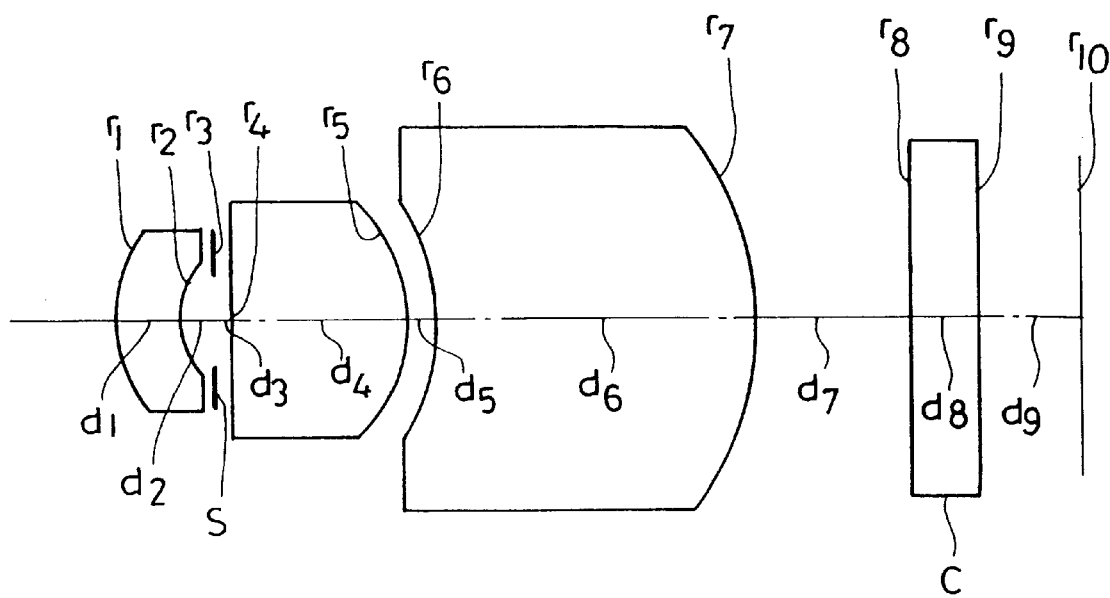

The sixteenth embodiment has a composition illustrated in FIG. 16, or is composed of a negative lens component, a positive lens component and a positive lens component in that order from the object side. Speaking more concretely, the sixteenth embodiment is composed, in order from the object side, of a first lens unit which consists of a negative meniscus lens component having a concave surface on the image side, an aperture stop S, and a second lens unit which consists of a positive meniscus lens component having a concave surface on the object side and a positive meniscus lens component having a concave surface on the object side: the lens component disposed on the image side in the second lens unit being a radial type gradient index lens component. In the sixteenth embodiment, aberrations are corrected favorably by composing the second lens unit of the two positive lens components for sharing a refractive power between these lens components.

Figure 17:
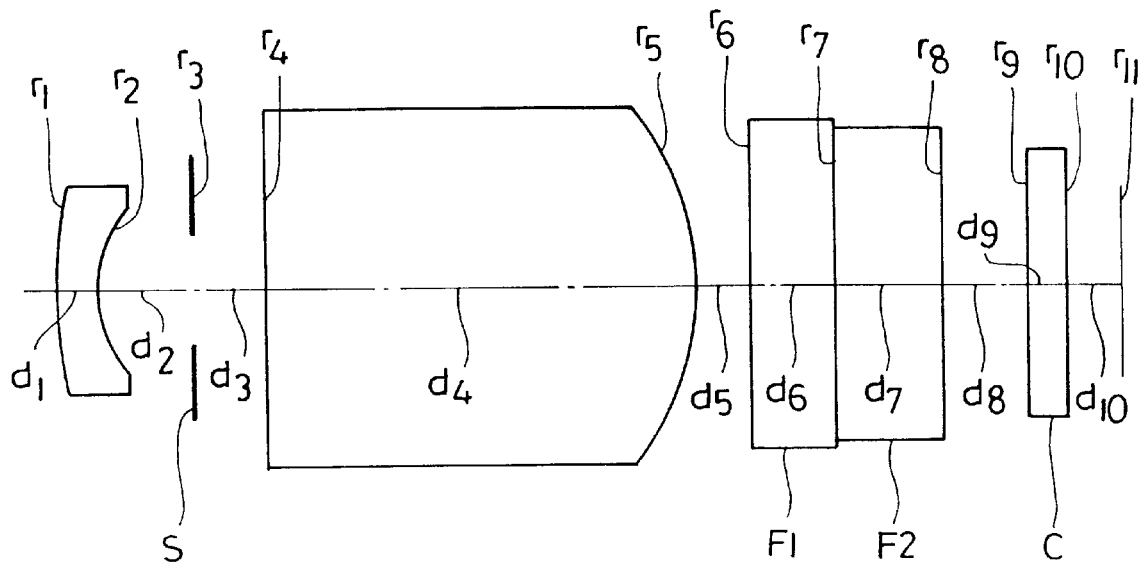

The seventeenth embodiment is composed, in order from the object side, of a negative lens component and a positive lens component as shown in FIG. 17. Speaking more concretely, the seventeenth embodiment is composed, in order from the object side, of a first lens unit which consists of a negative meniscus lens component having a concave surface on the image side, an aperture stop S and a second lens unit which consists of a positive piano-convex lens component: the lens component disposed in the second lens unit being a radial type gradient index lens component.

Though the seventeenth embodiment is composed only of the two lens components, it is a lens system which has favorably corrected aberrations and can be manufactured at a low cost.

Figure 18:
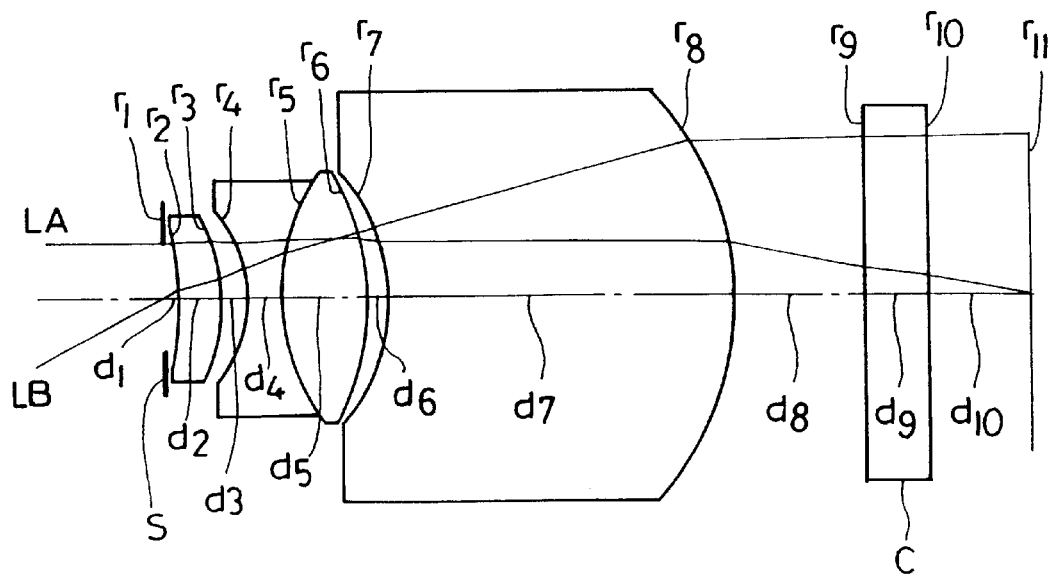

Each of the eighteenth through thirty-seventh embodiment is a lens system according to the present invention which has the second composition and uses an aperture stop disposed on the object side of the lens system. These embodiments will be described in detail below:

The eighteenth embodiment has a composition illustrated in FIG. 18, or is composed of a positive lens component, a negative lens element, a positive lens element and a positive lens component. Speaking more concretely, the eighteenth —embodiment is composed, in order from the object side, of an aperture stop, a positive lens component having a concave surface on the object side, a cemented lens component which consists of a negative biconcave lens element and a positive biconvex lens element, and a positive meniscus lens component having a convave surface on the object side: the lens component disposed on the image side being a radial type gradient index lens component.

The eighteenth embodiment is an example wherein nearly telecentric incidence of offaxial rays on an image surface is facilitated by disposing the aperture stop on the object side. Further, lateral chromatic aberration is corrected favorably by using the radial type gradient index lens component which satisfies the condition (1). Furthermore, the radial type gradient index lens component is configured so as to satisfy the condition (2) for favorably correcting a Petzval's sum. The cemented lens component (the negative lens element and the positive lens element) is configured so as to satisfy the condition (14), thereby favorably correcting the Petzval's sum. Moreover, the Petzval's sum in particular is favorably corrected by configuring the radial type gradient index lens component so as to have the meniscus shape and a weak power of surface. In addition, the radial type gradient index lens component is configured so as to have the meniscus shape which has the concave surface on the side of the stop, thereby making it possible to favorably correct offaxial aberrations.

Figure 19:
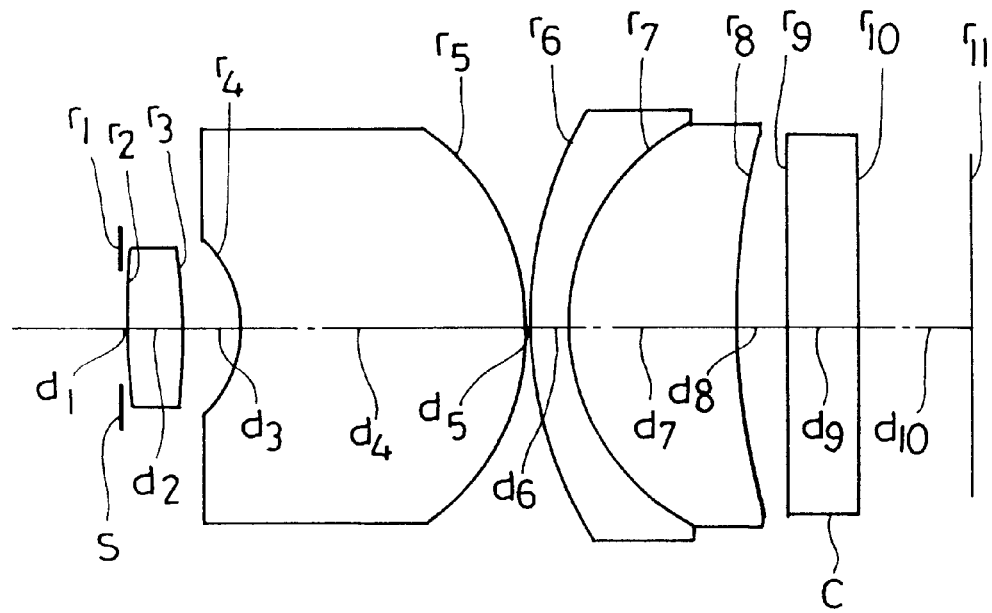

The nineteenth embodiment has a composition illustrated in FIG. 19, or is composed of a positive lens component, a positive lens component, a negative lens element and a positive lens element. Speaking more detailedly, the nineteenth embodiment is composed, in order from the object side, of an aperture stop, a positive biconvex lens component, a positive meniscus lens component having a concave surface on the object side, and a cemented lens component which consists of a negative meniscus lens element having a concave surface on the image side and a positive meniscus lens element having a concave surface on the image side: the second lens component being a radial type gradient index lens component. An object side surface of the first lens component is configured as an aspherical surface. In the nineteenth embodiment, lateral chromatic aberration in particular is corrected favorably by disposing the cemented lens component on the image side where offaxial rays are highest.

Figure 20:
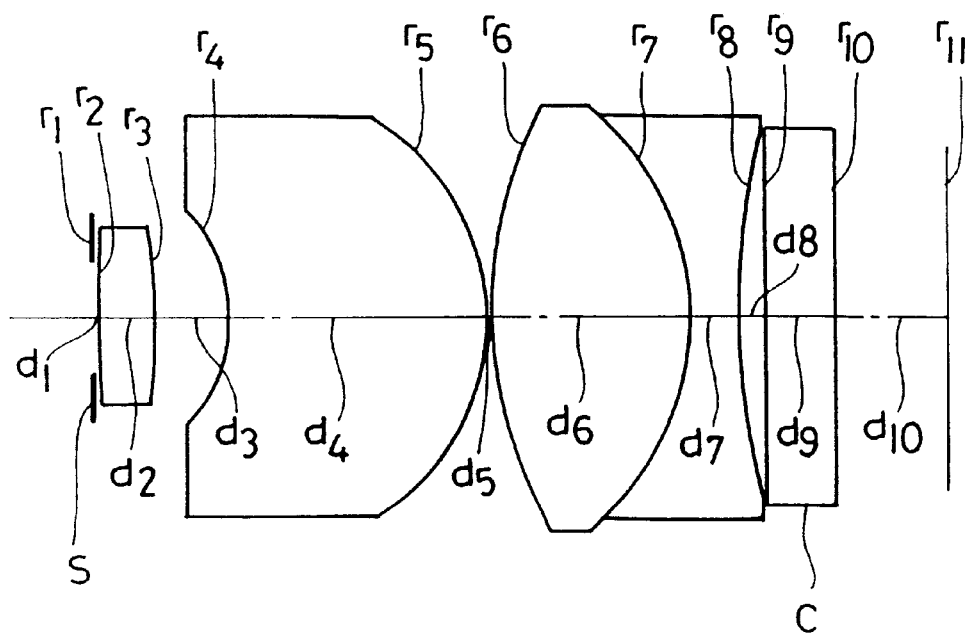

The twentieth embodiment is composed, in order from the object side, of a positive lens component, a positive lens component, a positive lens element and a negative lens element as shown in FIG. 20. In detail, the twentieth embodiment is composed, in order from the object side, of an aperture stop, a positive biconvex lens component, a positive meniscus lens component having a concave surface on the object side, and a cemented lens component which consists of a positive biconvex lens element and a negative biconcave lens element: the second lens component being a radial type gradient index lens component.

The twentieth embodiment is an example wherein lateral chromatic aberration is corrected more favorably by disposing the negative lens element on the image side.

The twentieth embodiment is focused onto an object located at an extremely short distance by moving the lens system as a whole toward the object side.

Figure 21:
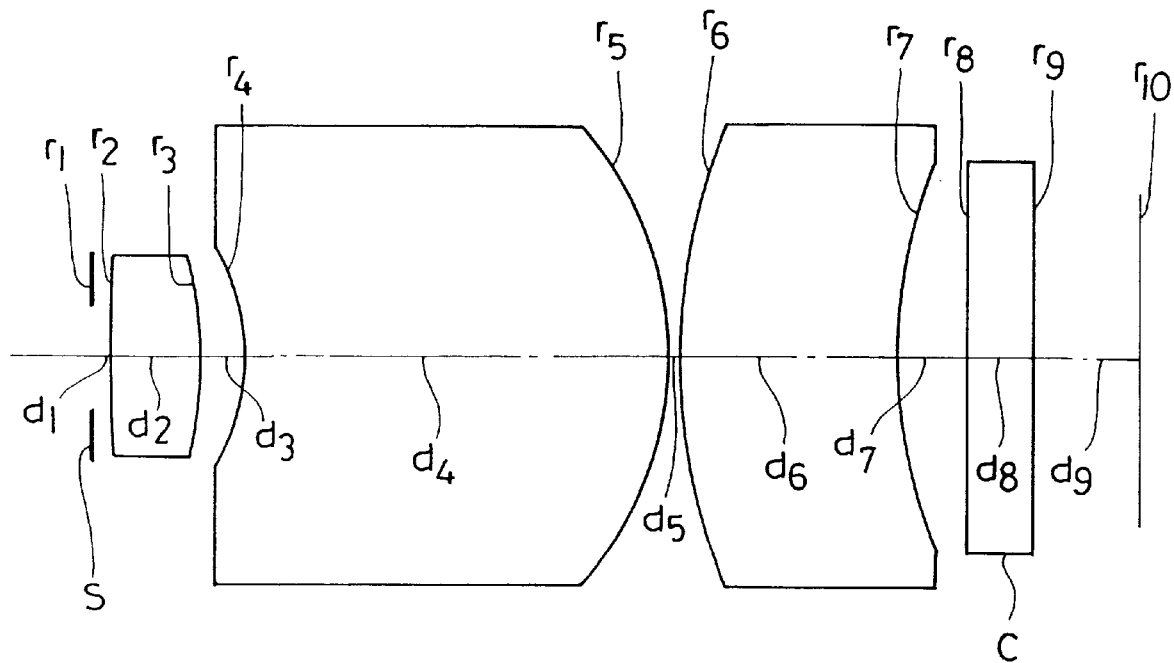

The twenty-first embodiment is composed, in order from the object side, of a positive lens component, a positive lens component and a positive lens component as shown in FIG. 21. Speaking more concretely, the twenty-first embodiment is composed, in order from the object side, of an aperture stop, a positive biconvex lens component, a positive meniscus lens component having a concave surface on the object side and a positive meniscus lens component having a concave surface on the image side: the positive lens component disposed on the image side being a radial type gradient index lens component.

Figure 22:
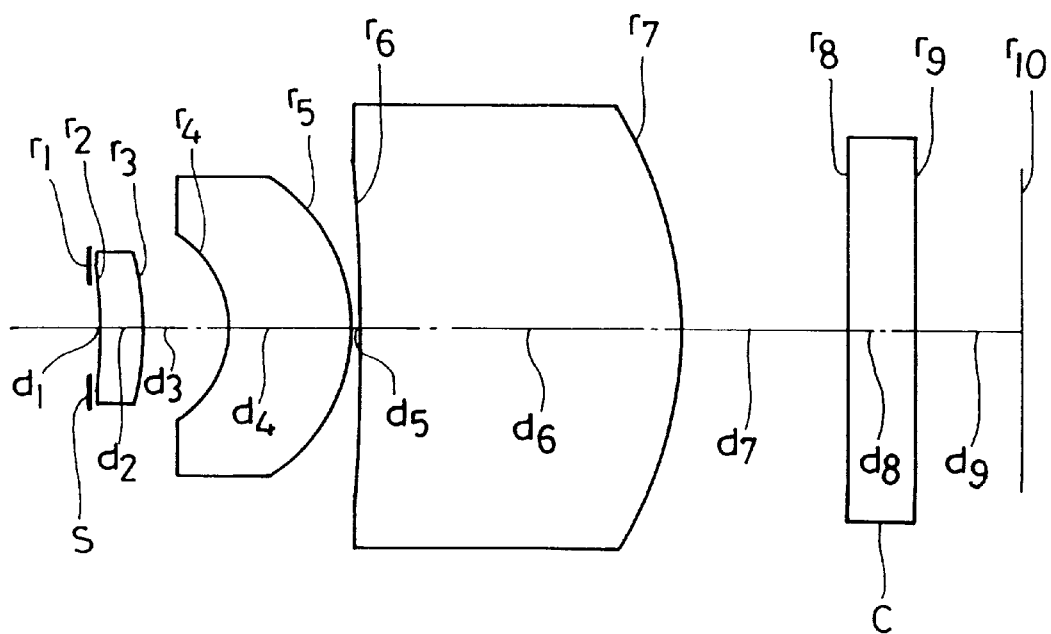

The twenty-second embodiment has a composition illustrated in FIG. 22, or is composed of a positive lens component, a negative lens component and a positive lens component. Speaking more detailedly, the twenty-second embodiment is composed, in order from the object side, of an aperture stop, a positive meniscus lens component having a concave surface on the object side, a negative meniscus lens component having a concave surface on the object side and a positive meniscus lens component having a concave surface on the object side: the lens component disposed on the image side being a radial type gradient index lens component.

Figure 23:
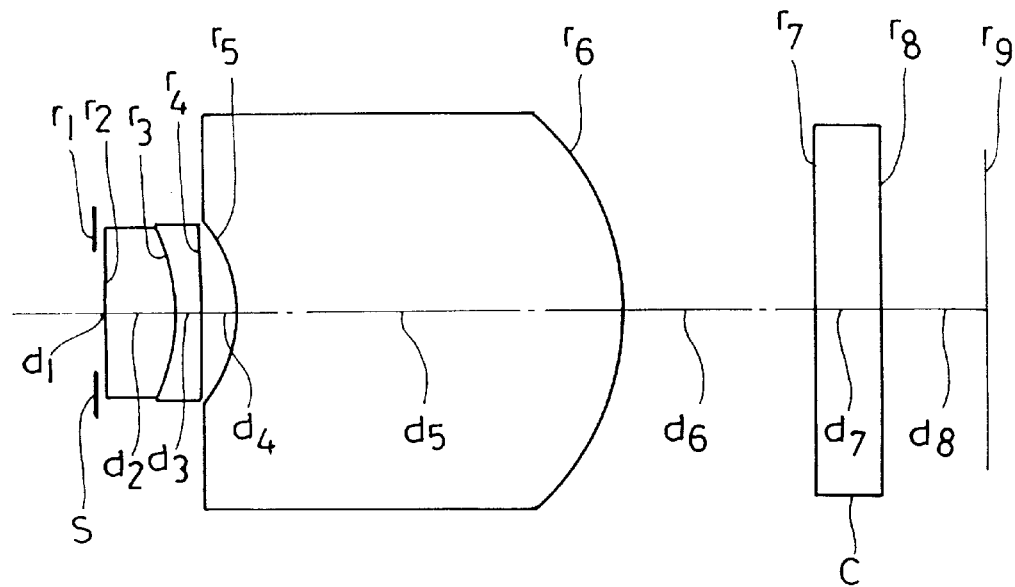

The twenty-third embodiment is composed, in order from the object side, of a positive lens element, a negative lens element and a positive lens element as shown in FIG. 23. In detail, the twenty-third embodiment is composed, in order from the object side, of an aperture stop, a cemented lens component which consists of a positive biconvex lens element and a negative meniscus lens element having a concave surface on the object side, and positive meniscus lens component having a concave surface on the object side: the lens component disposed on the image side being a radial type gradient index lens component. The cemented lens component serves for correcting mainly a Petzval's sum.

Figure 24:
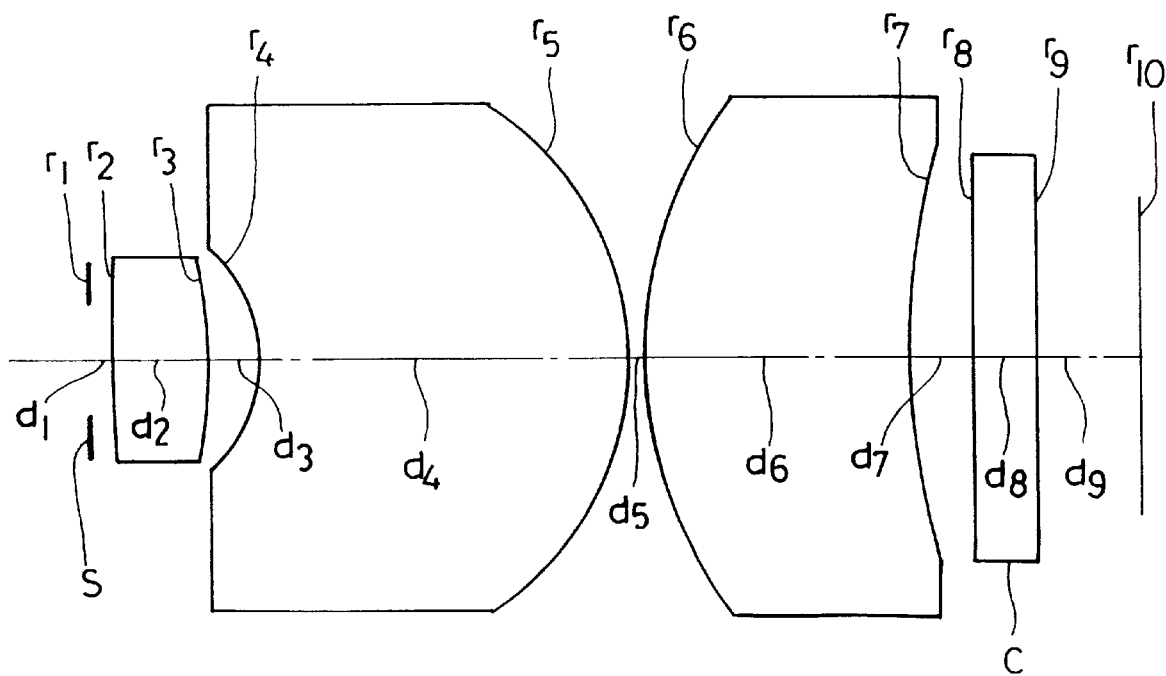

The twenty-fourth embodiment is composed, in order from the object side, of a positive lens component, a positive lens component and a positive lens component as shown in FIG. 24. Speaking more concretely, the twenty-fourth embodiment is composed in order from the object side, of an aperture stop, a positive biconvex lens component, a positive meniscus lens component having a concave surface on the object side and a positive meniscus lens component having a concave surface on the image side: the second lens component being a radial type gradient index lens component.

Figure 25:
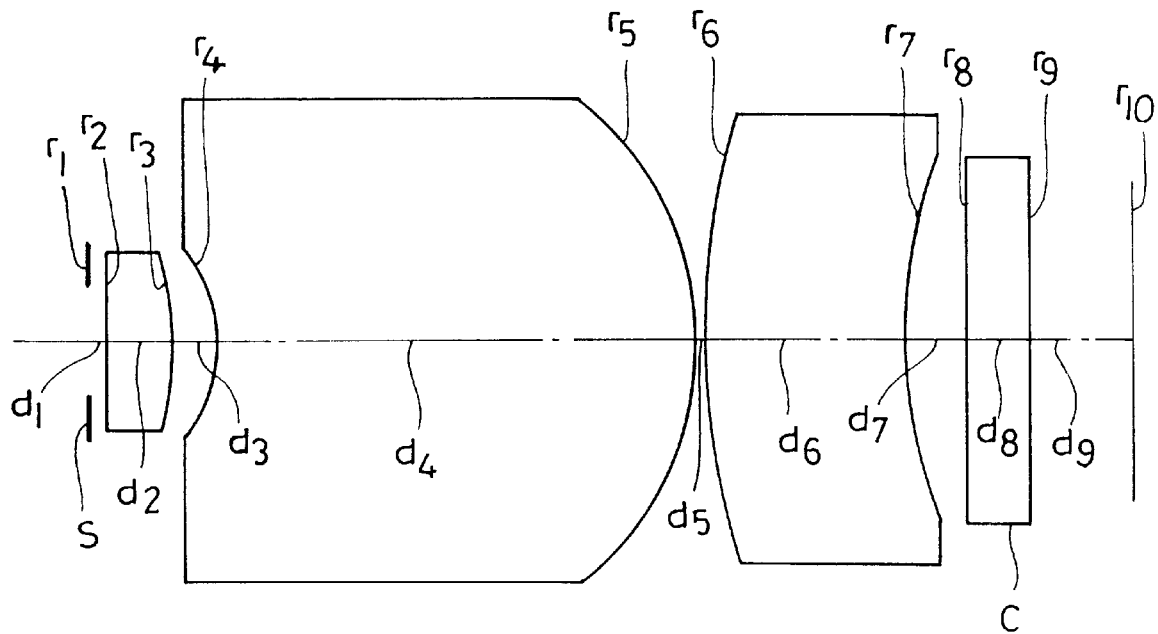

The twenty-fifth embodiment is composed, in order from the object side, of a positive lens component, a positive lens component and a negative lens component as shown in FIG. 25. Speaking more detailedly, the twenty-fifth embodiment is composed, in order from the object side, of an aperture stop, a positive plano-convex lens component, a positive meniscus lens component having a concave surface on the object side and a negative meniscus lens component having a concave surface on the image side: the second lens component being a radial type gradient index lens component.

Figure 26:
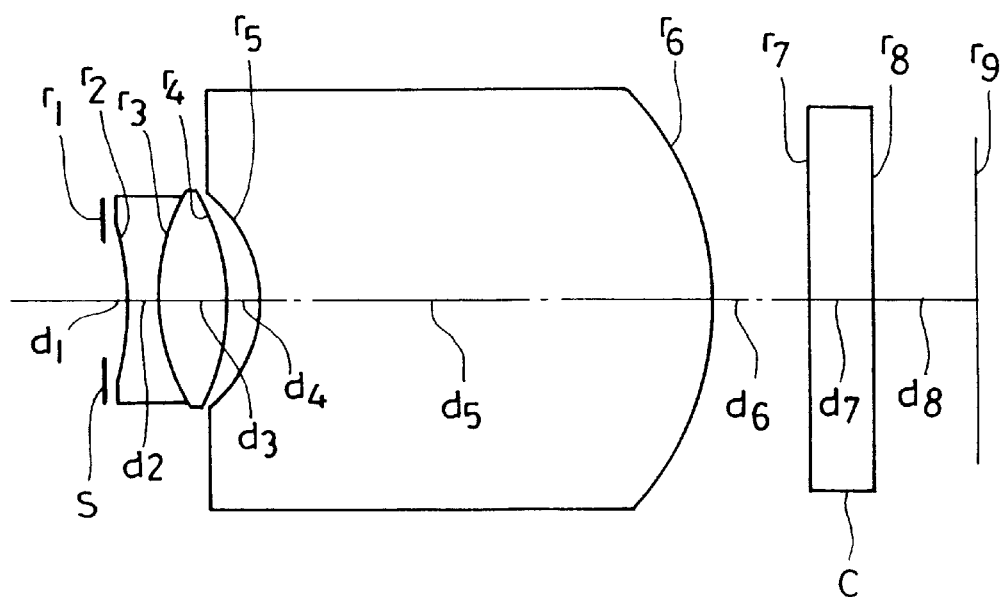

The twenty-sixth embodiment is composed, in order from the object side, of a negative lens element, a positive lens element and a positive lens component as shown in FIG. 26. In detail, the twenty-sixth embodiment is composed, in order from the object side, of an aperture stop, a cemented lens component which consists of a negative biconcave lens element and a positive biconvex lens element, and a positive meniscus lens component having a concave surface on the object side: the lens component disposed on the image side being a radial type gradient index lens component. Though the twenty-sixth embodiment is composed only of the three lens elements, it is an example wherein aberrations are corrected favorably by configuring the lens system so as to satisfy the conditions (1) and (2). Further, a Petzval's sum is favorably corrected mainly by the cemented lens component.

Figure 27:
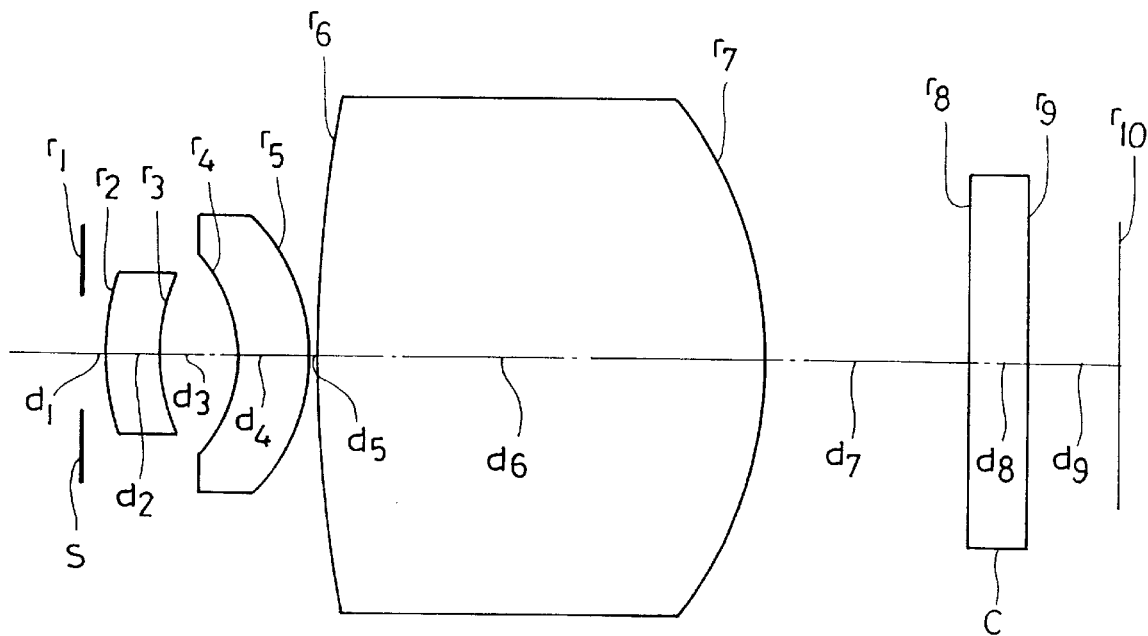

The twenty-seventh embodiment is composed, in order from the object side, of a negative lens component, a negative lens component and a positive lens component as illustrated in FIG. 27. Speaking more concretely, the twenty-seventh embodiment is composed, in order from the object side, of an aperture stop, a negative meniscus lens component having a concave surface on the image side, a negative meniscus lens component having a concave surface on the object side and a positive biconvex lens component: the lens component disposed on the image side being a radial type gradient index lens component.

Figure 28:
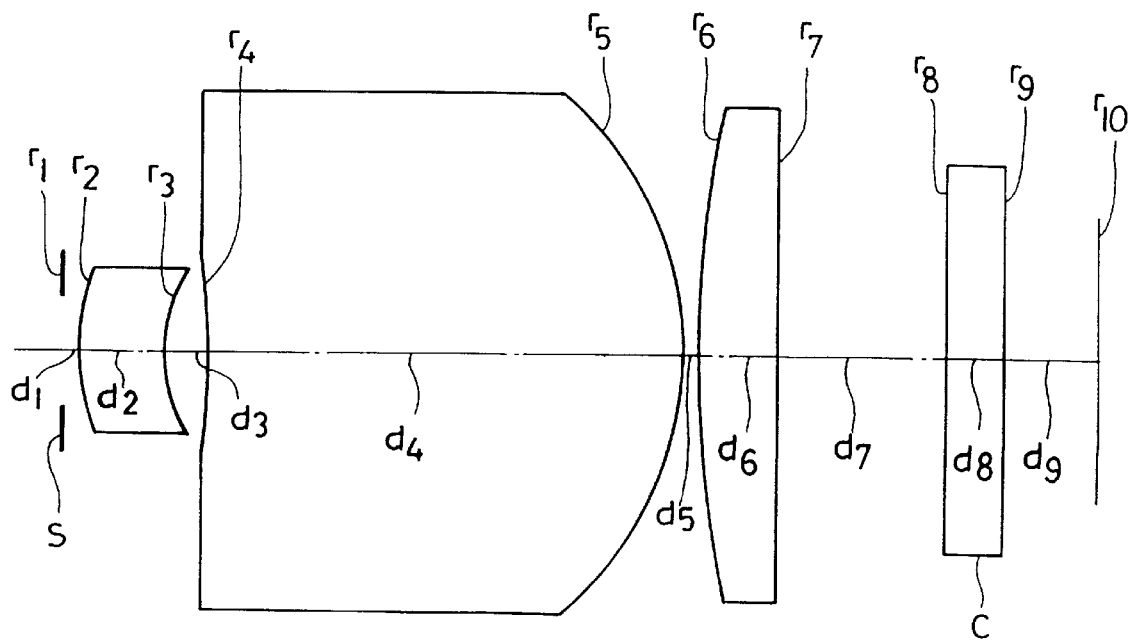

The twenty-eighth embodiment is composed, in order from the object side, of a negative lens component, a positive lens component and a positive lens component as illustrated in FIG. 28. In detail, the twenty-eighth embodiment is composed, in order from the object side, of an aperture stop, a negative meniscus lens component having a concave surface on the image side, a positive lens component having a concave surface on the object side and a positive convexo-planar lens component: the second lens component being a radial type gradient index lens component.

Figure 29:
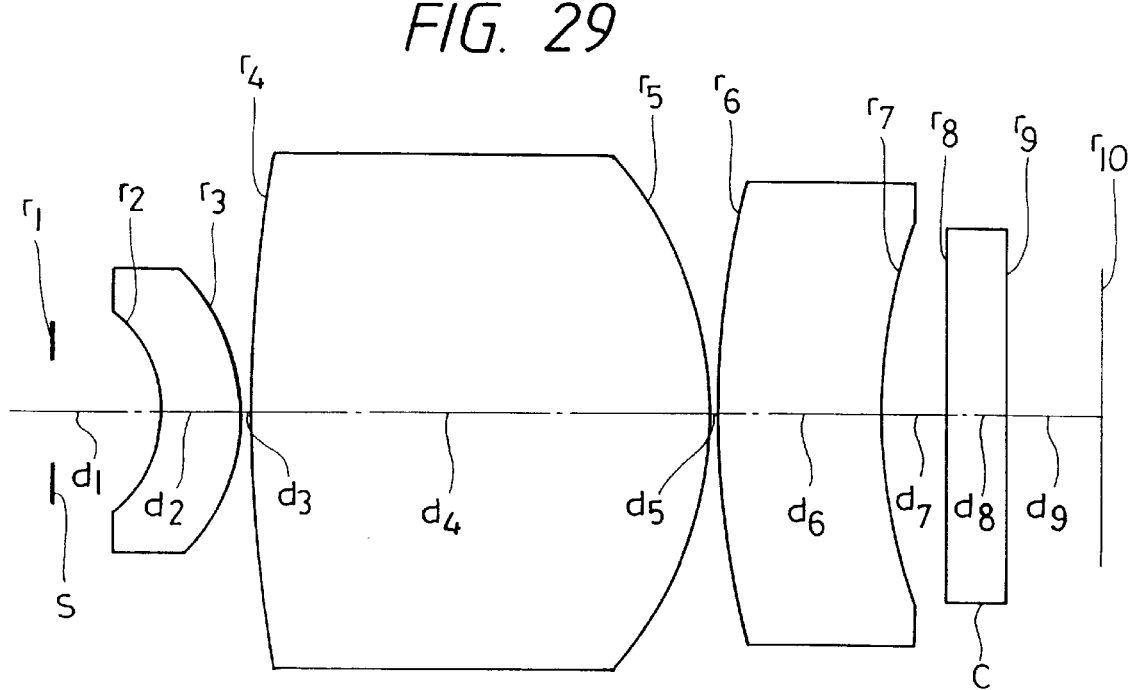

The twenty-ninth embodiment is composed, in order from the object side, of a negative lens component, a positive lens component, and a negative lens component as shown in FIG. 29. Speaking more detailedly, the twenty-ninth t is composed, in order from the object side, of an aperture stop, a negative meniscus lens component having a concave surface on the object side, a positive biconvex lens component and a negative meniscus lens component having a concave surface on the image side: the second lens component being a radial type gradient index lens component.

Figure 30:
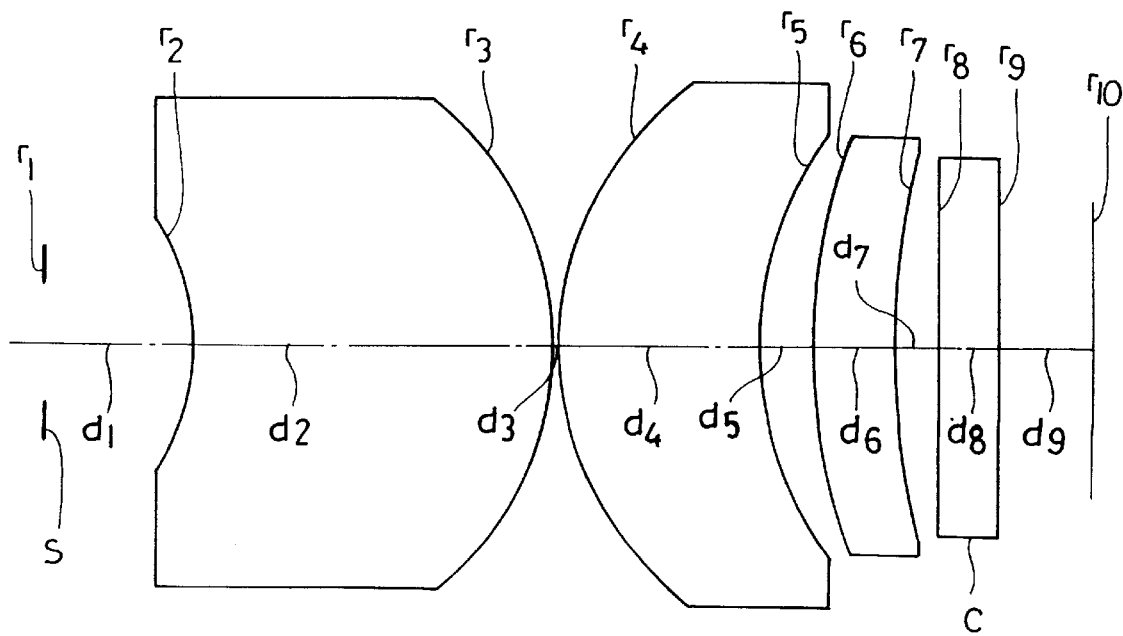

The thirtieth embodiment is composed, in order from the object side, of a positive lens component, a positive lens component, and a positive lens component as shown in FIG. 30. Speaking more concretely, the thirtieth embodiment is composed, in order from the object side, of an aperture stop, a positive meniscus lens component having a concave surface on the object side, a positive meniscus lens component having a concave surface on the image side and a positive meniscus lens component having a concave surface on the image side: the lens component disposed on the object side being a radial type gradient index lens component.

Figure 31:
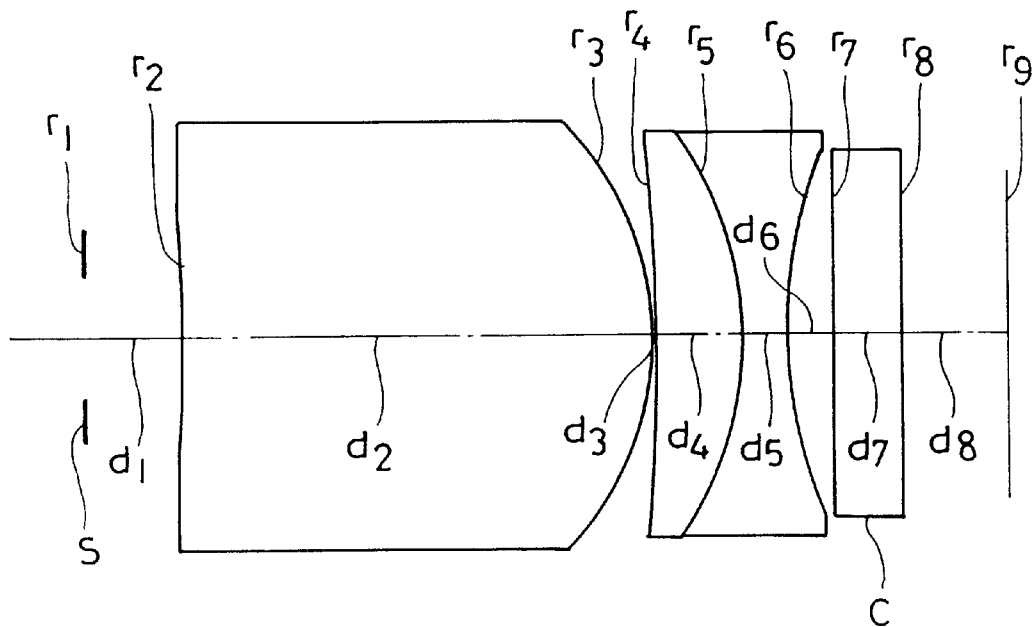

The thirty-first embodiment has a composition shown in FIG. 31, or is composed of a positive lens component, a positive lens element and a negative lens element in order from the object side. Speaking more detailedly, the thirty-first t is composed, in order from the object side, of an aperture stop, a positive meniscus lens component having a concave surface on the object side, and a cemented lens component which consists of a positive meniscus lens element having a concave surface on the object side and a negative biconcave lens element: the lens component disposed on the object side being a radial gradient index lens component. The cemented lens component serves mainly for correcting Petzval's sum favorably.

Figure 32:
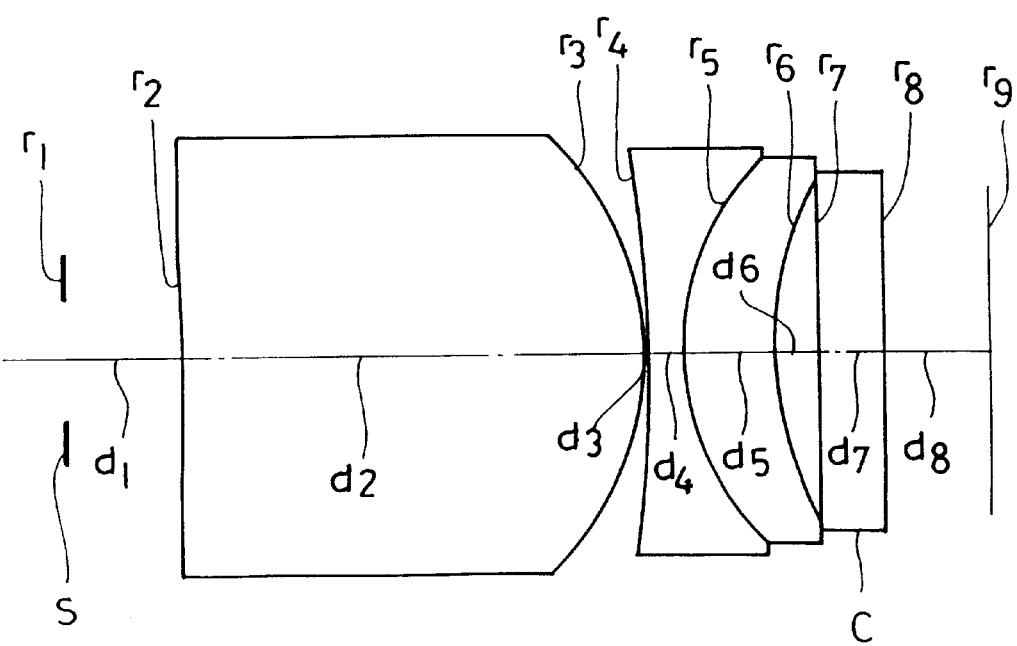

The thirty-second embodiment has a composition illustrated in FIG. 32, or is composed of a positive lens component, a negative lens element and a positive lens element in order from the object side. In detail, the thirty-second t is composed, in order from the object side, of an aperture stop, a positive meniscus lens component having a concave surface on the object side, and a cemented lens component which consists of a negative biconcave lens element and a positive meniscus lens element having a concave face on the image side: the lens component disposed on the object side being a radial type gradient index lens component. The image side surface of the lens element disposed on the image side is configured as an aspherical surface. The cemented lens component serves mainly for favorably correcting a Petzval's sum.

Figure 33:
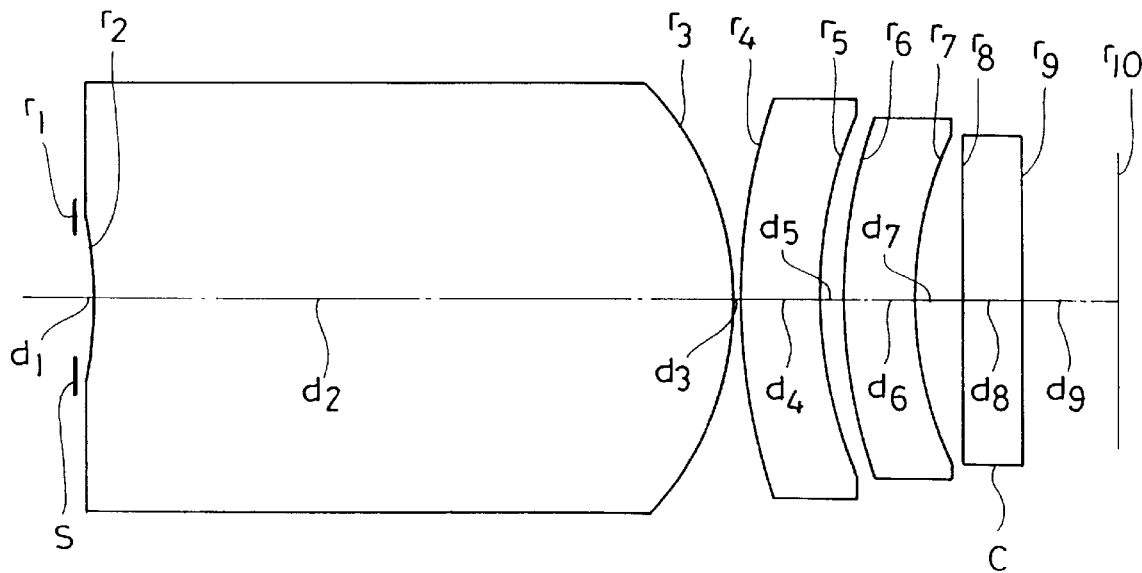

The thirty-third embodiment has a composition shown in FIG. 33, or is composed of a positive lens component, a negative lens element and a negative lens element in order from the object side. Speaking more concretely, the thirty-third embodiment is composed, in order from the object side, of an aperture stop, a positive meniscus lens component having a concave surface on the object side, a negative meniscus lens component having a concave surface on the image side, and a cemented lens component which consists of a negative meniscus lens element having a concave surface on the image side and a negative meniscus lens element having a concave surface on the image side: the lens component disposed on the object side being a radial type gradient index lens component.

Figure 34:
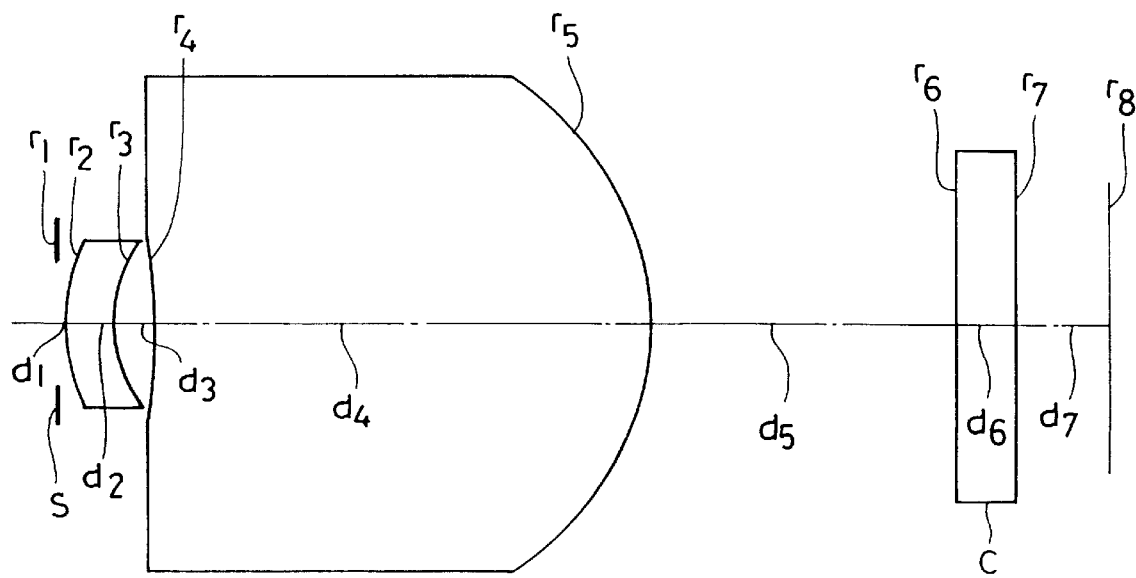

The thirty-fourth embodiment has a composition illustrated in FIG. 34, or is composed of a negative lens component and a positive lens component in that order from the object side. Speaking more detailedly, the thirty-fourth embodiment is composed, in order from the object side, of an aperture stop, a negative meniscus lens component having concave surface on the image side and a positive meniscus lens component having a concave surface on the object side: the lens component disposed on the image side being a radial type gradient index lens component. Though the thirty-fourth embodiment is composed only of the two lens components, it favorably corrects aberrations by using the radial type gradient index lens component which satisfies the conditions (1) and (2).

Figure 35:
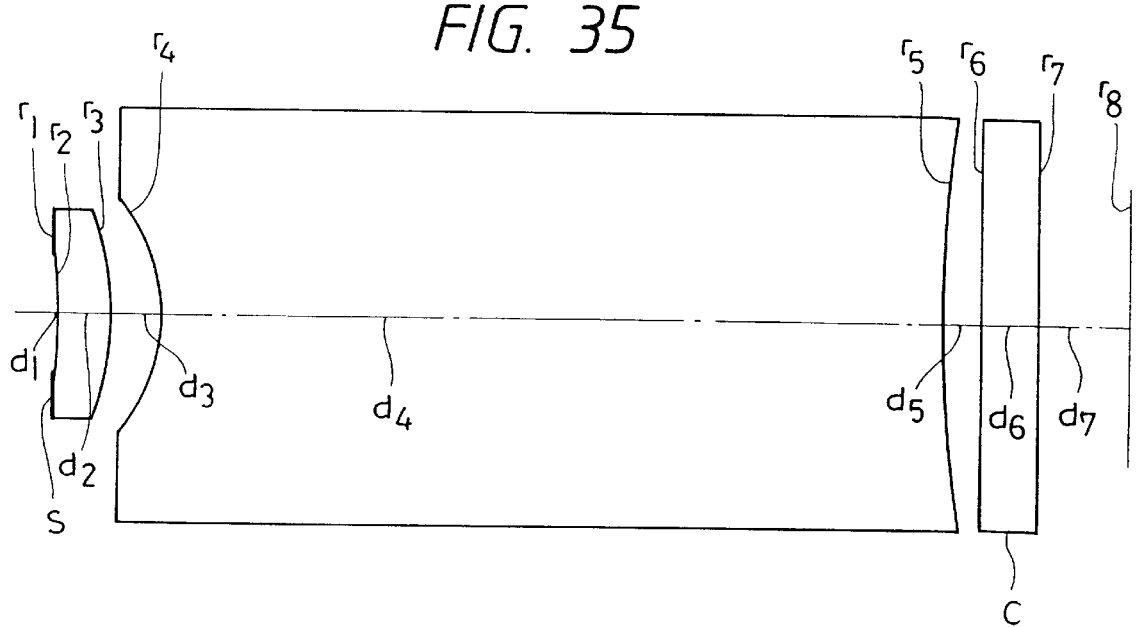

The thirty-fifth embodiment has a composition illustrated in FIG. 35, or is composed of a positive lens component and a positive lens component in order from the object side. In more detail, the thirty-fifth embodiment is composed, in order from the object side, of an aperture stop, a positive meniscus lens component having a concave surface on the object side and a positive biconcave lens component: the lens component disposed on the image side being a radial type gradient index lens component. In the thirty-fifth embodiment, a Petzval's sum is favorably corrected mainly by the radial type gradient index lens component which has a shape of a negative lens component.

Figure 36:
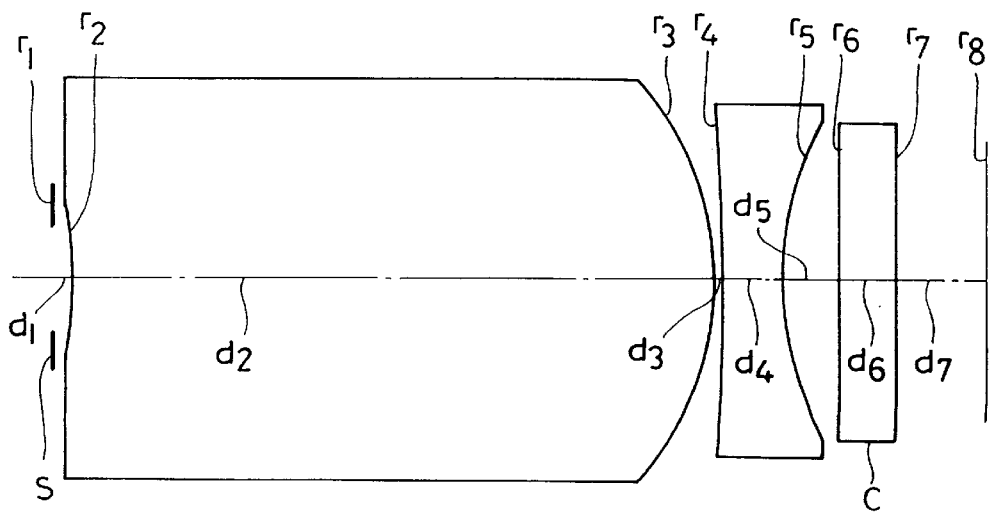

The thirty-sixth embodiment has a composition shown in FIG. 36, or is composed of a positive lens component and a negative lens component in that order from the object side. Speaking more concretely, the thirty-sixth embodiment is composed, in order from the object side, of an aperture stop, a positive meniscus lens component having a concave surface on the object side and a negative biconcave lens component: the lens component disposed on the object side being a radial type gradient index lens component.

Figure 37:
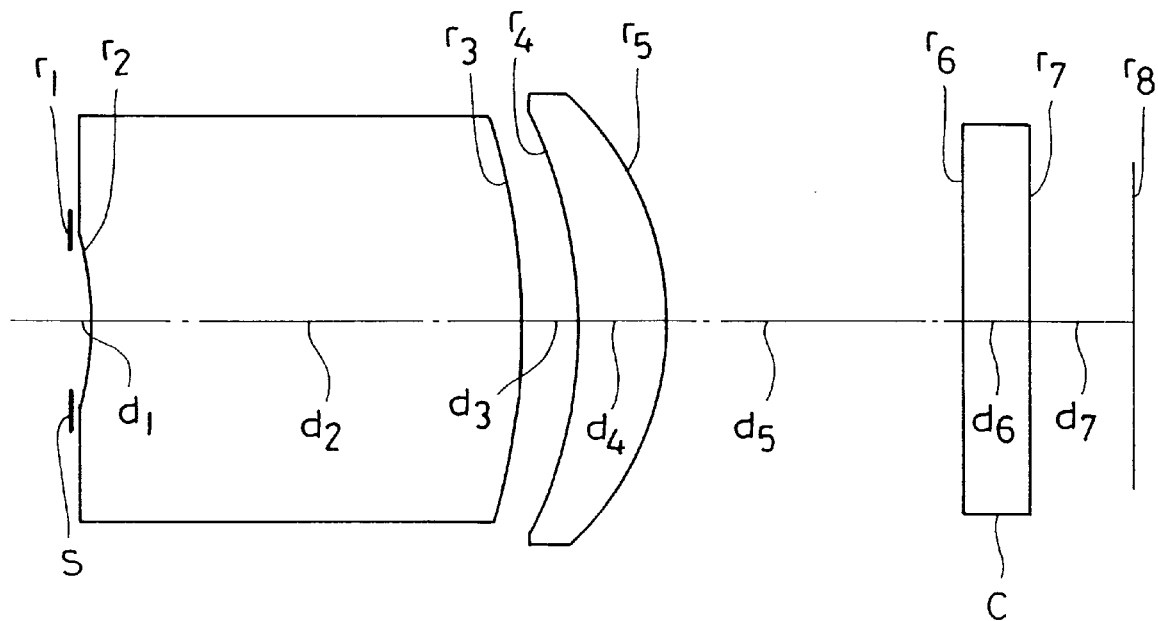

The thirty-seventh embodiment has a composition shown in FIG. 37, or is composed of a positive lens component and a positive lens component in order from the object side. Speaking more detailedly, the thirty-seventh embodiment is composed, in order from the object side, of an aperture stop, a positive meniscus lens component having a concave surface on the object side and a positive meniscus lens component having a concave surface on the object side: the lens component disposed on the object side being a radial type gradient index lens component.

Figure 38:
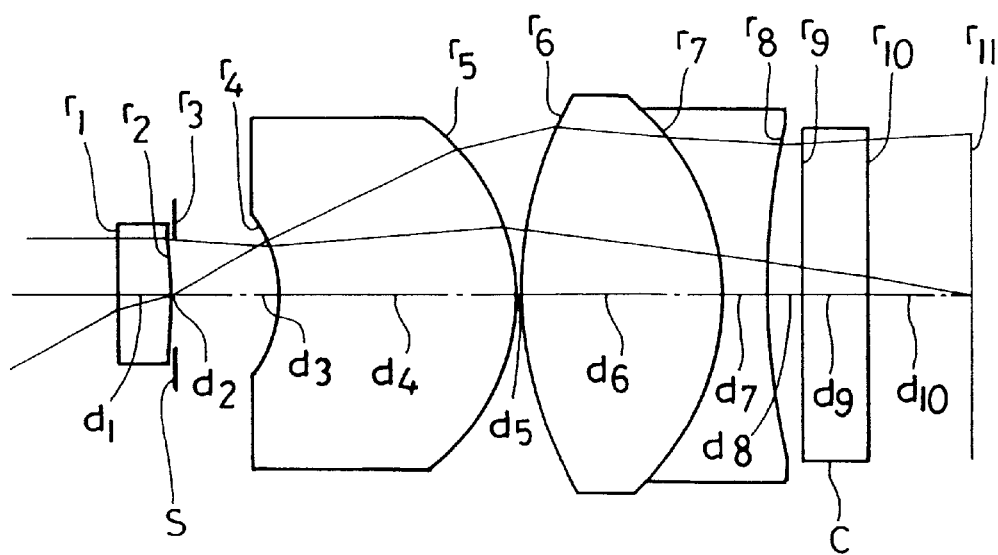

Each of the thirty-eighth through forty-fourth embodiments has the third composition according to the present invention and is configured as described below:

The thirty-eighth t has a composition illustrated in FIG. 38, or is composed of a positive lens component, a positive lens component, a positive lens element and a negative lens element in order from the object side. Speaking more concretely, the thirty-eighth embodiment is composed, in order from the object side, of a first lens unit which consists of a positive plano-convex lens component, an aperture stop, and a second lens unit which consists of a positive meniscus lens component having a concave surface on the object side, and a cemented lens component consisting of a positive biconvex lens element and a negative biconcave lens element: the second lens component being a radial type gradient index lens component. The thirty-eighth embodiment favorably corrects lateral chromatic aberration and distortion in particular owing to the fact that the first lens unit is composed of the single lens component. Lateral chromatic aberration is favorably corrected by configuring the positive lens component disposed in the first lens unit so as to satisfy the condition (16). The cemented lens component serves mainly for correcting lateral chromatic aberration favorably in the lens system as a whole.

The thirty-eighth embodiment is focused on an object located at an extremely short distance by moving the first lens component toward the object side.

Figure 39:
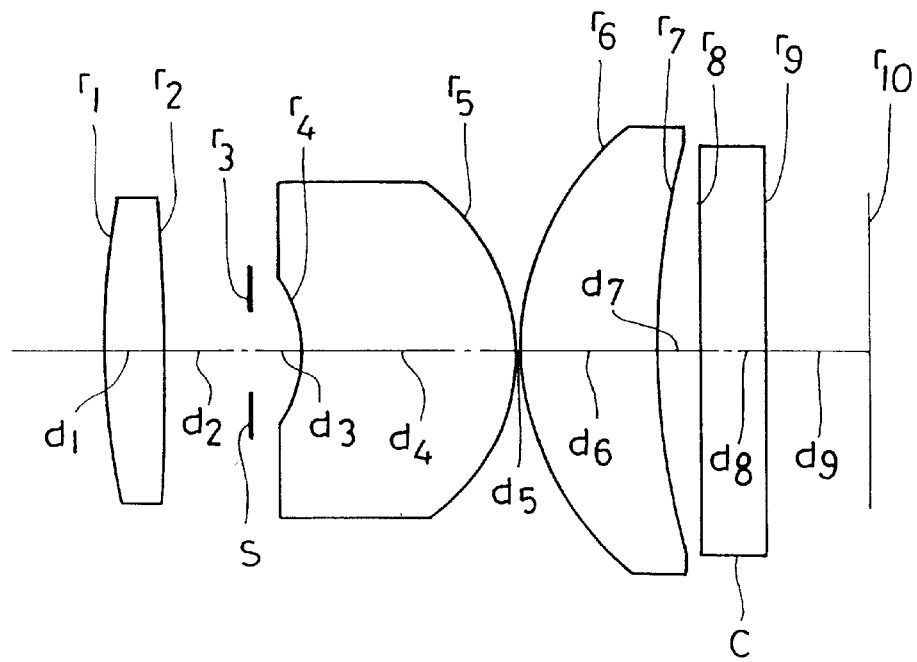

The thirty-ninth embodiment has a composition shown in FIG. 39, or is composed of a positive lens component, a positive lens component and a positive lens component. In more detail, the thirty-ninth embodiment is composed, in order from the object side, of a first lens unit which consists of a positive biconvex lens component, an aperture stop, and a second lens unit which consists of a positive meniscus lens component having a concave surface on the object side and a positive lens component having a concave surface on the image side: the second lens component being a radial type gradient index lens component. An aspherical surface is used as an object side surface of the third lens component.

When the first lens unit of the lens system according to the present invention is to be composed of a single positive lens component as in the thirty-ninth embodiment or when an aperture stop is to be disposed on the object side, it is desirable for configuring the lens system to be more compact that a radial type gradient index lens component satisfies the following condition (19):

$$0.5 < t_G/f < 4 \qquad (19)$$

If the lower limit of 0.5 of the condition (19) is not satisfied, the radial type gradient index lens component will have a weak refractive power of medium, thereby undesirably undercorrecting lateral chromatic aberration. If the upper limit of 4 of the condition (19) is exceeded, the radial type gradient index lens component will be thick, thereby undesirably increasing the total length of the lens system.

Figure 40:
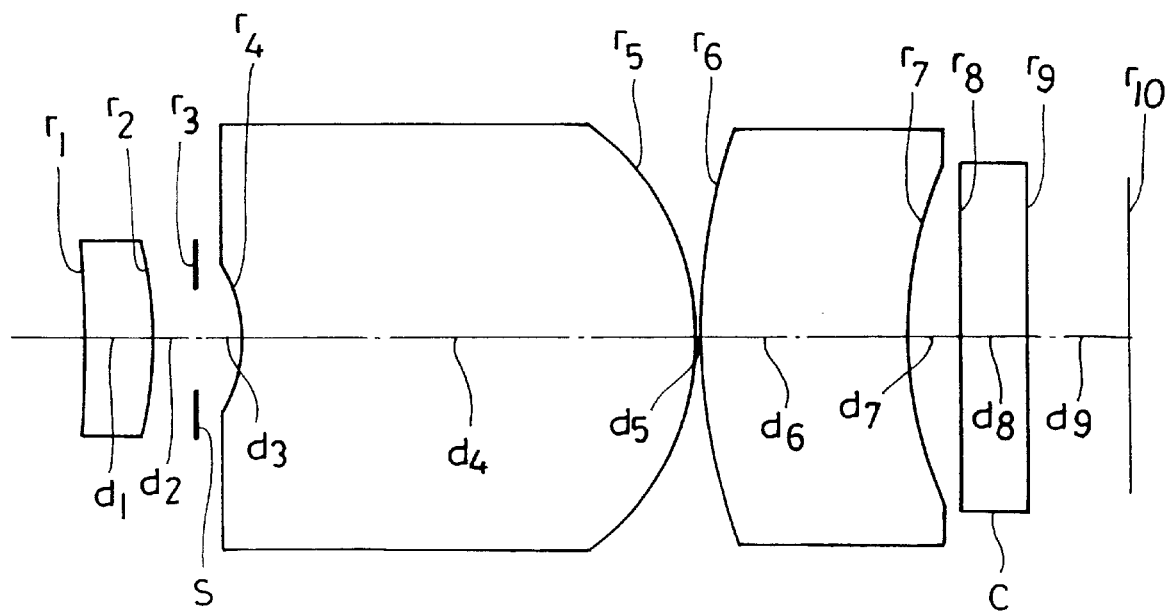

The fortieth embodiment has a composition illustrated in FIG. 40, or is composed of a positive lens component, a positive lens component and a negative lens component in that order from the object side. Speaking more detailedly, the fortieth embodiment is composed, in order from the object side, of a first lens unit which consists of a positive meniscus lens component having a concave surface on the object side, an aperture stop, and a second lens unit which consists of a positive meniscus lens component having a concave surface on the object side and a negative meniscus lens component having a concave surface on the image side: the second lens component being a radial type gradient index lens component.

Figure 41:
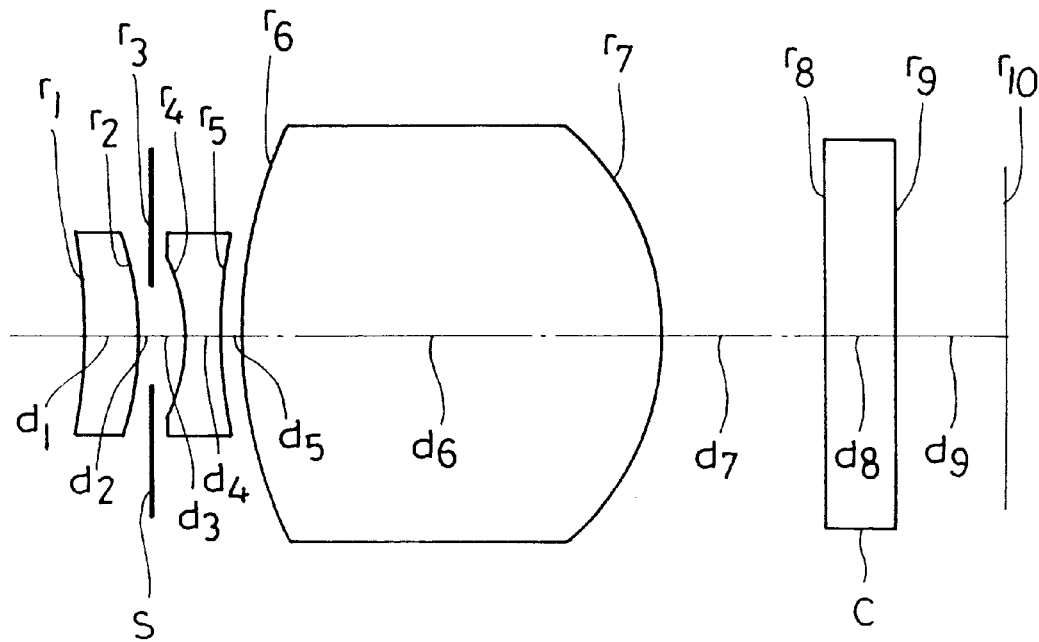

The forty-first embodiment has a composition shown in FIG. 41, or is composed of a positive lens component, a negative lens component and a positive lens component in that order from the object side. Speaking more concretely, the forty-first embodiment is composed, in order from the object side, of a first lens unit which consists of a positive meniscus lens component having a concave surface on the object side, an aperture stop, and a second lens unit which consists of a negative biconcave lens component and a positive biconvex lens component: the lens component disposed on the image side being a radial type gradient index lens component.

The forth-first embodiment is an example wherein a radial type gradient index lens component has a biconvex shape so as to reduce a difference in refractive index between an optical axis and a margin, thereby facilitating manufacturing of a material for the radial type gradient index lens component.

Figure 42:
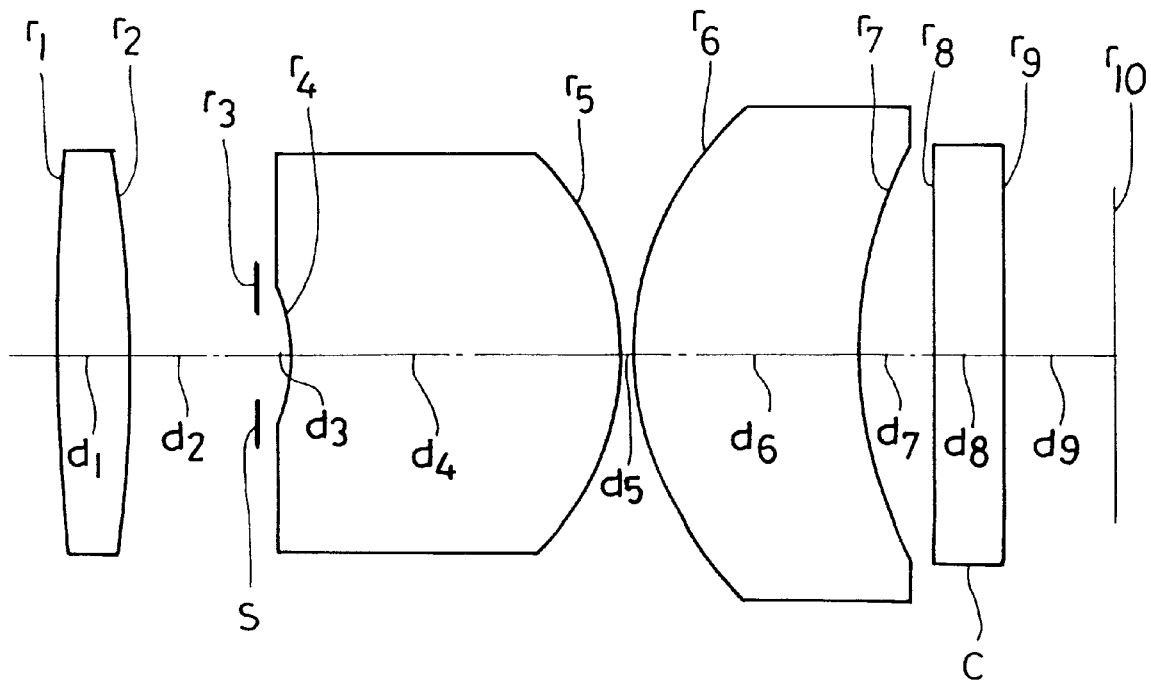

The forty-second embodiment has a composition illustrated in FIG. 42, or is composed of a positive lens component, a positive lens component and a positive lens component, in that order from the object side. In more detail, the forty-second embodiment is composed, in order from the object side, of a first lens unit which consists of a positive biconvex lens component, an aperture stop S, and a second lens unit which consists of a positive meniscus lens component having a concave surface on the object side and a positive lens component having a concave surface on the image side: the lens component disposed on the image side being a radial type gradient index lens component.

Figure 43:
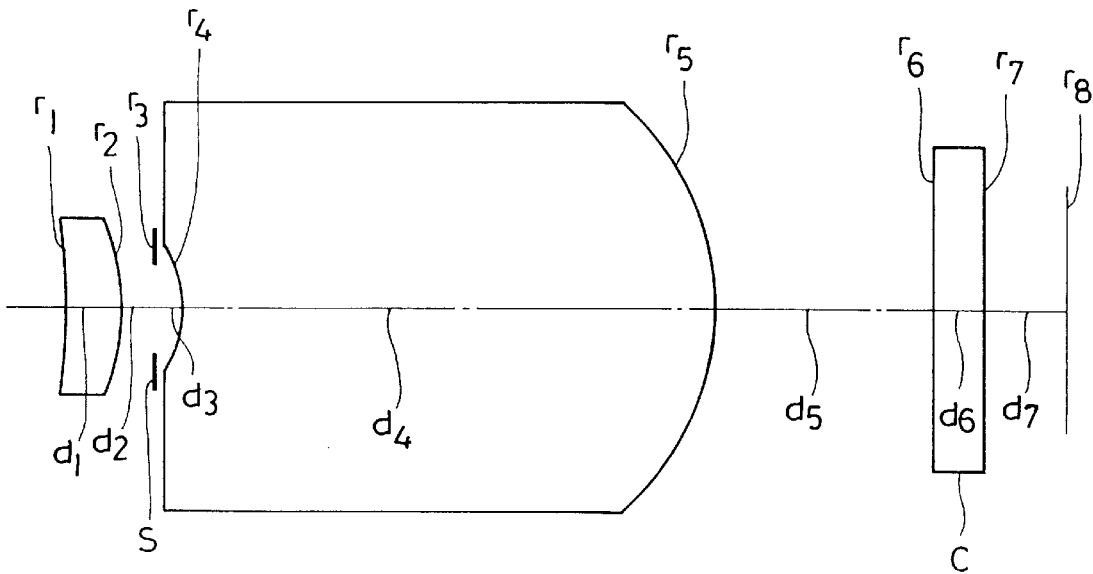

The forty-third embodiment has a composition shown in FIG. 43, or is composed of a positive lens component and a positive lens component in order from the object side. Speaking more detailedly, the forty-third embodiment is composed, in order from the object side, of a first lens unit which consists of a positive meniscus lens component having a concave surface on the object side, an aperture stop S and a second lens unit which consists of a positive meniscus lens component having a concave surface on the object side: the lens component disposed on the image side being a radial type gradient index lens component. Though the forty-third embodiment is composed only of the two lens components, it corrects aberrations favorably by using a radial type gradient index lens component which satisfies the conditions (1) and (2).

Figure 44:
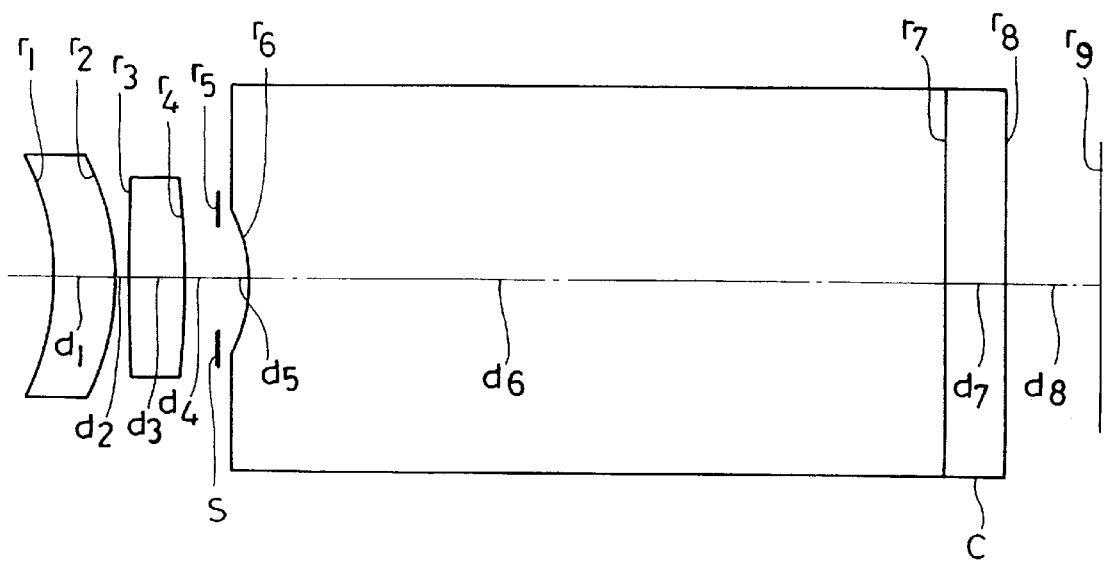

The forty-fourth embodiment has a composition illustrated in FIG. 44, or is composed of a positive lens component, a positive lens component and a positive lens component in that order from the object side. Speaking more concretely, the forty-fourth embodiment is composed, in order from the object side, of a first lens unit which consists of a positive meniscus lens component having a concave surface on the object side and a positive biconvex lens component, an aperture stop and a second lens unit which consists of a positive concavo-planar lens component: the lens component disposed on the image side being a radial type gradient index lens component.

The forty-fourth embodiment is an example where a first lens unit is composed of two lens components for sharing a refractive power between the two lens components, in contrast to the first lens unit used in the forty-third embodiment, thereby correcting aberrations more favorably in the lens system as a whole.

Figure 45:
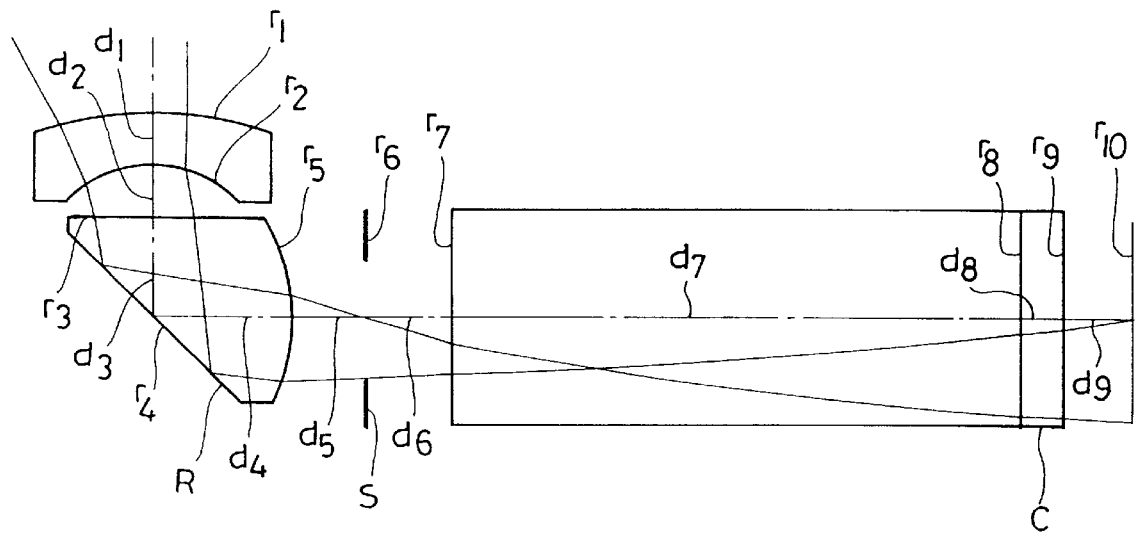

Each of the forty-fifth through forty-ninth embodiments uses a reflecting surface in a lens system and has the fourth composition according to the present invention as described below:

The forty-fifth embodiment has a composition illustrated in FIG. 45, or is composed of a negative lens component, a positive lens component and a positive lens component, in that order from the object side. Speaking more concretely, the forty-fifth embodiment is composed, in order from the object side, of a first lens unit which consists of a negative lens element having a concave surface on the image side and a positive lens component having a reflecting surface, an aperture stop S, and a second lens unit consisting of a radial type gradient index lens component which has two planar surfaces (the lens component having both planar surfaces $r_2$ and $r_8$, which are shown in FIG. 45) and a positive refractive power.

The forty-fifth embodiment is an example of a thin lens system which is thinned in the x direction, as shown in FIG. 51D by using a reflecting surface R.

Asymmetry of a lens system as a whole is moderated by using a reflecting surface since the lens system has more or less latitude in a total length thereof. For favorably correcting lateral chromatic aberration when at least one reflecting surface is to be used, it is desirable to configure a radial type gradient index lens component so as to satisfy the following condition (20):

$$-0.02 < 1/V_1 < 0.01 \quad (20)$$

If the upper limit of 0.01 of the condition (20) is exceeded, lateral chromatic aberration will be undercorrected. If the lower limit of −0.02 of the conditon (20) is not satisfied, in contrast, lateral chromatic aberration will undesirably be overcorrected.

For favorably correcting lateral chromatic aberration and a Petzval's sum when at least one reflecting surface is to be used, it is desirable to configure a radial type gradient index lens component so as to satisfy the following condition (21):

$$-0.3 < N_1 \times f^2 < -0.03 \quad (21)$$

If the upper limit of −0.03 of the condition (21) is exceeded, lateral chromatic aberration and a Petzval's sum will undesirably be undercorrected. If the lower limit of −0.3 of the condition (21) is not satisfied, in contrast, a Petzval's sum will undesirably be overcorrected.

Further, the forty-fifth embodiment allows its optical performance to be influenced little due to eccentricity and features high workability since the radial type gradient index lens component has two planar surfaces. The forty-fifth embodiment can be focused onto an object located at an extremely short distance by moving the first lens component toward the object side along an optical axis. The radial type gradient index lens component can be cemented to a protective glass plate C for an image pickup device. Furthermore, it is possible to omit the protective glass plate C by using the radial type gradient index lens component as a protective glass plate.

A transparent member which has a function of a reflecting surface and a function of a lens can be manufactured by using a transparent material such as a plastic material, a glass material, a crystal or a liquid. Though an image formed by using a reflecting surface is inverted as compared with an image formed without using a reflecting surface, the inverted image can be electrically corrected. An inverted image electrically recorded in a memory can be corrected by electrically reading it out from an opposite side.

Figure 46:
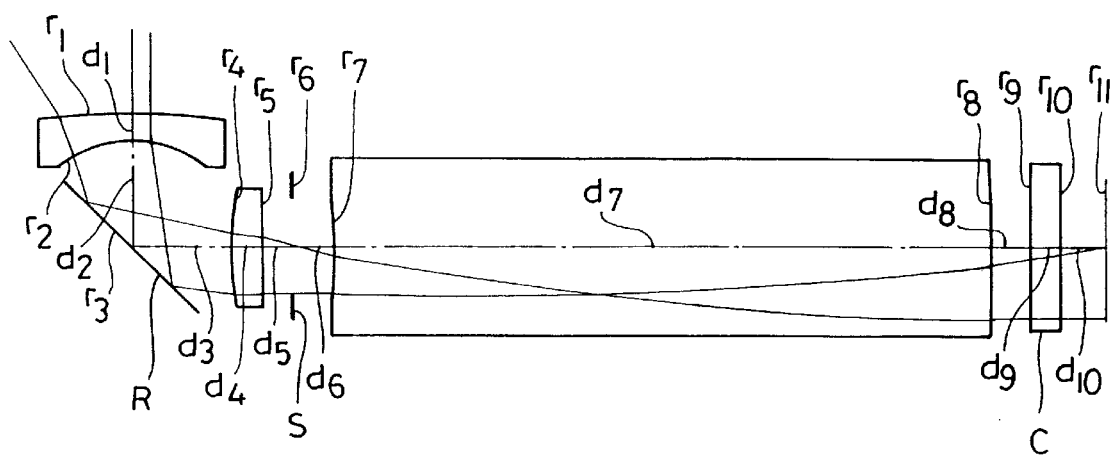

The forty-sixth embodiment has a composition shown in FIG. 46, or is composed of a negative lens component, a positive lens component and a positive lens component in that order from the object side. Speaking more concretely, the forty- sixth embodiment is composed, in order from the object side, of a first lens unit which consists of a negative lens component, a reflecting surface and a positive biconvex lens component, an aperture stop, and a second lens unit which consists of a positive meniscus lens component having a concave surface on the object side: the lens component disposed on the image side being a radial type gradient index lens component. Distortion, in particular, is corrected favorably by configuring the image side surface of the first lens component as an aspherical surface.

The forty-sixth embodiment is an example of a lens system which is thinned as shown in FIGS. 51A, 51B, 51C and 51D by using a reflecting surface.

For obtaining favorable imaging performance when at least one reflecting surface is to be used, it is desirable to configure a radial type gradient index lens component so as to satisfy the following condition (22):

$$2 < t_G/f < 7 \quad (22)$$

When the condition (22) is satisfied, it is possible to favorably correct lateral chromatic aberration without lowering transmittance in a radial type gradient index lens component or aggravating flare. If the lower limit of 2 of the condition (22) is not satisfied, lateral chromatic aberration will be undercorrected. If the upper limit of 7 of the condition (22) is exceeded, production of flare or lowering of transmittance will undesirably pose a problem.

Figure 47:
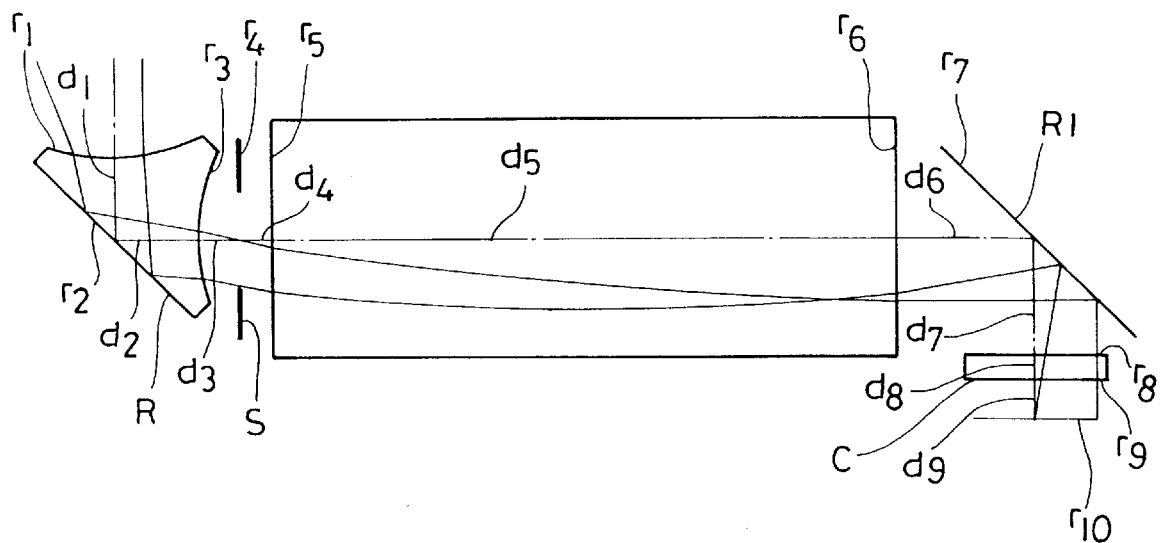

The forty-seventh embodiment has a composition shown in FIG. 47, or is composed of a negative lens component and a positive lens component, in that order from the object side. In more detail, the forty-seventh embodiment is composed, in order from the object side, of a first lens unit which consists of a negative biconcave lens component having a reflecting surface R, an aperture stop S, a second lens unit which consists of a radial type gradient index lens component having two planar surfaces and a reflecting surface $R_1$. The forty-seventh embodiment is an example wherein an image pickup surface is made to be parallel with an object surface by disposing the reflecting surface $R_1$ on the image side of the object side lens component.

When the lens system according to the present invention which comprises at least one reflecting surface is to be used in a system requiring higher imaging performance, it is desirable to configure a radial type gradient index lens component so as to satisfy the following condition (23):

$$-0.1 < N_2 \times f^4 < 0.1 \quad (23)$$

If the lower limit of −0.1 of the condition (23) is not satisfied, coma will undesirably be undercorrected. If the upper limit of 0.1 of the condition (23) is exceeded, in contrast, coma will undesirably be overcorrected.

Figure 48:
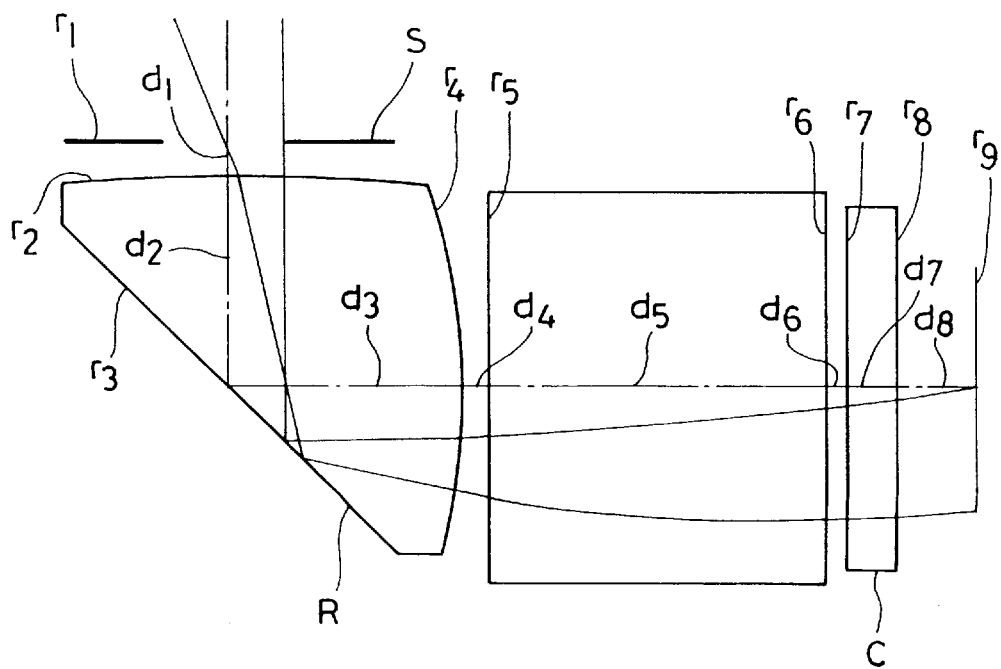

The forty-eighth embodiment has a composition illustrated in FIG. 48, or is composed of a positive lens component and a positive lens component. Speaking more detailedly, the forty-eighth embodiment is composed, in order from the object side, of an aperture stop S, a positive biconvex lens component having a reflecting surface R, and a radial type gradient index lens component having two planar surfaces. The forty-eighth embodiment in which the aperture stop is disposed on the object side of the reflecting surface facilitates the manufacture of a stop mechanism.

Figure 49:
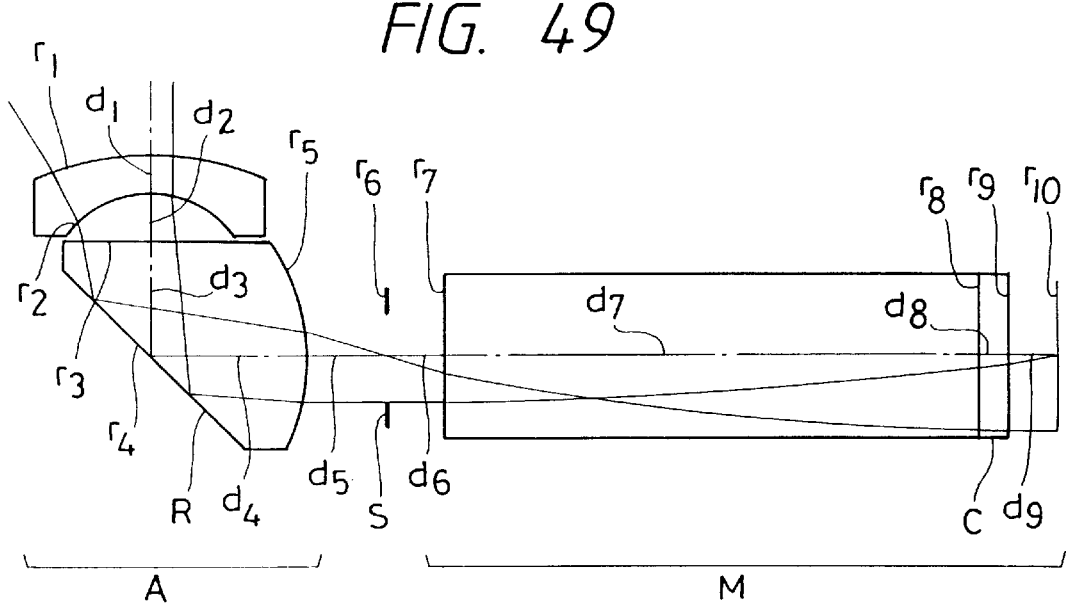

The forty-ninth embodiment has a composition shown in FIG. 49, or is composed of a negative lens component, a positive lens component and a positive lens component, in that order from the object side. Speaking more concretely, the forty-ninth embodiment is composed, in order from the object side, of a negative lens component having a concave surface on the image side, a positive lens component having a reflecting surface R, a stop S, and a radial type gradient index lens component having two planar surfaces and a positive refractive power. The forty-ninth embodiment is an example wherein distortion, in particular, is corrected favorably by configuring the image side surface of the first lens component as an aspherical surface.

Figure 50:
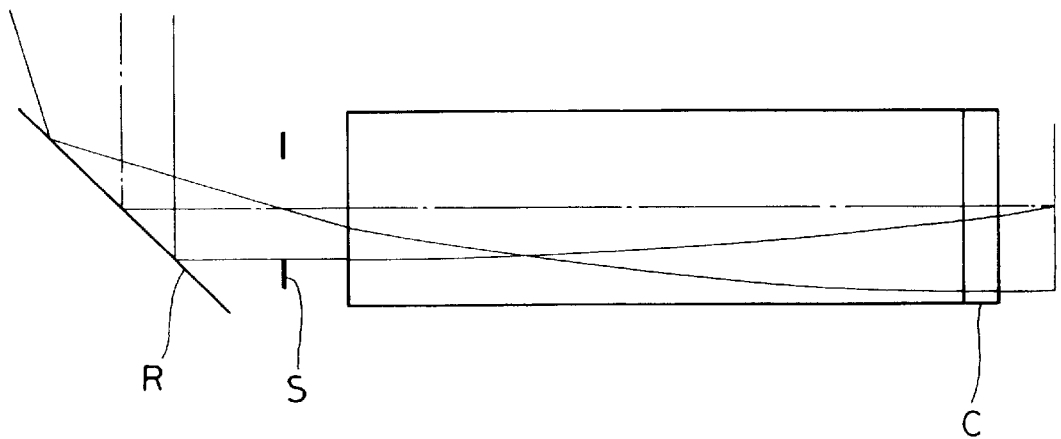
FIG. 50 shows a sectional view illustrating another example of the forty-ninth t of the present invention.

In the forty-ninth embodiment, the lens system is composed of a master lens portion M and an interchangeable lens portion A. A lens system which has two focal points can easily be obtained by exchanging the interchangeable lens portion A with a reflecting surface R as shown in FIG. 50. Further, a lens system which has a plurality of focal points can be obtained by preparing a plurality of interchangeable lens portions and using these lens portions in exchange. Since the master lens portion M is usable coonly to all interchangeable lens portions, it can be prepared at a low cost. The interchangeable portion A has a refractive power of nearly zero so that a focal light bundle is incident onto a second lens unit.

Figure 52A:
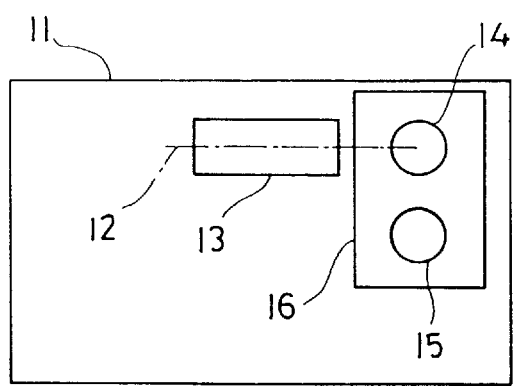
FIGS. 52A and 52B show diagrams illustrating means for exchanging interchangeable lenses in a lens system according to the present invention which is composed of a master lens and interchangeable lenses.
Figure 52B:
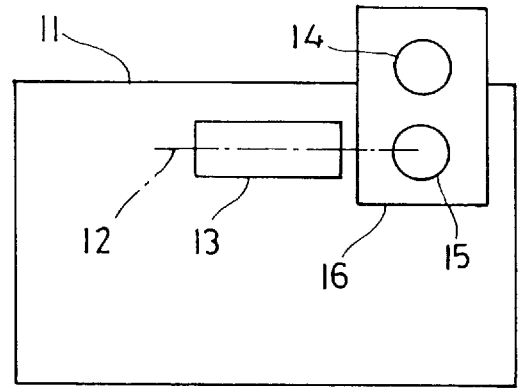

FIGS. 52A and 52B show a means for exchanging the interchangeable lens portions. FIGS. 52A and 52B are sectional views illustrating the lens system according to the present invention which is used in an image pickup apparatus such as a camera as seen from the object side. In these drawings, a reference numeral 11 represents a frame of the image pickup apparatus, a reference numeral 12 designates an optical axis, a reference numeral 13 denotes a master lens, reference numerals 14 and 15 represent interchangeable lenses A and B, and a reference numeral 16 designates a mechanism for exchanging the interchangeable lenses A and B with each other. FIG. 52A shows a lens system which is composed of a combination of the master lens and the interchangeable lens A. FIG. 52B shows a condition in which the exchanging mechanism is moved upward for combining the master lens with the interchangeable lens 15. A lens system having two focal points can be obtained by exchanging the interchangeable lenses as described above.

Figure 53A:
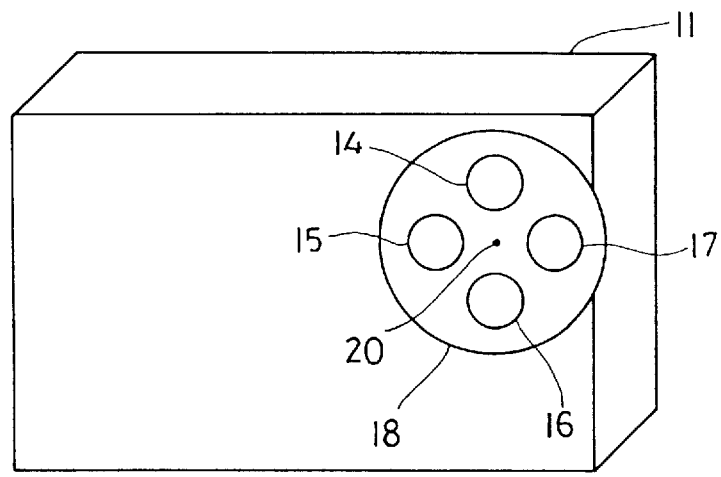
FIGS. 53A, 53B and 53C show diagrams illustrating another means for exchanging interchangeable lenses in a lens system according to the present invention which is composed of a master lens and interchangeable lenses.
Figure 53B:
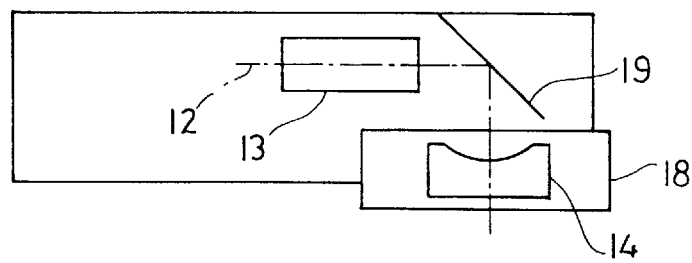
Figure 53C:
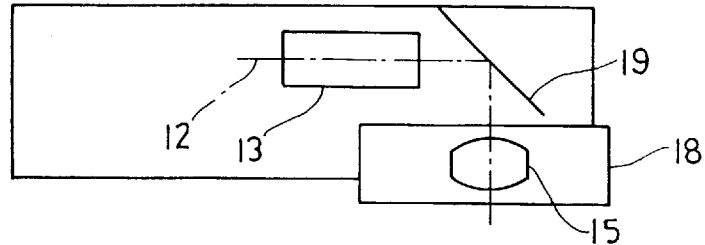

Another means can be obtained, for example, as shown in FIGS. 53A, 53B and 53C. FIG. 53A shows a lens system according to the present invention which is used in an image pickup apparatus such as a camera as seen from the object side. In FIGS. 53A, 53B and 53C, a reference numeral 11 represents a frame of the image pickup apparatus, a reference numeral 12 designates an optical axis, a reference numeral 13 denotes a master lens portion, reference numerals 14, 15, 16 and 17 represent interchangeable lenses A, B, C and D, a reference numeral 18 designates a mechanism for exchanging the interchangeable lenses A, B, C and D, a reference numeral 19 denotes a reflecting surface, and a reference numeral 20 represents a rotating shaft of the exchanging mechanism. FIG. 53B shows a lens system which is composed of a combination of the master lens and the interchangeable lens A, whereas FIGS. 53C shows a condition in which a lens system is composed of a combination of the master lens and the interchangeable lens B by turning the exchanging mechanism 18 at an angle of 90° around the rotating shaft 20. A lens system which has four focal points can be obtained by exchanging the interchangeable lenses as described above.

Figure 54:
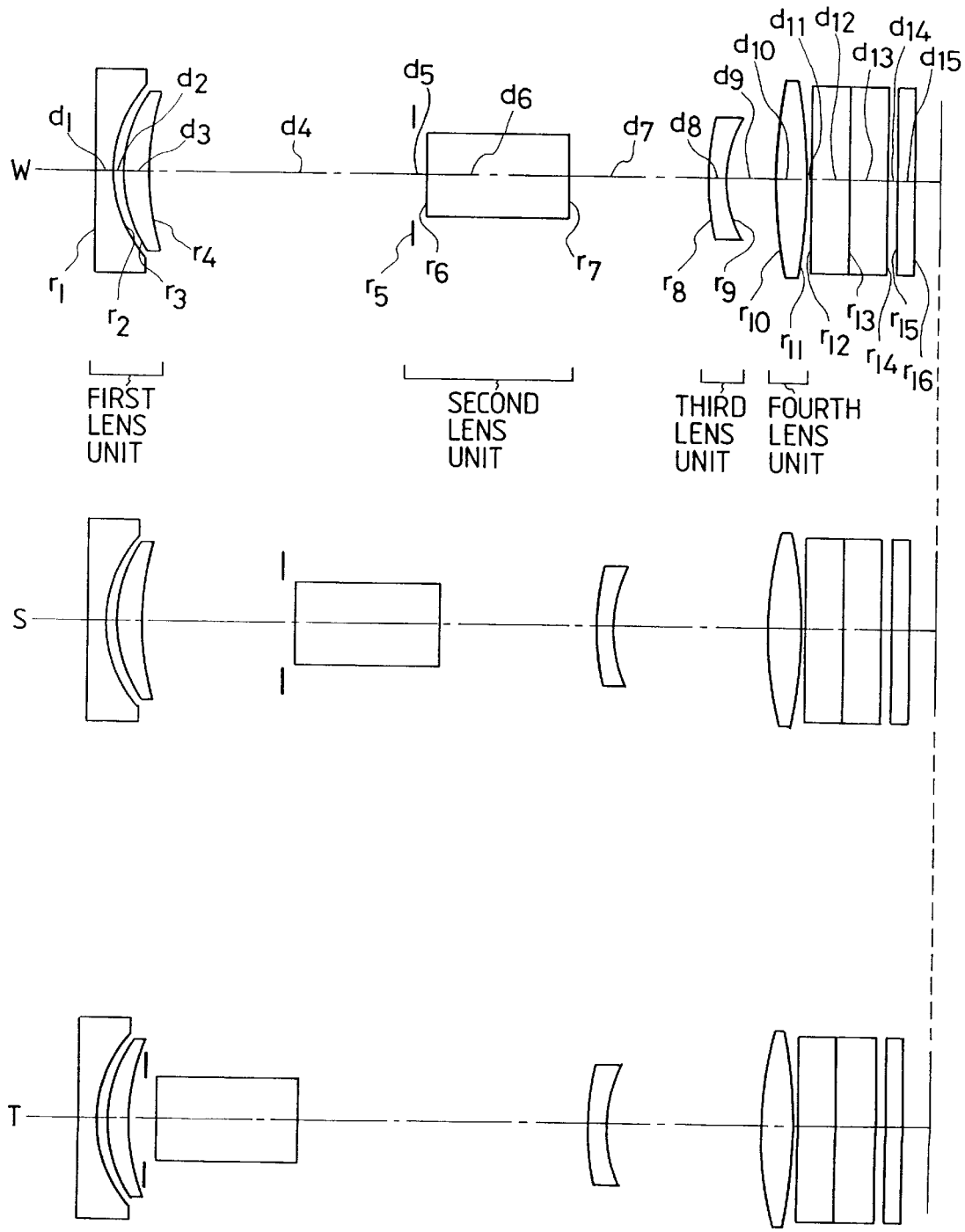
FIG. 54 shows a sectional view illustrating a composition of a fiftieth embodiment of the lens system according to the present invention.

A fiftieth embodiment has a composition illustrated in FIG. 54, or is a zoom lens system which is composed, in order from the object side, of a first lens unit having a negative refractive power, a second lens unit having a positive refractive power, a third lens unit having a negative refractive power and a fourth lens unit having a positive refractive power. The first lens unit and the fourth lens unit are kept stationary during a change of a magnification, whereas the second lens unit and the third lens unit are movable for the change of the magnification. The first lens unit is composed of a negative lens component and a positive lens component in order from the object side, and has a function to lead axial and offaxial light bundles to the second lens unit. The second lens unit is composed of a single positive lens component and has a vari-focal function, or is moved along an optical axis for changing the magnification. Since the second lens unit is composed of a radial type gradient index lens component, it corrects aberrations produced in this lens unit, thereby being capable of reducing variations of aberrations due to the change of the magnification. The third lens unit is composed of a single negative lens component and helps to correct a deviation of an image location caused by changing magnification. The fourth lens unit is composed of a single positive lens component and leads the light bundles from the third lens unit to an image surface. Two plane parallel plates disposed subsequently to the fourth lens unit represent filters for cutting off components having specific wavelengths. These filters are, for example, a low pass filter and an infrared cut filter. A plane parallel plate disposed on the image side represents a cover glass plate for an image pickup device. An aperture stop is disposed on the object side of the radial type gradient index lens component and is moved together with the radial type gradient index lens component for changing the magnification.

In FIG. 54, the reference symbol W represents a wide position, the reference symbol S designates an intermediate focal length and the reference symbol T denotes a tele position.

It is desirable for a zoom lens system that aberrations are favorably corrected in each of the lens units for reducing variations of aberrations caused by changing a magnification. It is difficult to correct aberrations in particular in a lens unit which has a vari-focal function and tends to have a refractive power stronger than that of any one of the other lens units. By using a radial type gradient index lens component which is capable of favorably correcting chromatic aberration and the other aberrations in a lens unit having a vari-focal function, it is possible to reduce variations of aberrations to be caused by changing a magnification. Further, the cost of polishing is reduced by configuring the radial type gradient index lens component so as to have two planar surfaces. Needless to say, aberrations can be corrected more favorably by configuring the radial type gradient index lens component so as to satisfy at least one of the conditions (1), (2), (3), (4), (5), (6), (7), (8), (9), (10), (11), (18), (19), (20), (21), (22) and (23).

Though the fiftieth e ent is composed of lens components in a number as small as five, aberrations are corrected favorably and variations of aberrations caused by changing a magnification are small in this lens system.

The lens system according to the present invention is composed of lens components in an extremely small number of the order of two to five, and nevertheless has a compact size and favorably corrected aberrations.

What is claimed is:

1. A lens system consisting of only four lens units, said lens system comprising, in order from an object side:

a first lens unit;

a second lens unit having a positive refractive power;

a third lens unit having a negative refractive power; and a fourth lens unit having a positive refractive power, wherein only a space between said first lens unit and said second lens unit, a space between said second lens unit and said third lens unit, and a space between said third lens unit and said fourth lens unit are changed when a magnification change is performed from a wide angle position to a telephoto position, wherein said second lens unit comprises at least one radial type graded refractive distribution lens, and wherein said first lens unit is fixed on an optical axis from said wide angle position to said telephoto position.

2. A lens system according to claim 1 wherein said first lens unit has a negative refractive power.

3. A lens system according to claim 1 wherein said radial type gradient index lens component has two planar surfaces.

4. A lens system according to claim 1 wherein said second lens unit and said third lens unit are moved along an optical axis for changing a magnification.

5. A lens system according to claim 1, further comprising a filter disposed between said fourth lens unit and an image surface.

6. A lens system according to claim 1, further comprising an aperture disposed between said first lens unit and said second lens unit.

7. A lens system according to claim 1, wherein all lenses belonging to said first lens unit are homogeneous lenses.

8. A lens system according to claim 1, wherein all lenses belonging to said third lens unit are homogeneous lenses.

9. A lens system according to claim 1, wherein said first, third and fourth lens units consist of homogeneous lenses.

10. A lens system consisting of only four lens units, said lens system comprising, in order from an object side:

a first lens unit;

a second lens unit having a positive refractive power;

a third lens unit having a negative refractive power; and a fourth lens unit having a positive refractive power, wherein only a space between said first lens unit and said second lens unit, and a space between said second lens unit and said third lens unit, and a space between said third lens unit and said fourth lens unit are changed when a magnification change is performed from a wide angle position to a telephoto position, wherein said second lens unit comprises at least one radial type graded refractive distribution lens, and wherein said first lens unit is composed of a plurality of lenses with an air space reserved therebetween.

11. A lens system according to claim 10, wherein said first lens unit has a negative refractive power.

12. A lens system according to claim 10, wherein said radial type gradient index lens component has two planar surfaces.

13. A lens system according to claim 10, wherein said second lens unit and said third lens unit are moved along an optical axis for changing a magnification.

14. A lens system according to claim 10, further comprising a filter disposed between said fourth lens unit and an image surface.

15. A lens system according to claim 10, further comprising an aperture disposed between said first lens unit and said second lens unit.

16. A lens system according to claim 10, wherein all lenses belonging to said first lens unit are homogeneous lenses.

17. A lens system according to claim 10, wherein all lenses belonging to said third lens unit are homogeneous lenses.

18. A lens system according to claim 10, wherein said first, third and fourth lens units consist of homogeneous lenses.

19. An image pickup system having a lens system consisting of only four lens units, said lens system comprising in order from an object side:

a first lens unit;

a second lens unit having a positive refractive power;

a third lens unit having a negative refractive power; and a fourth lens unit having a positive refractive power, wherein only a space between said first lens unit and said second lens unit, a space between said second lens unit and said third lens unit, and a space between said third lens unit and said fourth lens unit are changed when a magnification change is performed from a wide angle position to a telephoto position, wherein said second lens unit comprises at least one radial type graded refractive distribution lens, and wherein said first lens unit is fixed on an optical axis from said wide angle position to said telephoto position.

20. An image pickup system according to claim 19, wherein said first lens unit has a negative refractive power.

21. An image pickup system according to claim 19, wherein said radial type gradient index lens component has two planar surfaces.

22. An image pickup system according to claim 19, wherein said second lens unit and said third lens unit are moved along an optical axis for changing a magnification.

23. An image pickup system according to claim 19, further comprising a filter disposed between said fourth lens unit and an image surface.

24. An image pickup system according to claim 19, further comprising an aperture disposed between said first lens unit and said second lens unit.

25. An image pickup system according to claim 19, wherein all lenses belonging to said first lens unit are homogeneous lenses.

26. An image pickup system according to claim 19, wherein all lenses belonging to said third lens unit are homogeneous lenses.

27. An image pickup system according to claim 19, wherein said first, third and fourth lens units consist of homogeneous lenses.

28. An image pickup system having a lens system consisting of only four lens units, said lens system comprising in order from an object side:

a first lens unit;

a second lens unit having a positive refractive power;

a third lens unit having a negative refractive power; and a fourth lens unit having a positive refractive power, wherein only a space between said first lens unit and said second lens unit, and a space between said second lens unit and said third lens unit, and a space between said third lens unit and said fourth lens unit are changed when a magnification change is performed from a wide angle position to a telephoto position, wherein said second lens unit comprises at least one radial type graded refractive distribution lens, and wherein said first lens unit is composed of a plurality of lenses with an air space reserved therebetween.

29. An image pickup system according to claim 28, wherein said first lens unit has a negative refractive power.

30. A image pickup system according to claim 28, wherein said radial type gradient index lens component has two planar surfaces.

31. A image pickup system according to claim 28, wherein said second lens unit and said third lens unit are moved along an optical axis for changing a magnification.

32. An image pickup system according to claim 28, further comprising a filter disposed between said fourth lens unit and an image surface.

33. An image pickup system according to claim 28, further comprising an aperture disposed between said first lens unit and said second lens unit.

34. An image pickup system according to claim 28, wherein all lenses belonging to said first lens unit are homogeneous lenses.

35. An image pickup system according to claim 28, wherein all lenses belonging to said third lens unit are homogeneous lenses.

36. An image pickup system according to claim 28, wherein said first, third and fourth lens units consist of homogeneous lenses.

* * * * *